US007142712B2

(12) United States Patent
Maruoka et al.

(10) Patent No.: US 7,142,712 B2
(45) Date of Patent: Nov. 28, 2006

(54) AUTOMATIC TONE CORRECTION APPARATUS, AUTOMATIC TONE CORRECTION METHOD, AND AUTOMATIC TONE CORRECTION PROGRAM STORAGE MEDIUMS

(75) Inventors: Kazutaka Maruoka, Saijyo (JP); Fumio Fujimura, Saijyo (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 945 days.

(21) Appl. No.: 10/170,626

(22) Filed: Jun. 14, 2002

(65) Prior Publication Data
US 2003/0002736 A1  Jan. 2, 2003

(30) Foreign Application Priority Data
Jun. 14, 2001  (JP)  ............................. 2001-180642

(51) Int. Cl.
*G06K 9/00* (2006.01)
(52) U.S. Cl. ........................................ 382/168; 358/1.9
(58) Field of Classification Search ........ 382/162–169, 382/115–123, 288; 358/518–522, 1.9, 3.26; 348/77–78, 576–577; 345/589–604
See application file for complete search history.

(56) References Cited

U.S. PATENT DOCUMENTS 5,982,926 A * 11/1999 Kuo et al. ................... 382/167
6,631,208 B1 * 10/2003 Kinjo et al. ................. 382/167
6,873,441 B1 * 3/2005 Kuwabara et al. ......... 358/3.26

FOREIGN PATENT DOCUMENTS

| JP | 04-035467   | 2/1992  |
|----|-------------|---------|
| JP | 05-205033   | 8/1993  |
| JP | 6-268866    | 9/1994  |
| JP | 09-200531   | 7/1997  |
| JP | 10-243261   | 9/1998  |
| JP | 11-317872   | 11/1999 |
| JP | 2000-102033 | 4/2000  |
| JP | 2000-236452 | 8/2000  |
| JP | 2000-278530 | 10/2000 |
| JP | 2001-94804  | 4/2001  |

* cited by examiner

*Primary Examiner*—Ishrat Sherali
(74) *Attorney, Agent, or Firm*—Wenderoth, Lind & Ponack, L.L.P.

(57) ABSTRACT

An automatic tone correction apparatus comprises a luminance distribution formation circuit for forming a luminance histogram of an input image; a center-of-gravity calculation circuit for calculating the center of gravity of a low-luminance part of the luminance histogram; a distribution range calculation circuit for calculating a maximum value and a minimum value on an input luminance level axis; a target value storage circuit for holding a luminance correction target value; a correction table formation circuit for forming a correction table for expanding the luminance distribution and, simultaneously, correcting the luminance histogram so that the center of gravity matches the luminance correction target value; and an image signal correction circuit for performing tone correction on the basis of the correction table. Therefore, whether the input image is a forward-light image or a back-lighted image, the apparatus performs tone correction using the same processing.

56 Claims, 35 Drawing Sheets

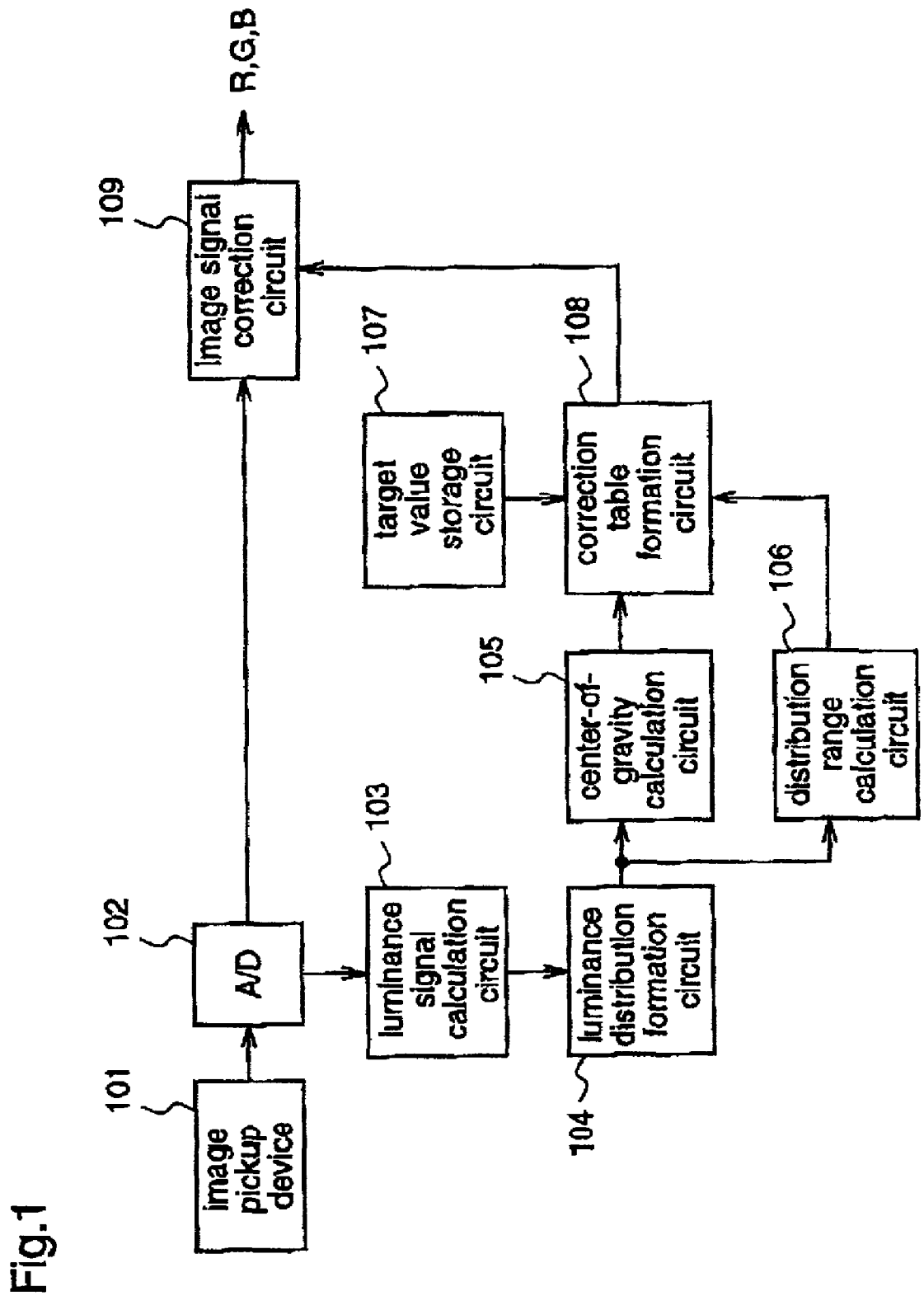

frequency 0    luminance level    255 after conversion

255 target value

0  Ymin          Ymax 255 center of gravity before conversion luminance level

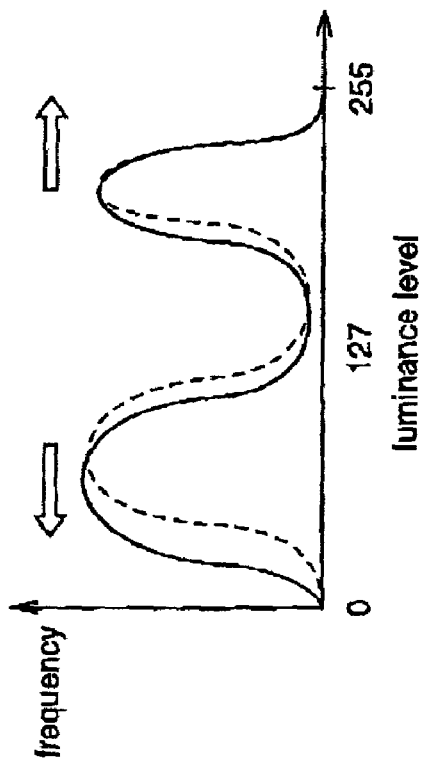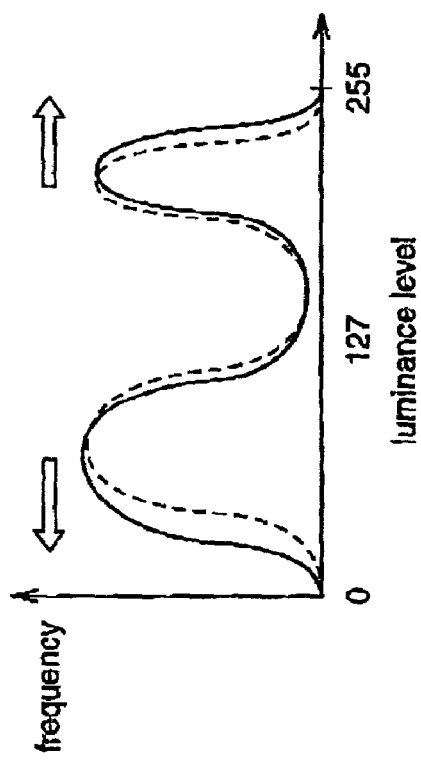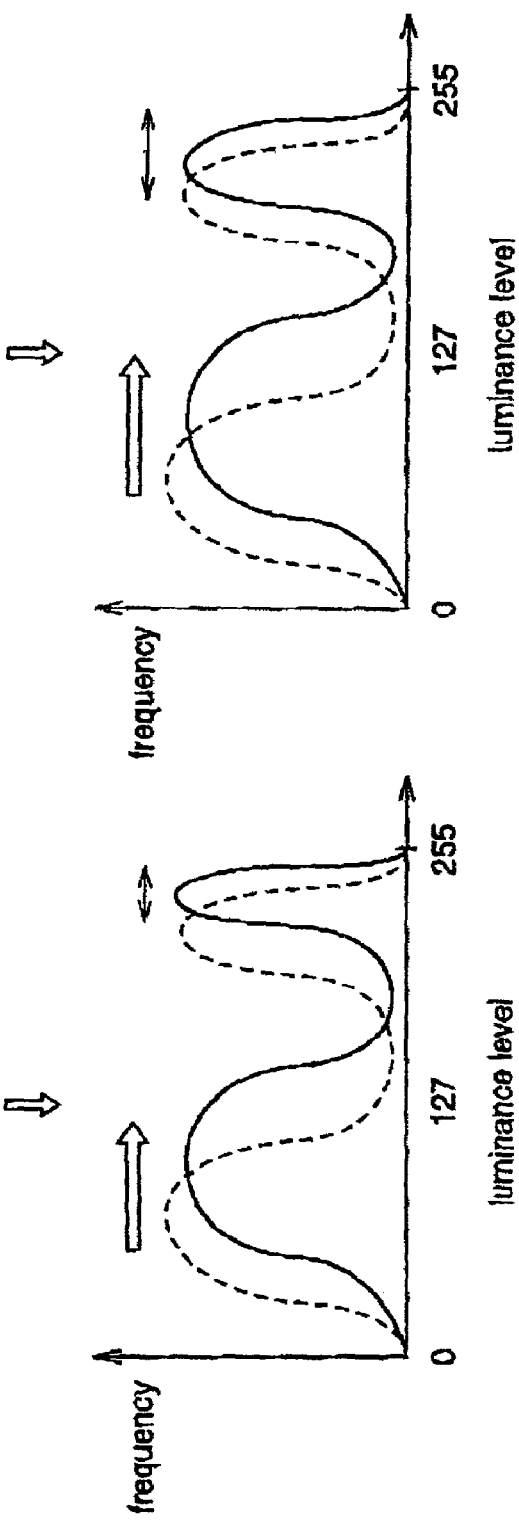
Fig.16(a)
Fig.16(b)

AUTOMATIC TONE CORRECTION APPARATUS, AUTOMATIC TONE CORRECTION METHOD, AND AUTOMATIC TONE CORRECTION PROGRAM STORAGE MEDIUMS

FIELD OF THE INVENTION

The present invention relates to automatic tone correction apparatuses, automatic tone correction methods, and automatic tone correction program storage mediums. To be specific, the invention relates to an improved digital image processing apparatus that can correct an input image, more specifically, that can automatically correct tones of an input image.

BACKGROUND OF THE INVENTION

As a conventional technique for automatically correcting tones of an image, a method as follows has been well known. That is, a luminance value or a density value of each pixel of an input image is calculated, a histogram indicating the sum of pixels having the same value is formed, and all pixels are subjected to such a correction process that optimizes the shape of the histogram.

For example, Japanese Published Patent Application No. Hei.6-268866 discloses a method for performing correction using a histogram as mentioned above. The method disclosed in this literature will be described with reference to FIGS. 40(a)–40(c). In the following description, it is assumed that each pixel of a digital image has a density value ranging from "0" to "255".

Initially, a density value of each pixel is calculated from a digital image signal, and a density histogram indicating the sum of pixels having the same density value is formed. An example of this histogram is shown in FIG. 40(a). Next, assuming that the minimum density value of the created density histogram is dmin, the maximum density value is dmax, the number of pixels having a pixel density d is F1[d], and the number of pixels after conversion is F2[d], a histogram which is corrected so as to expand a pixel density distribution area over the whole pixel luminance (refer to FIG. 40(b)) is formed according to formula (1) as follows and, simultaneously, a point (center of gravity) G which divides the area of the histogram into two equal parts is calculated. Thereafter, as shown in FIG. 40(c), a γ value at which the center of gravity G is positioned in the center of the density range is obtained. Assuming that the number of pixels after conversion of the F2[d] is expressed by F3[d], a histogram which is subjected to γ correction is formed according to formula (2) as follows, and correction is carried out on the basis of the histogram.

$$F2[d] = F1[d \times \{(d\max - d\min)/255 + d\min\}] \qquad (1)$$

$$F3[d] = F2[(d/256)^{\frac{1}{\gamma}}] \qquad (2)$$

In this way, the distribution of pixel densities is expanded over all tones, evenly from the center tone to the both sides, whereby the brightness is adjusted so that the center of gravity of the density distribution is positioned in the center.

Meanwhile, Japanese Published Patent Application No. 2000-102033 discloses another method for performing tone correction on an image using a histogram. This method will be described with reference to FIG. 41.

In this method, an input luminance level axis, which is calculated for a luminance histogram generated from a digital image signal, is divided into equal n regions (n: integer that satisfies n>3), and feature parameters, such as a ratio of the number of pixels in each region to all pixels, a ratio of the number of pixels in each region exceeding a predetermined limit value to all pixels, and a radio of the number of pixels in each of three equal regions into which the input luminance-level axis is divided, are captured (step 2501). Next, various kinds of curve data which have previously been formed are captured (step 2502). Then, the process is branched into different processes (case branching) in step 2503 and step 2505 on the basis of the feature parameters, and a tone correction curve is formed from the feature parameters and curve data, which are captured in steps 2501 and 2502, by under processing (step 2504), over processing (step 2506), or linear processing (step 2507), and tone correction curve data is stored (step 2508). Then, tone correction is carried out on the basis of the tone correction curve so obtained.

That is, in this method, the correction process is branched into different processes according to the shape of the luminance histogram of the input image, and a tone correction curve is formed by a process most suited to the input image, and then tone correction is carried out on the basis of the tone correction curve.

As described above, according to the tone correction method disclosed in Japanese Published Patent Application No. Hei.6-268866, even when an input image includes a lot of halftones, a sharp-contrast image can be obtained.

On the other hand, according to the tone correction method disclosed in Japanese Published Patent Application No. 2000-102033, an image of improved quality is obtained as compared with the case of using the accumulated luminance distribution as it is. Further, since the correction process can be implemented by software, it can easily deal with an alteration of image data or the like.

However, the tone correction method disclosed in Japanese Published Patent Application No. Hei.6-268866 has a drawback as follows. Although, in this method, γ correction is carried to bring the center of gravity of the histogram to the center of tones, when two peaks are generated on the low-tone side and the high-tone side of the histogram as in a back-lighted imager correction is hardly carried out because the center of gravity of the histogram is originally positioned in the vicinity of the center tone. Consequently, the back-lighted area of the image is not corrected at all.

Furthermore, as for a natural image such as a scenic shot, a natural image having a histogram the center of gravity of which is in the vicinity of the center tone is not always beautiful. For example, when an image including a person who wears black clothes is corrected, the clothes unfavorably turn to gray.

On the other hand, in the tone correction method disclosed in Japanese Published Patent Application No. 2000-102033, appropriate tone correction is carried out by branching the correction process according to the shape of the luminance histogram of the input image. In this method, however, accurate case branching is required, whereby the process is complicated and the volume of calculation is increased.

Moreover, different correction processes must be prepared for the respective cases, whereby the required storage capacity is increased, and the scale of the correction apparatus is increased, resulting in an increase in costs.

Furthermore, in the above-described methods, when a person exists in the center of the image and the area occupied by the person is small, since information of the person is hardly included in the histogram, an unintended correction is carried out, whereby a skin color region such as a face, which is visually conspicuous, occurs halation.

SUMMARY OF THE INVENTION

The present invention is made to solve the above-described problems and has for its object to provide an automatic tone correction apparatus, an automatic tone correction method, and an automatic tone correction program storage medium, that can realize satisfactory correction for a back-lighted image without collapsing a high-luminance part of the image, that can optimize the contrast and brightness of a forward-lighted image by the same processing as that for the back-lighted image, and that can suppress unintended correction.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a 1st aspect of the present invention, an automatic tone correction apparatus comprises: a luminance histogram formation unit for forming a luminance histogram of a digital image; a center-of-gravity calculation unit for calculating a center of gravity of a low-luminance part of the luminance histogram; and a tone correction unit for forming a correction table on the basis of the luminance histogram which is formed by the luminance histogram formation unit, the center of gravity of the low-luminance part of the luminance histogram which is calculated by the center-of-gravity calculation unit, and a luminance correction target value that is a target value to which the center of gravity of the low-luminance part of the luminance histogram should be shifted, and performing tone correction using the correction table, thereby expanding the luminance distribution and, simultaneously, matching the center of gravity of the low-luminance part of the luminance histogram to the luminance correction target value. Therefore, a back-lighted image can be brightly corrected so that the luminance value of a low-luminance region in the back-lighted state is brought to a target luminance value, thereby obtaining an image the whole contrast of which is enhanced Further, also a forward-lighted image can be corrected so that the luminance value of a low-luminance region is brought to a target luminance value, resulting in an image the whole contrast of which is enhanced.

According to a 2nd aspect of the present invention, in the automatic tone correction apparatus according to the 1st aspect, a restriction is put on the amount of correction in the tone correction. Therefore, even when the luminance correction target value is not an optimum value, the property of the original image is prevented from being damaged significantly.

According to a 3rd aspect of the present invention, in the automatic tone correction apparatus according to the first aspect, the luminance correction target value to be used in the tone correction is previously set according to the position of the center of gravity. Therefore, a work of setting a luminance correction target value for every input image is dispensed with.

According to a 4th aspect of the present invention, an automatic tone correction apparatus comprises: a luminance histogram formation unit for forming a luminance histogram of a digital image; a target value calculation unit for calculating a luminance correction target value from a target luminance distribution; a center-of-gravity calculation unit for calculating a center of gravity of a low-luminance part of the luminance histogram; and a tone correction unit for forming a correction table on the basis of the luminance histogram which is formed by the luminance histogram formation unit, the center of gravity of the low-luminance part of the luminance histogram which is calculated by the center-of-gravity calculation unit, and the luminance correction target value that is a target value to which the center of gravity of the low-luminance part of the luminance histogram should be shifted, and using the correction table, expanding the luminance distribution and, simultaneously, performing tone correction so that the center of gravity of the low-luminance part of the luminance histogram matches the luminance correction target value calculated by the target value calculation unit. Therefore, an image having a target brightness and an enhanced contrast as a whole can be obtained using a target luminance distribution of the same shape for a forward-lighted image and a back-lighted image.

According to a 5th aspect of the present invention, in the automatic tone correction apparatus according to the 4th aspect, when performing the tone correction, the target value calculation unit sets a target luminance distribution with a curve. Therefore, setting of a target luminance distribution is facilitated, whereby the storage capacity is reduced.

According to a 6th aspect of the present invention, in the automatic tone correction apparatus according to the 4th aspect, when performing the tone correction, the target value calculation unit sets a plurality of target luminance distributions, and stores them. Therefore, the luminance correction target value can be easily adjusted.

According to a 7th aspect of the present invention, an automatic tone correction apparatus comprises: a luminance histogram formation unit for forming a luminance histogram of a digital image; a boundary value calculation unit for calculating a boundary value for determining a low-luminance part of the luminance histogram; a center-of-gravity calculation unit for calculating a center of gravity of the low-luminance part of the luminance histogram, on the basis of the boundary value calculated by the boundary value calculation unit; and a tone correction unit for forming a correction table on the basis of the luminance histogram which is formed by the luminance histogram formation unit, the center of gravity of the low-luminance part of the luminance histogram which is calculated by the center-of-gravity calculation unit, and a luminance correction target value that is a target value to which the center of gravity of the low-luminance part of the luminance histogram should be shifted, and using the correction table, expanding the luminance distribution and, simultaneously, performing tone correction so that the center of gravity of the low-luminance part of the luminance histogram matches the luminance correction target value calculated by the target value calculation unit. Therefore, in a back-lighted image, a low-luminance part including a back-lighted region is correctly calculated, whereby the luminance value of the back-lighted region is corrected to a target luminance value more accurately.

According to an 8th aspect of the present invention, in the automatic tone correction apparatus according to the 7th aspect, when performing the tone correction, the boundary value calculation unit divides a luminance range into plural regions, and calculates a boundary value from the feature parameters of the respective regions. Therefore, a boundary value that accurately separates the high-luminance side and the low-luminance side is obtained.

According to a 9th aspect of the present invention, in the automatic tone correction apparatus according to the 8th aspect, when performing the tone correction, the boundary value calculation unit divides the luminance range into two regions, and a center of gravity calculated on the lower luminance side is used as the center of gravity of the low-luminance part of the luminance histogram. Therefore, the tones can be corrected without recalculating the center of gravity of the low-luminance part.

According to a 10th aspect of the present invention, an automatic tone correction apparatus comprises: a luminance histogram formation unit for forming a luminance histogram of a digital image; a mountain-shape distribution detection unit for detecting a range of a mountain-shape distribution of the luminance histogram; a boundary value calculation unit for calculating a boundary value for determining a low-luminance part of the luminance histogram from the range of the mountain-shape distribution detected by the mountain-shape distribution detection unit; a center-of-gravity calculation unit for calculating a center of gravity of the low-luminance part of the luminance histogram, on the basis of the boundary value calculated by the boundary value calculation unit; and a tone correction unit for forming a correction table on the basis of the luminance histogram which is formed by the luminance histogram formation unit, the center of gravity of the low-luminance part of the luminance histogram which is calculated by the center-of-gravity calculation unit, and a luminance correction target value that is a target value to which the center of gravity of the low-luminance part of the luminance histogram should be shifted, and using the correction table, expanding the luminance distribution and, simultaneously, performing tone correction so that the center of gravity of the low-luminance part of the luminance histogram matches the luminance correction target value calculated by the target value calculation unit. Therefore, when the input image is a back-lighted image, it is corrected so as to have a target brightness and, simultaneously, the whole contrast is enhanced. On the other hand, when the input image is a forward-lighted image, the contrast is enhanced without changing the original brightness.

According to an 11th aspect of the present invention, in the automatic tone correction apparatus according to the 10th aspect, when performing the tone correction, the boundary value calculation unit sets the boundary value calculated from the range of the mountain-shape distribution, using the luminance histogram. Therefore, a more accurate boundary value can be calculated.

According to a 12th aspect of the present invention, in the automatic tone correction apparatus according to the 10th aspect, when performing the tone correction, the mountain-shape distribution detection unit puts a restriction on the range of the mountain-shape distribution. Therefore, even when the input image is a forward-lighted image, the brightness of the image can be corrected.

According to a 13th aspect of the present invention, an automatic tone correction apparatus comprises: a luminance histogram formation unit for forming a luminance histogram of a digital image; a center-of-gravity calculation unit for calculating a center of gravity of a low-luminance part of the luminance histogram; and a target value correction unit for correcting a luminance correction target value, that is a target value to which the center of gravity of the low-luminance part of the luminance histogram should be shifted, so that the target value matches the center of gravity of the low-luminance part of the luminance histogram which is calculated by the center-of-gravity calculation unit, when the target value is smaller than the center of gravity of the low-luminance part of the luminance histogram; and a tone correction unit for forming a correction table on the basis of the luminance histogram which is formed by the luminance histogram formation unit, the center of gravity of the low-luminance part of the luminance histogram which is calculated by the center-of-gravity calculation unit, and the luminance correction target value, and using the correction table, expanding the luminance distribution and, simultaneously, performing tone correction so that the center of gravity of the low-luminance part of the luminance histogram matches the luminance correction target value which is corrected or not corrected by the target value correction unit. Therefore, it is prevented that the corrected image becomes darker than the input image.

According to a 14th aspect of the present invention, in the automatic tone correction apparatus according to the 13th aspect, when performing the tone correction, if the luminance correction target value is larger than the center of gravity of the low-luminance part of the luminance histogram, the target value correction unit corrects the luminance correction target value so that the target value matches the center of gravity of the low-luminance part of the luminance histogram. Therefore, it is prevented that the corrected image becomes brighter than the input image.

According to a 15th aspect of the present invention, in the automatic tone correction apparatus according to the 13th or 14th aspect, when performing the tone correction, the luminance correction target value is corrected so that the target value becomes a value in the vicinity of the center of gravity of the low-luminance part of the luminance histogram. Therefore, the corrected brightness can be minutely adjusted on the basis of the brightness of the input image.

According to a 16th aspect of the present invention, in the automatic tone correction apparatus according to any of the 1st to 14th aspects, when performing the tone correction, the distribution of the luminance histogram is expanded only toward the low-luminance side and, simultaneously, the luminance histogram is corrected so that the center of gravity of the luminance histogram matches the luminance correction target value. Therefore, tone correction can be carried out without collapsing the high-luminance part.

According to a 17th aspect of the present invention, in the automatic tone correction apparatus according to any of the 1st, 4th, 7th, 10th, and 13th aspects, the tone correction unit performs the tone correction by executing $\gamma$ correction. Therefore, matching of the center of gravity of the low-luminance part of the luminance histogram to the target value is realized by just once formation of a conversion table.

According to an 18th aspect of the present invention, in the go automatic tone correction apparatus according to any of the 1st, 4th, 7th, 10th, and 13th aspects, the tone correction unit forms the correction table so that it contains a correction which performs, simultaneously, a process of expanding the luminance distribution of the luminance histogram, and a process of matching the center of gravity of the low-luminance part of the distribution-expanded luminance histogram to the luminance correction target value. Therefore, matching of the center of gravity of the low-luminance part of the luminance histogram to the target value is realized by just once formation of a conversion table.

According to a 19th aspect of the present invention, the automatic tone correction apparatus according to any of the 1st, 4th, 7th, 10th, and 13th aspects further comprises a luminance distribution expansion unit for expanding the luminance distribution of the luminance histogram formed by the luminance histogram formation unit; and the center-of-gravity calculation unit calculates the center of gravity of the low-luminance part of the luminance histogram in which the luminance distribution is expanded. Therefore, automatic tone correction is realized by performing the process of matching the center of gravity of the low-luminance part to the target value, after expanding the luminance distribution of the luminance histogram.

According to a 20th aspect of the present invention, in the automatic tone correction apparatus according to any of the 1st, 4th, 7th, 10th, and 13th aspects, when forming the luminance histogram, a restriction is put on the amount of accumulation of luminance distribution. Therefore, even when the tone distribution of the luminance histogram concentrates on a certain portion, the amount of correction can be accurately calculated.

According to a 21st aspect of the present invention, the automatic tone correction apparatus according to any of the 1st, 4th, 7th, 10th, and 13th aspects further comprises a skin color region extraction unit for extracting a skin color region from color-difference signals and a luminance signal; and when forming the luminance histogram, the luminance distribution of a skin color portion of the image is added to the luminance distribution of the whole image according to the area of the skin color region. Therefore, when a person exists in the image, tone correction can be carried out so that the brightness of the skin color is optimized according to the area of the person.

According to a 22nd aspect of the present invention, in the automatic tone correction apparatus according to the 21st aspect, when the luminance distribution of the skin color portion of the image is added to the luminance distribution of the whole image according to the area of the skin color region, the distribution of a high-luminance part of the skin color portion is weighted. Therefore, halation of the skin color is minimized.

According to a 23rd aspect of the present invention, in the automatic tone correction apparatus according to any of the 1st, 4th, 7th, 10th, and 13th aspects, the center of gravity of the high-luminance part is calculated from the luminance histogram which is calculated by the luminance histogram formation unit, and an amount of tone correction on the high-luminance part is calculated according to the position of the center of gravity of the high-luminance part. Therefore, halation of the high-luminance part is minimized.

According to a 24th aspect of the present invention, in the automatic tone correction apparatus according to any of the 1st, 4th, 7th, 10th, and 13th aspects, tone correction is not carried out when the luminance distribution is discrete. Therefore, tone correction is not performed on an image that needs no tone correction.

According to a 25th aspect of the present invention, in the automatic tone correction apparatus according to any of the 1st, 4th, 7th, 10th, and 13th aspects, color-difference signals of the image are corrected according to the correction table. Therefore, such a phenomenon that the saturation appears degraded due to luminance correction is suppressed.

According to a 26th aspect of the present invention, an automatic tone correction method for correcting tones of a digital image comprises: a luminance histogram formation step of forming a luminance histogram of the digital image; a center-of-gravity calculation step of calculating a center of gravity of a low-luminance part of the luminance histogram; and a tone correction step of expanding the luminance distribution and, simultaneously, performing tone correction so that the center of gravity of the low-luminance part of the luminance histogram matches a luminance correction target value. Therefore, a back-lighted image can be brightly corrected so that the luminance value of a low-luminance region in the back-lighted state is brought to a target luminance value, thereby obtaining an image the whole contrast of which is enhanced. Further, also a forward-lighted image can be corrected so that the luminance value of a low-luminance region is brought to a target luminance value, resulting in an image the whole contrast of which is enhanced.

According to a 27th aspect of the present invention, in the automatic tone correction method according to the 26th aspect, in the tone correction step, a restriction is put on the amount of correction. Therefore, even when the luminance correction target value is not an optimum value, the property of the original image is prevented from being damaged significantly.

According to a 28th aspect of the present invention, in the automatic tone correction method according to the 26th aspect, the luminance correction target value to be used in the tone correction step is previously set according to the position of the center of gravity. Therefore, a work of setting a luminance correction target value for every input image is dispensed with.

According to a 29th aspect of the present invention, an automatic tone correction method for correcting tones of a digital image comprises: a target value calculation step of calculating a luminance correction target value from a target luminance distribution; a luminance histogram formation step of forming a luminance histogram of the digital image; a center-of-gravity calculation step of calculating a center of gravity of a low-luminance part of the luminance histogram; and a tone correction step of expanding the luminance distribution and, simultaneously, performing tone correction so that the center of gravity of the low-luminance part of the luminance histogram matches the luminance correction target value that is calculated in the target value calculation step. Therefore, an image having a target brightness and an enhanced contrast as a whole can be obtained using a target luminance distribution of the same shape for a forward-lighted image and a back-lighted image.

According to a 30th aspect of the present invention, in the automatic tone correction method according to the 29th aspect, in the target value calculation step, a target luminance distribution is set with a curve. Therefore, setting of a target luminance distribution is facilitated, whereby the storage capacity is reduced.

According to a 31st aspect of the present invention, in the automatic tone correction method according to the 29th aspect, in the target value calculation step, a plurality of target luminance distributions are stored. Therefore, the luminance correction target value can be easily adjusted.

According to a 32nd aspect of the present invention, an automatic tone correction method for correcting tones of a digital image comprises: a luminance histogram formation step of forming a luminance histogram of the digital image; a boundary value calculation step of calculating a boundary value for setting a range of a low-luminance part of the luminance histogram; a center-of-gravity calculation step of calculating a center of gravity of the low-luminance part of the luminance histogram, on the basis of the boundary value calculated in the boundary value calculation step; and a tone correction step of expanding the luminance distribution and, simultaneously, performing tone correction so that the center of gravity of the low-luminance part of the luminance histogram matches a luminance correction target value. Therefore, in a back-lighted image, a low-luminance part including a back-lighted region is correctly calculated, whereby the luminance value of the back-lighted region is corrected to a target luminance value more accurately.

According to a 33rd aspect of the present invention, in the automatic tone correction method according to the 32nd aspect, in the boundary value calculation step, a luminance range is divided into plural regions, and a boundary value is calculated from feature parameters of the respective regions. Therefore, a boundary value that accurately separates the high-luminance side and the low-luminance side is obtained.

According to a 34th aspect of the present invention, in the automatic tone correction method according to the 33rd aspect, in the boundary value calculation step, the luminance range is divided into two regions, and a center of gravity calculated on the lower-luminance side is used as the center of gravity of the low-luminance part of the luminance histogram. Therefore, the tones can be corrected without recalculating the center of gravity of the low-luminance part.

According to a 35th aspect of the present invention, an automatic tone correction method for correcting tones of a digital image comprises: a luminance histogram formation step of forming a luminance histogram of the digital image; a mountain-shape distribution detection step of detecting a range of a mountain-shape distribution of the luminance histogram; a boundary value calculation step of calculating a boundary value for setting a low-luminance part of the luminance histogram, from the range of the mountain-shape distribution detected in the mountain-shape distribution detection step; a center-of-gravity calculation step of calculating a center of gravity or the low-luminance part of the luminance histogram, on the basis of the boundary value calculated in the boundary value calculation step; and a tone correction step of expanding the luminance distribution and, simultaneously, performing tone correction so that the center of gravity of the low-luminance part of the luminance histogram matches a luminance correction target value. Therefore, when the input image is a back-lighted image, it is corrected so as to have a target brightness and, simultaneously, the whole contrast is enhanced. On the other hand, when the input image is a forward-lighted image, the contrast is enhanced without changing the original brightness.

According to a 36th aspect of the present invention, in the automatic tone correction method according to the 35th aspect, in the boundary value calculation step, the boundary value calculated from the range of the mountain-shape distribution is set by using the luminance histogram. Therefore, a more accurate boundary value can be calculated.

According to a 37th aspect of the present invention, in the automatic tone correction method according to the 35th aspect, in the mountain-shape distribution detection step, a restriction is put on the range of the mountain-shape distribution. Therefore, even when the input image is a forward-lighted image, the brightness of the image can be corrected.

According to a 38th aspect of the present invention, an automatic tone correction method for correcting tones of a digital image comprises: a luminance histogram formation step of forming a luminance histogram of the digital image; a center-of-gravity calculation step of calculating a center of gravity of a low-luminance part of the luminance histogram; a target value correction step of correcting a luminance correction target value so that the target value matches the center of gravity of the low-luminance part of the luminance histogram which is calculated in the center-of-gravity calculation step, when the target value is smaller than the center of gravity of the low-luminance part of the luminance histogram; and a tone correction step of expanding the luminance distribution and, simultaneously, performing tone correction so that the center of gravity of the low-luminance part of the luminance histogram matches the uncorrected luminance correction target value when correction of the target value is not performed, or it matches the corrected luminance correction target value when correction of the target value is performed. Therefore, it is prevented that the corrected image becomes darker than the input image.

According to a 39th aspect of the present invention, in the automatic tone correction method according to the 38th aspect, in the target value correction step, when the luminance correction target value is larger than the center of gravity of the low-luminance part of the luminance histogram, the luminance correction target value is corrected so that the target value matches the center of gravity of the low luminance part of the luminance histogram. Therefore, it is prevented that the corrected image becomes brighter than the input image.

According to a 40th aspect of the present invention, in the automatic tone correction method according to the 38th or 39th aspect, the luminance correction target value is corrected so that the target value becomes a value in the vicinity of the center of gravity of the low-luminance part of the luminance histogram. Therefore, the corrected brightness can be minutely adjusted on the basis of the brightness of the input image.

According to a 41st aspect of the present invention, in the automatic tone correction method according to any of the 26th to 40th aspects, the distribution of the luminance histogram is expanded only toward the lower-luminance side and, simultaneously, the luminance histogram is corrected so that the center of gravity of the luminance histogram matches the luminance correction target value. Therefore, tone correction can be carried out without collapsing the high-luminance part.

According to a 42nd aspect of the present invention, in the automatic tone correction method according to any of the 26th, 29th, 32nd, 35th, and 38th aspects, the tone correction step is performed by executing γ correction. Therefore, matching of the center of gravity of the low-luminance part of the luminance histogram to the target value is realized by just once formation of a conversion table.

According to a 43rd aspect of the present invention, in the automatic tone correction method according to any of the 26th, 29th, 32nd, 35th, and 38th aspects, in the tone correction step, a correction table is formed so that it contains a correction which performs, simultaneously, a process of expanding the luminance distribution of the luminance histogram, and a process of matching the center of gravity of the low-luminance part of the distribution-expanded luminance histogram to the luminance correction target value. Therefore, matching of the center of gravity of the low-luminance part of the luminance histogram to the target value is realized by just once formation of a conversion table.

According to a 44th aspect of the present invention, the automatic tone correction method according to any of the 26th, 29th, 32nd, 35th, and 38th aspects further comprises a luminance distribution expansion step of expanding the luminance distribution of the luminance histogram, between the luminance histogram formation step and the center-of-gravity calculation step; and, in the center-of-gravity calculation step, calculation of a center of gravity is performed on the low-luminance part of the luminance histogram in which the luminance distribution is expanded. Therefore, automatic tone correction is realized by performing the process of matching the center of gravity of the low-luminance part to the target value, after expanding the luminance distribution of the luminance histogram.

According to a 45th aspect of the present invention, in the automatic tone correction method according to any of the 26th, 29th, 32nd, 35th, and 38th aspects, when forming the luminance histogram, a restriction is put on the amount of accumulation of luminance distribution. Therefore, even when the tone distribution of the luminance histogram concentrates on a certain portion, the amount of correction can be accurately calculated.

According to a 46th aspect of the present invention, the automatic tone correction method according to any of the 26th, 29th, 32nd, 35th, and 38th aspects further comprises a skin color region extraction step of extracting a skin color region from color-difference signals and a luminance signal; and, in the luminance histogram formation step, a luminance histogram, in which the luminance distribution of a skin color part of the image is added to the luminance distribution of the whole image according to the area of the skin color region, is formed. Therefore, when a person exists in the image, tone correction can be carried out so that the brightness of the skin color is optimized according to the area of the person.

According to a 47th aspect of the present invention, in the automatic tone correction method according to the 46th aspect, when the luminance distribution of the skin color part of the image is added to the luminance distribution of the whole image according to the area of the skin color region, the distribution of a high-luminance portion of the skin color part is weighted. Therefore, halation of the skin color is minimized.

According to a 48th aspect of the present invention, in the automatic tone correction method according to any of the 26th, 29th, 32nd, 35th, and 38th aspects, the center of gravity of the high-luminance part is calculated from the luminance histogram which is calculated in the luminance histogram formation step, and an amount of tone correction for the high-luminance part is calculated according to the position of the center of gravity of the high-luminance part. Therefore, halation of the high-luminance part is minimized.

According to a 49th aspect of the present invention, in the automatic tone correction method according to any of the 26th, 29th, 32nd, 35th, and 38th aspects, in the tone correction, tone correction is not carried out when the luminance distribution is discrete. Therefore, tone correction is not performed on an image that needs no tone correction.

According to a 50th aspect of the present invention, in the automatic tone correction method according to any of the 26th, 29th, 32nd, 35th, and 38th aspects, color-difference signals of the image are corrected according to the correction table. Therefore, such a phenomenon that the saturation appears degraded due to luminance correction is suppressed.

According to a 51st aspect of the present invention, there is provided an automatic tone correction program storage medium in which a program for making a computer execute an automatic tone correction method for correcting tones of a digital image is stored, wherein the automatic tone correction method comprises: a luminance histogram formation step of forming a luminance histogram of the digital image; a center-of-gravity calculation step of calculating a center of gravity of a low-luminance part of the luminance histogram; and a tone correction step of expanding the luminance distribution and, simultaneously, performing tone correction so that the center of gravity of the low-luminance part of the luminance histogram matches a luminance correction target value. Therefore, a back-lighted image can be brightly corrected so that the luminance value of a low-luminance region in the back-lighted state is brought to a target luminance value, thereby obtaining an image the whole contrast of which is enhanced. Further, also a forward-lighted image can be corrected so that the luminance value of a low-luminance region is brought to a target luminance value, resulting in an image the whole contrast of which is enhanced.

According to a 52nd aspect of the present invention, there is provided an automatic tone correction program storage medium in which a program for making a computer execute an automatic tone correction method for correcting tones of a digital image is stored, wherein the automatic tone correction method comprises: a target value calculation step of calculating a luminance correction target value from a target luminance distribution; a luminance histogram formation step of forming a luminance histogram of the digital image; a center-of-gravity calculation step of calculating a center of gravity of a low-luminance part of the luminance histogram; and a tone correction step of expanding the luminance distribution and, simultaneously, performing tone correction so that the center of gravity of the low-luminance part of the luminance histogram matches the luminance correction target value that is calculated in the target value calculation step. Therefore, an image having a target brightness and an enhanced contrast as a whole can be obtained using a target luminance distribution of the same shape for a forward-lighted image and a back-lighted image.

According to a 53rd aspect of the present invention, there is provided an automatic tone correction program storage medium in which a program for making a computer execute an automatic tone correction method for correcting tones of a digital image is recorded, wherein the automatic tone correction method comprises: a luminance histogram formation step of forming a luminance histogram of the digital image; a boundary value calculation step of calculating a boundary value for setting a range of a low-luminance part of the luminance histogram; a center-of-gravity calculation step of calculating a center of gravity of the low-luminance part of the luminance histogram, on the basis of the boundary value calculated in the boundary value calculation step; and a tone correction step of expanding the luminance distribution and, simultaneously, performing tone correction so that the center of gravity of the low-luminance part of the luminance histogram matches a luminance correction target value. Therefore, in a back-lighted image, a low-luminance part including a back-lighted region is correctly calculated, whereby the luminance value of the back-lighted region is corrected to a target luminance value more accurately.

According to a 54th aspect of the present invention, there is provided an automatic tone correction program storage medium in which a program for making a computer execute an automatic tone correction method for correcting tones of a digital image is stored, wherein the automatic tone correction method comprises: a luminance histogram formation step of forming a luminance histogram of the digital image; a mountain-shape distribution detection step of detecting a range of a mountain-shape distribution of the luminance histogram; a boundary value calculation step of calculating a boundary value for setting a low-luminance part of the luminance histogram, from the range of the mountain-shape distribution detected in the mountain-shape distribution detection step; a center-of-gravity calculation step of calculating a center of gravity of the low-luminance part of the luminance histogram, on the basis of the boundary value calculated in the boundary value calculation step; and a tone correction step of expanding the luminance distribution and, simultaneously, performing tone correction so that the center of gravity of the low-luminance part of the luminance histogram matches a luminance correction target value. Therefore, when the input image is a back-lighted image, it is corrected so as to have a target brightness and, simultaneously, the whole contrast is enhanced. On the other hand, when the input image is a forward-lighted image, the contrast is enhanced without changing the original brightness.

According to a 55th aspect of the present invention, there is provided an automatic tone correction program storage medium in which a program for making a computer execute an automatic tone correction method for correcting tones of a digital image is stored, wherein the automatic tone correction method comprises: a luminance histogram formation step of forming a luminance histogram of the digital image; a center-of-gravity calculation step of calculating a center of gravity of a low-luminance part of the luminance histogram; a target value correction step of correcting a luminance correction target value so that the target value matches the center of gravity of the low-luminance part of the luminance histogram which is calculated in the center-of-gravity calculation step, when the target value is smaller than the center of gravity of the low-luminance part of the luminance histogram; and a tone correction step of expanding the luminance distribution and, simultaneously, performing tone correction so that the center of gravity of the low-luminance part of the luminance histogram matches the uncorrected luminance correction target value when correction of the target value is not performed, or it matches the corrected luminance correction target value when correction of the target value is performed. Therefore, it is prevented that the corrected image becomes darker than the input image.

According to a 56th aspect of the present invention, in the automatic tone correction program storage medium according to any of the 51st to 55th aspects, in the tone correction step, a correction table is formed so that it contains a correction which performs, simultaneously, a process of expanding the luminance distribution of the luminance histogram, and a process of matching the center of gravity of the low-luminance part of the distribution-expanded luminance histogram to the luminance correction target value. Therefore, matching of the center of gravity of the low-luminance part of the luminance histogram to the target value is realized by just once formation of a conversion table.

According to a 57th aspect of the present invention, in the automatic tone correction program storage medium according to any of the 51st to 55th aspects, the automatic tone correction method further comprises a luminance distribution expansion step of expanding the luminance distribution of the luminance histogram, between the luminance histogram formation step and the center-of-gravity calculation step; and in the center-of-gravity calculation step, calculation of a center of gravity is performed on the low-luminance part of the luminance histogram in which the luminance distribution is expanded. Therefore, automatic tone correction is realized by performing the process of matching the center of gravity of the low-luminance part to the target value, after expanding the luminance distribution of the luminance histogram.

According to a 58th aspect of the present invention, in the automatic tone correction program storage medium according to any of the 51st to 55th aspects, when forming the luminance histogram, a restriction is put on the amount of accumulation of luminance distribution. Therefore, even when the tone distribution of the luminance histogram concentrates on a certain portion, the amount of correction can be accurately calculated.

According to a 59th aspect of the present invention, in the automatic tone correction program storage medium according to any of the 51st to 55th aspects, the automatic tone correction method further comprises a skin color region extraction step of extracting a skin color region from color-difference signals and a luminance signal; and in the luminance histogram formation step, a luminance histogram, in which the luminance distribution of a skin color part of the image is added to the luminance distribution of the whole image according to the area of the skin color region, is formed. Therefore, when a person exists in the image, tone correction can be carried out so that the brightness of the skin color is optimized according to the area of the person.

According to a 60th aspect of the present invention, in the automatic tone correction program storage medium according to the 59th aspect, when the luminance distribution of the skin color part of the image is added to the luminance distribution of the whole image according to the area of the skin color region, the distribution of a high-luminance portion of the skin color part is weighted. Therefore, halation of the skin color is minimized.

According to a 61st aspect of the present invention, in the automatic tone correction program storage medium according to any of the 51st to 55th aspects, the center of gravity of the high-luminance part is calculated from the luminance histogram which is calculated in the luminance histogram formation step, and an amount of tone correction for the high-luminance part is calculated according to the position of the center of gravity of the high-luminance part. Therefore, halation of the high-luminance part is minimized.

According to a 62nd aspect of the present invention, in the automatic tone correction program storage medium according to any of the 51st to 55th aspects, tone correction is not carried out when the luminance distribution is discrete. Therefore, tone correction is not performed on an image that needs no tone correction.

According to a 63rd aspect of the present invention, in the automatic tone correction program storage medium according to any of the 51st to 55th aspects, color-difference signals of the image are corrected according to the correction table. Therefore, such a phenomenon that the saturation appears degraded due to luminance correction is suppressed.

BRIEF DESCRIPTION OF THE DRAWINGS

FIG. 1 is a block diagram illustrating an automatic tone correction apparatus according to a first embodiment of the present invention.

FIGS. 16(a) and 16(b) are diagrams illustrating the correcting operation by an automatic tone correction apparatus as defined in claim 16.

FIGS. 21(a) and 27(b) are flowcharts illustrating a tone correcting process and its principle according to the third embodiment, respectively.

DETAILED DESCRIPTION OF THE PREFERRED EMBODIMENTS

[Embodiment 1]

Figure 2A:
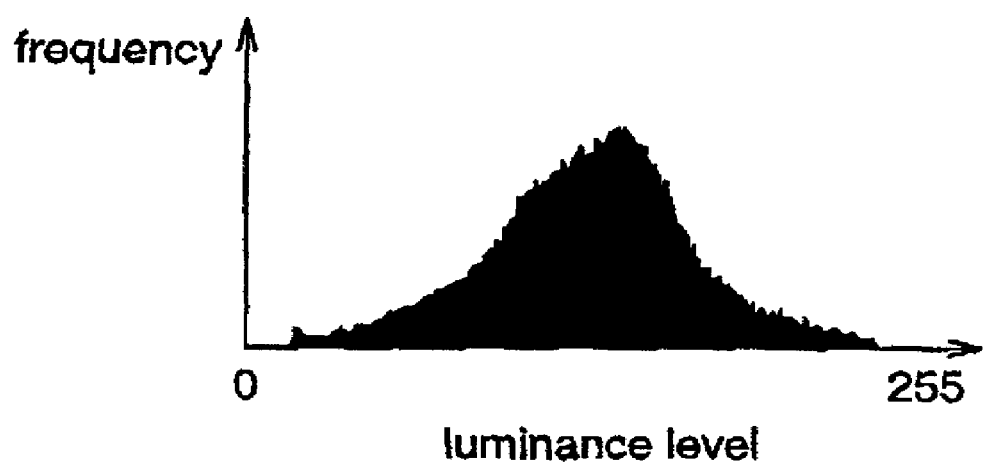
FIGS. 2(a) and 2(b) are diagrams illustrating luminance histograms of a forward-lighted image and a back-lighted image, respectively.

Hereinafter, a description will be given of a first embodiment corresponding to inventions described in claims 1, 2, 3, 26, 27, 28, and 51 (further, claims 16~25, 41~50, 56~63), with reference to the drawings.

In this first embodiment, the whole luminance distribution of a luminance histogram is expanded over all tones to improve the contrast of an input image as a whole, and simultaneously, the luminance histogram is corrected so that the center of gravity of a low-luminance part of the histogram is shifted to a target value.

FIG. 1 is a block diagram illustrating an automatic tone correction apparatus according to the first embodiment. In FIG. 1, reference numeral 101 denotes an image pickup device for light-to-electricity converting a shot image; reference numeral 102 denotes an A/D converter to which an analog image signal is supplied from the image pickup device 101; reference. numeral 103 denotes a luminance signal calculation circuit to which a digital image signal is supplied from the A/D converter 102; reference numeral 104 denotes a luminance distribution formation circuit (luminance histogram formation unit) to which a luminance signal is supplied from the luminance signal calculation circuit 103; reference numeral 105 denotes a center-of-gravity calculation circuit (center-of-gravity calculation unit) to which a luminance distribution is supplied from the luminance distribution formation circuit 104; reference numeral 106 denotes a distribution range calculation circuit to which the luminance distribution is supplied from the luminance distribution formation circuit 104; reference numeral 107 denotes a target value storage circuit for holding a target value to be a goal in performing tone correction; reference numeral 108 denotes a correction table formation circuit for forming a correction table for tone correction, on the basis of the center of gravity supplied from the center-of-gravity calculation circuit 105, a maximum value and a minimum value of the distribution range supplied from the distribution range calculation circuit 106, and the target value supplied from the target value storage circuit 107; and reference numeral 109 denotes an image signal correction circuit for performing tone correction on the digital image signal outputted from the A/D converter 102, on the basis of the correction table formed by the correction table formation circuit 108. The correction table formation circuit 108 and the image signal correction circuit 109 constitute a tone correction unit. However, when the tone correction unit does not include a function of expanding the distribution of the luminance histogram, the correction table formation circuit 108 and the image signal correction circuit 109 constitute a luminance distribution expansion unit as well as a tone correction unit.

Next, the operation will be described. An analog image signal outputted from the image pickup device 101 is converted into a multi-tone digital image signal by the A/D converter 102. This A/D conversion may be carried out for any number of bits. In this first embodiment, the image signal is an 8-bit signal, and its luminance value ranges from "0" to "255".

Next, the luminance signal calculation circuit 103 calculates a luminance signal out of the digital image signal. In the luminance signal calculation circuit 103, a luminance signal Y is calculated from R, G, and B values, according to formula (3) as follows.

$$Y = 0.299 \times R + 0.587 \times G + 0.114 \times B \quad (3)$$

The luminance distribution formation circuit 104 forms a luminance histogram indicating the sum of pixels having the same value, on the basis of the luminance value calculated by the luminance signal calculation circuit 103.

Figure 2B:
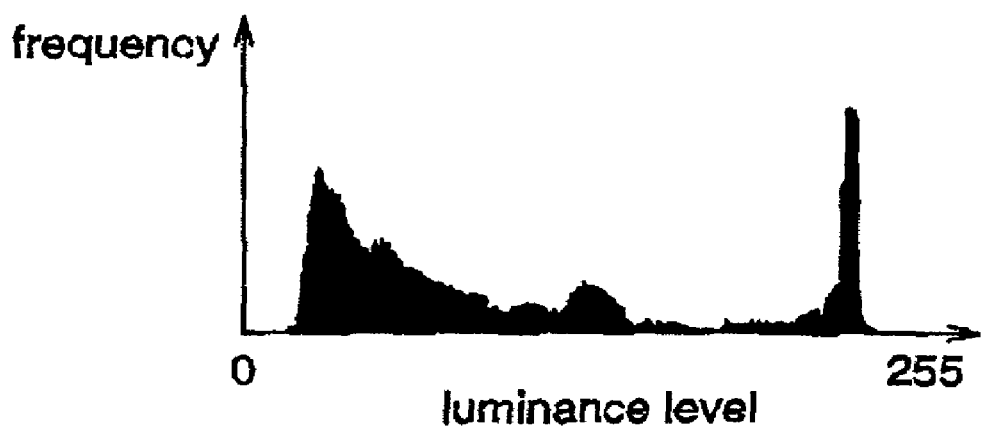

FIGS. 2(a) and 2(b) show examples of luminance histograms formed by the luminance distribution formation circuit 104. FIG. 2(a) shows a luminance histogram of a forward-lighted image, and FIG. 2(b) shows a luminance histogram of a back-lighted image. As is evident from FIG. 2(b), the luminance histogram of the back-lighted image has peaks at the low-luminance side and the high-luminance side, respectively.

In the center-of-gravity calculation circuit 105, the luminance histogram is divided into two equal areas at the center luminance level of the input luminance level axis, and the area on the low-luminance side is regarded as a low-luminance part while the area on the high-luminance side is regarded as a high-luminance part, and then the center of gravity of the low-luminance part is calculated. Assuming that each tone is i and the frequency of each tone is Y[i], the center of gravity G is calculated by formula (4) as follows.

$$G = \sum_{i=0}^{127} (Y[i] * i) \Big/ \sum_{i=0}^{127} Y[i] \quad (4)$$

The distribution range calculation circuit 106 calculates a maximum value and a minimum value on the input luminance level axis of the luminance histogram which is formed by the luminance distribution formation circuit 104. The maximum value and the minimum value become a maximum luminance level and a minimum luminance level after expanding the luminance distribution to improve the contrast in the correction process.

The maximum and minimum luminance values may be obtained, not from the both ends of the luminance distribution, but from a little inner sides from the both ends, to avoid influences of noises. In this case, the maximum value can be obtained as follows. The number of pixels for every tone is accumulated from the high-luminance side of the luminance histogram, and the maximum value is calculated from a tone at which the accumulated value exceeds, for example, 0.5% of the number of pixels. Likewise, the minimum value can be obtained as follows. The number of pixels for each tone is accumulated from the low-luminance side, and the minimum value is calculated from a tone at which the accumulated value exceeds 0.5% of the number of pixels.

Next, a luminance conversion table is formed by using the center of gravity calculated by the center-of-gravity calculation circuit 105, the maximum and minimum values calculated by the distribution range calculation circuit 106, and the target value which has previously been stored in the target value storage circuit 107. This luminance conversion table is used for expanding the luminance distribution and, simultaneously, performing tone correction so that the center of gravity of the low-luminance part of the expanded luminance histogram matches the target value.

Figure 3A:
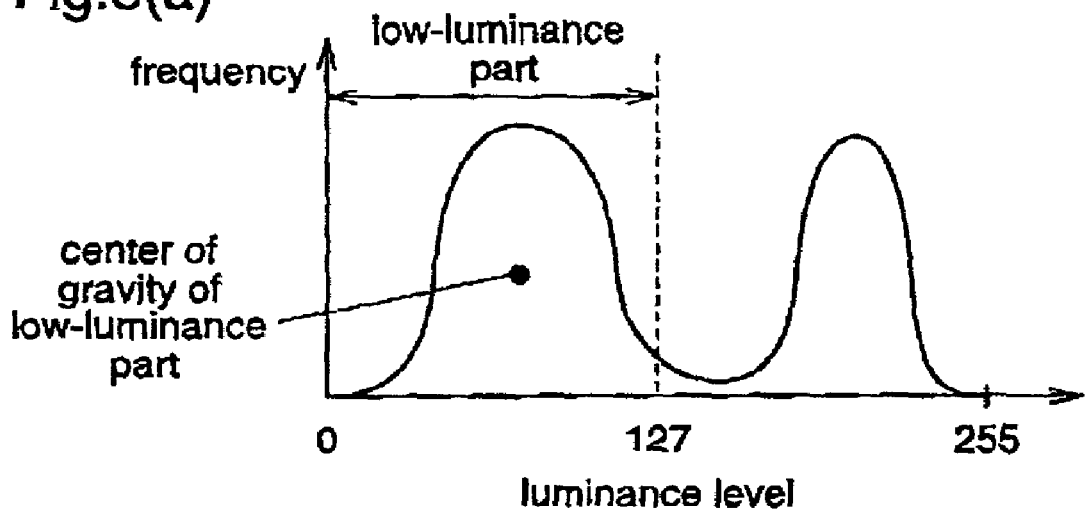
FIGS. 3(a)–3(c) are diagrams for explaining a tone correcting process according to the first embodiment.
Figure 3B:
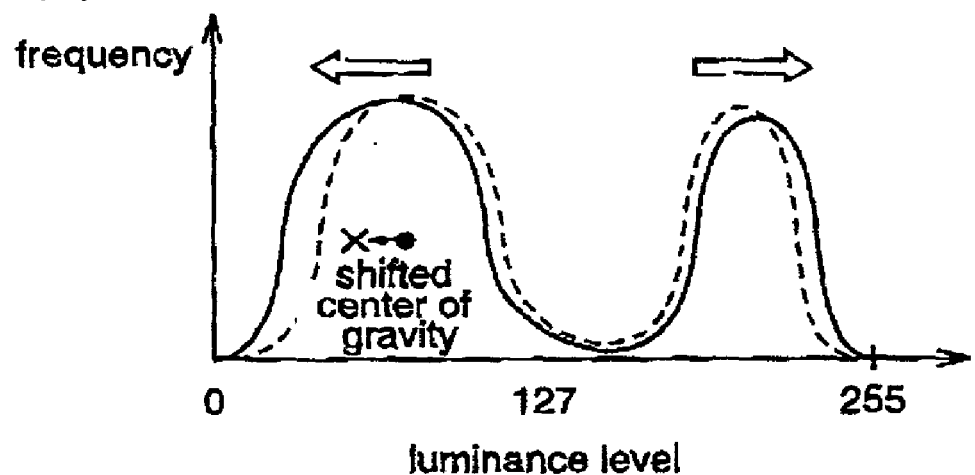
Figure 3C:
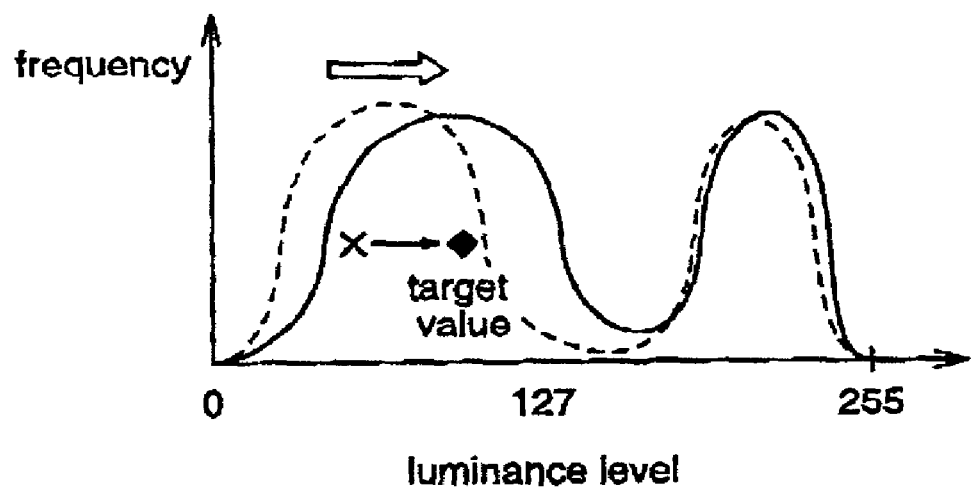

FIGS. 3(a)–3(c) are diagrams for explaining the tone correcting process. More specifically, FIG. 3(a) shows a luminance histogram of a back-lighted image, FIG. 3(b) shows a luminance histogram which is corrected so as to expand the luminance distribution of FIG. 3(a), and FIG. 3(c) is a luminance histogram which is corrected so that the center of gravity of the low-luminance part of the expanded luminance histogram matches the target value.

Figure 4A:
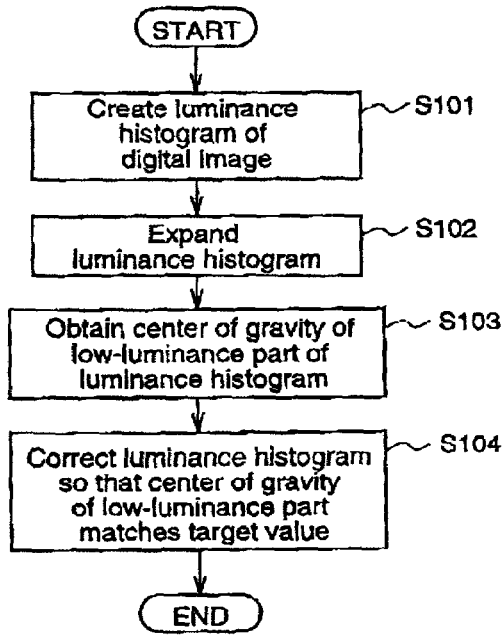
FIGS. 4(a) and 4(b) are flowcharts illustrating a tone correcting process and its principle according to the first embodiment, respectively.

Furthermore, FIG. 4(a) is a flowchart illustrating the principle of the tone correcting process.

Initially, a luminance histogram is formed from an input image shown in FIG. 3(a) (step S101), and the whole luminance distribution of the luminance histogram is extended over all tones as shown in FIG. 3(b) (step S102). Thereby, the contrast of the input image as a whole is improved.

Next, in the image the contrast of which is improved as shown in FIG. 3(b), the center of gravity of the low-luminance part, which has been shifted from the center of gravity of the low-luminance part shown in FIG. 3(a) due to expansion of the luminance distribution, is obtained (step S103). Then, tone correction is carried out so that the center of gravity of the low-luminance part, which has been shifted due to expansion of the luminance distribution, is brought to the target value as shown in FIG. 3(c) (step S104). Thereby, the luminance value of the low-luminance part is corrected to the target luminance value, and the brightness of the whole image is optimized.

As a result of these two processes, the input image is brightly corrected so that the low-luminance region in the back-lighted state matches the target luminance value, and the contrast of the whole image is improved.

In the process of expanding the luminance distribution, each luminance level is converted so that the minimum value and maximum value calculated by the distribution range calculation circuit 106 become the minimum luminance level "0" and the maximum luminance level "255", respectively. Assuming that the input luminance level is Yin, and the minimum value and maximum value of the luminance distribution are Ymin and Ymax, respectively, an output luminance level Yout is calculated by formula (5) as follows.

$$Yout = (Yin - Ymin) \times 255 / (Ymax - Ymin) \quad (5)$$

The process of correcting the luminance histogram so that the center of gravity of the low-luminance part matches the target value, can be executed by γ correction. In γ correction, tones are corrected according to a γ correction function, with reference to the histogram. Assuming that the original tone is Y1, corrected tone Y2 is represented by formula (6) as follows.

$$Y2 = 255 \times (Y1/255)^{\frac{1}{\gamma}} \quad (6)$$

Accordingly, a γ value, with which the center of gravity of the low-luminance part of the luminance histogram is converted to the target value, is calculated in formula (6), and the above-mentioned conversion is performed on all tones using a γ correction function having the γ value, whereby the center of gravity of the low-luminance part of the luminance histogram matches the target value.

In this case, since tone correction is carried out so that the center of gravity of the low-luminance part of the luminance distribution which is corrected by formula (5) matches the target value, when the center of gravity calculated by the center-of-gravity calculation circuit 105 is indicated by G and the target value stored in the target value storage circuit 107 is indicated by g, a γ value that satisfies the following formula (7) should be calculated.

$$g = 255 \times ((G - Y\min)/(Y\max - Y\min))^{\frac{1}{\gamma}} \quad (7)$$

In the correction process according to formulae (5) and (6), in order to increase the computation speed, 256 conversion tables as many as the number of tones is formed in advance, and the actual image data are converted with reference to these tables.

However, when the calculation of formula (5) and the calculation of formula (6) are carried out separately, since the tones are integral values ranging from "0" to "255", errors occurs in the decimal level. So the calculations of formulae (5) and (6) are simultaneously carried out to remove such errors in the decimal level.

The correction table formation circuit 108 forms a luminance conversion table which performs, simultaneously, the process of expanding the luminance distribution, and the process of converting the luminance histogram so that the center of gravity of the low-luminance part of the luminance histogram matches the target value.

Thereby, a luminance distribution expansion part (a conversion table for only expansion of luminance distribution), which is required when expanding a luminance distribution immediately after formation of the luminance histogram as shown in FIG. 4(a), is dispensed with, and further, the above-mentioned arithmetic errors in the decimal level are avoided.

Assuming that the γ value calculated by formula (7) is K and the input luminance level is i (i=0, 1, . . . , 255), a conversion table T[i] for expanding the luminance distribution of the input image, and performing such conversion that the center of gravity of the low-luminance part of the expanded luminance histogram matches the target value, can be calculated by formula (8) as follows.

$$T[i] = 255 \times ((i - Y\min)/(Y\max - Y\min))^{\frac{1}{K}} \quad (8)$$

Figure 15:
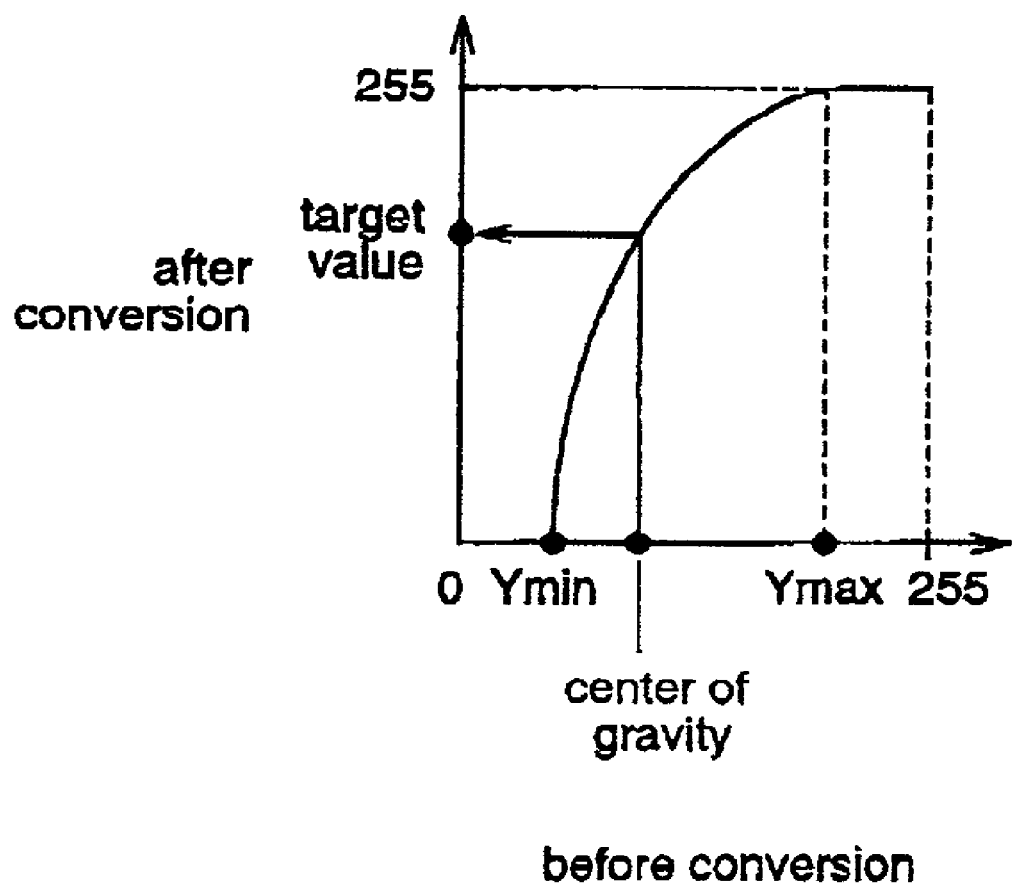
FIG. 15 is a graph illustrating a luminance conversion table.

FIG. 15 is a graph illustrating an example of a conversion property of the luminance conversion table. The luminance conversion table has such a property that maps (Ymin, Ymax) to (0, 255) so that the tone at the center of gravity of the low-luminance part of the luminance histogram matches the target tone.

Next, the image signal correction circuit 109 corrects the image luminance signal using the luminance conversion table formed by the correction table formation circuit 108, and thereafter, forms R, G, B signals from the image luminance signal. The R, G, B signals may be directly converted according to the luminance conversion table to perform luminance correction.

Figure 4B:
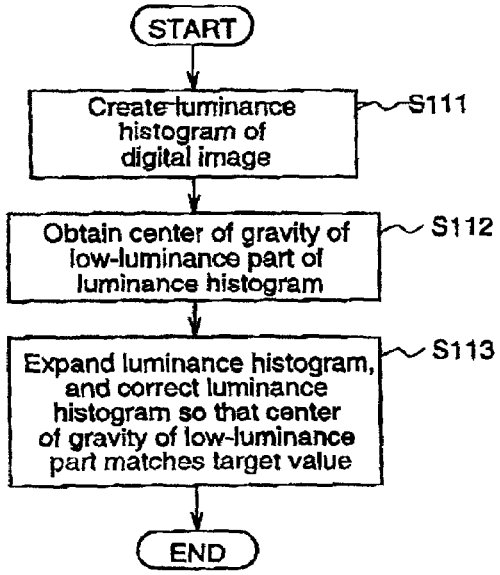

FIG. 4(b) shows a flowchart for explaining a tone correcting process which is actually carried out by the image signal correction circuit 109 of the automatic tone correction apparatus shown in FIG. 1.

Initially, a luminance histogram of a digital image is formed (step S111), and the center of gravity of a low-luminance part of this luminance histogram is obtained before expanding the luminance distribution (step S112). Next, in step S113, a correction table for expanding the luminance distribution of the luminance histogram and, simultaneously, correcting the luminance distribution of the luminance histogram so that the center of gravity of the low-luminance part of the expanded luminance histogram matches a target value, is formed, and thereafter, expansion of the luminance histogram and correction of the luminance distribution to match the center of gravity of the low-luminance part to the target value are simultaneously carried out using the correction table.

As described above, the center of gravity of the low-luminance part of the luminance histogram, and the maximum and minimum values of the luminance distribution are calculated, and the luminance distribution is expanded and, simultaneously, tone correction is carried out so that the center of gravity of the low-luminance part of the luminance histogram matches the pre-stored target value. Therefore, a back-lighted image can be brightly corrected so that the low-luminance area in the back-lighted state has a target luminance value, thereby obtaining an image the whole contrast of which is improved. Furthermore, even a forward-lighted image can be corrected so that the luminance value of the low-luminance area of the image matches a target value, resulting in an image the whole contrast of which is improved.

When a target value is stored in the target value storage circuit 107, an optimum target value must be set for every input image. In this case, an inappropriate target value might be set by mistake. This problem can be solved by putting a restriction on the γ value of the γ correction function which is used when forming the luminance conversion table by the correction table formation circuit 108. For example, the γ value is restricted within a range represented by formula (9) as follows (corresponding to claim 2).

$$0.65 \leq \gamma \leq 1.0 \quad (9)$$

In this way, the strength of correction is restricted by putting a restriction on the γ value, whereby the property of the original image is prevented from being damaged significantly even when the target value is not an optimum value to the input image.

Figure 5:
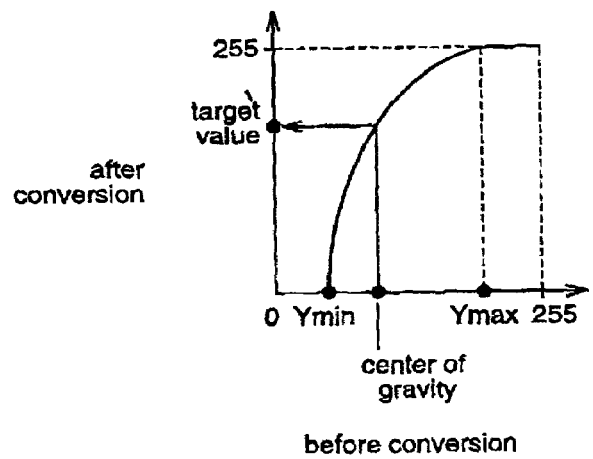
FIG. 5 is a graph in which a correction table is set with a straight line.

The correction table formation circuit 108 may set a correction table with a straight line, instead of the above-mentioned γ curve. FIG. 5 shows a correction table that is set with a straight line, in which the minimum value and maximum value of the luminance distribution, which are calculated by the distribution range calculation circuit 106, become the minimum luminance level "0" and the maximum luminance level "255", respectively, and the tone at the center of gravity of the low-luminance part of the luminance histogram matches the target tone. By setting the correction table with a straight line, the computational complexity is significantly reduced.

Figure 6A:
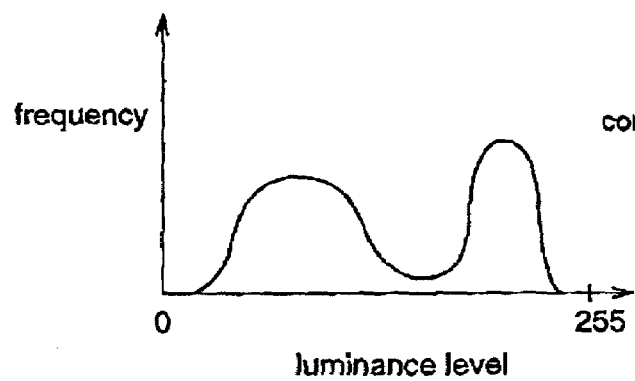
FIGS. 6(a) and 6(b) are diagrams for explaining setting of a correction table according to the frequency of distribution of a luminance histogram.
Figure 6B:
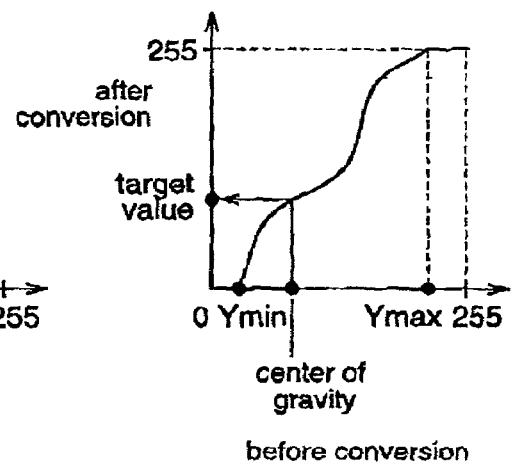

Furthermore, the tones between the three points, i.e., the minimum value and maximum value calculated by the distribution range calculation circuit 106 and the center of gravity of the low-luminance part, may be set according to the frequency of the distribution of the luminance histogram. To be specific, referring to the frequency of the luminance histogram, more tones are assigned to an area having a larger frequency. An example is shown in FIGS. 6(a) and 6(b). For a luminance histogram as shown in FIG. 6(a), a correction table as shown in FIG. 6(b) is formed.

In this way, by forming a correction table according to the frequency of the luminance histogram, more tones can be assigned to an area having many tones in the image.

Furthermore, in the luminance distribution formation circuit 104, a restriction may be put on the amount of accumulation of luminance distribution. That is, a threshold value is set, and accumulation is stopped when this threshold value is exceeded. For example, the threshold value can be calculated from the sum of sample points as follows.

$$\text{threshold value} = \text{total number of counts}/80 \quad (10)$$

By previously setting a restriction on the luminance histogram, the amount of correction can be accurately calculated even when there is an extreme deviation such that the tone distribution concentrates on a certain tone, for example, when a background of a back-lighted image or the like occurs halation and thus the luminance level concentrates on "255".

Figure 7A:
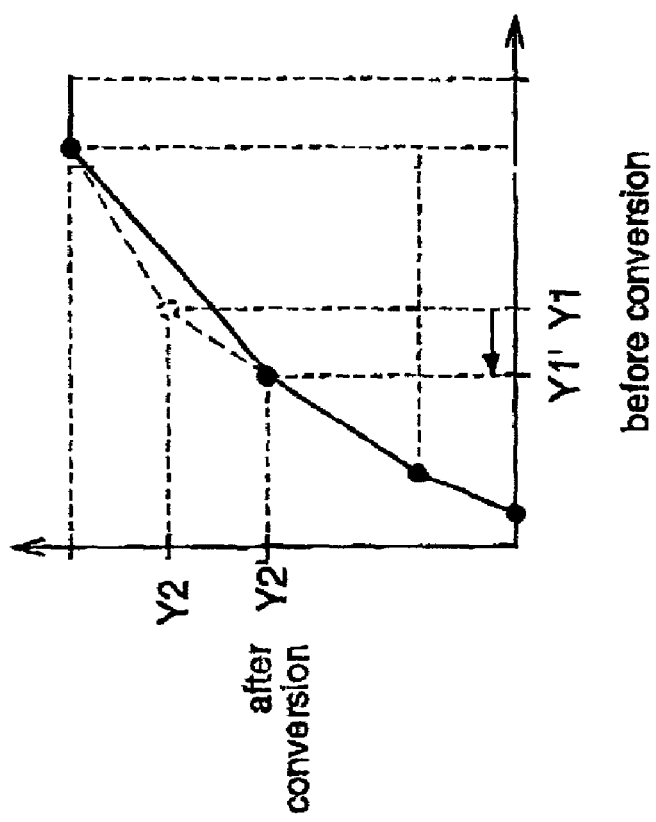
FIGS. 7(a) and 7(b) are diagrams for explaining calculation of an amount of correction in a high-luminance part according to the center of gravity of the high-luminance part.
Figure 7B:
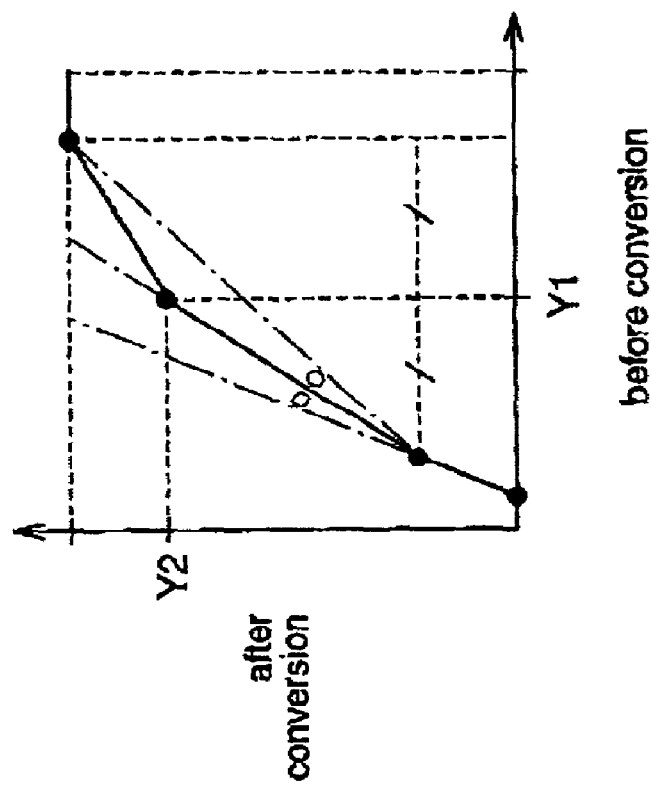

Furthermore, the center of gravity of the high-luminance part is calculated from the luminance histogram, and an amount of correction of the high-luminance part may be calculated according to the center of gravity of the high-luminance part (corresponding to claim 23). An example is shown in FIG. 7. It is assumed that Ymin and Ymax are the minimum value and the maximum value of the luminance distribution described above, respectively. Initially, a straight line, which divides an interior angle formed between a straight line connecting the Ymin and the center of gravity of the low-luminance part and a straight line connecting the center of gravity of the low-luminance part and the Ymax into two parts, is set. Then, an input value of a correction point is set at a middle point (Y1) between the center of gravity of the low-luminance part and the Ymax, and an output or the Y1 on the line dividing the interior angle into two parts is set at an output value (Y2) of the correction point (refer to FIG. 7(a)). Thereby, a difference in gradients between the inflection points can be reduced. However, when the input image is bright, halation of the high-luminance part may occur. In order to solve this problem, as shown in FIG. 7(b), the input value Y1 is shifted toward the low-luminance side (Y1') as the center of gravity of the high-luminance part gets closer to the maximum tone, and an output of the input value Y1' on the line that divides the interior angle into two parts is set as an output value Y2' of the correction point (refer to FIG. 7(b)) Thereby, halation of the high-luminance part is prevented.

Of course, a correction table may be formed according to a correction point which is set so that the center of gravity of the high-luminance part matches a predetermined target value of the high-luminance part, in like manner as described for correction of the low-luminance part. This is shown in FIG. 8.

Figure 8:
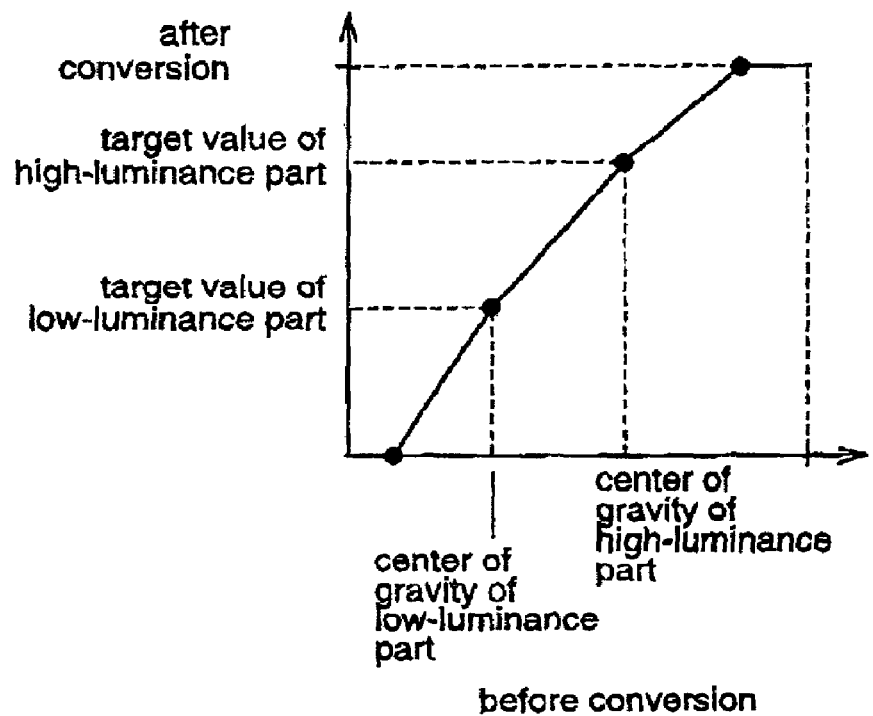
FIG. 8 is a graph illustrating a correction table for matching the center of gravity of the low-luminance part to a target value.

Although the correction table shown in FIG. 8 is set by a straight line, correction points, which are calculated as described above, may be set according to a curve or the frequency of the luminance histogram.

Furthermore, a skin-color region is extracted from color-difference signals and a luminance signal and, when a luminance histogram is formed, the luminance distribution of the skin-color region may be added to the luminance distribution of the whole image according to the area of the skin-color region (corresponding to claim 21).

Figure 10:
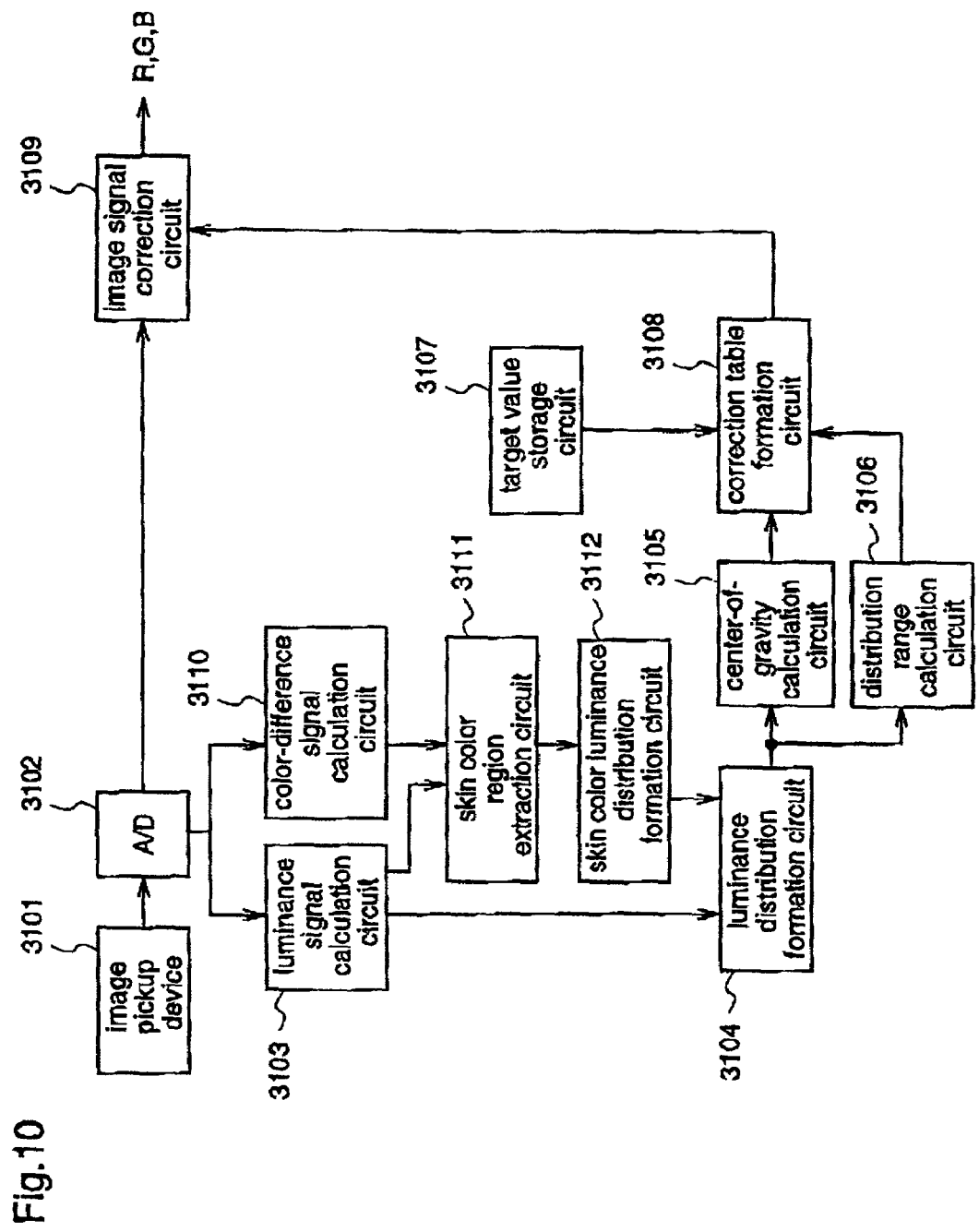
FIG. 10 is a block diagram illustrating an automatic tone correction apparatus as defined in claim 21.

The construction of an automatic tone correction apparatus at this time is shown in FIG. 10.

In FIG. 10, reference numeral 3101 denotes an image pickup device for light-to-electricity converting a shot image; reference numeral 3102 denotes an A/D converter to which an analog image signal is supplied from the image pickup device 3101; reference numeral 3103 denotes a luminance signal calculation circuit to which a digital image signal is supplied from the A/D converter 3102; reference numeral 3104 denotes a luminance distribution formation circuit to which a luminance signal is supplied from the luminance signal calculation circuit 3103, and a skin-color luminance distribution is supplied from a skin-color distribution formation circuit 3112 which is described later; reference numeral 3105 denotes a center-of-gravity calculation circuit to which a luminance distribution is supplied from the luminance distribution formation circuit 3104; reference numeral 3106 denotes a distribution range calculation circuit to which the luminance distribution is supplied from the luminance distribution formation circuit 3104; reference numeral 3107 denotes a target value storage circuit for holding a target value to be a goal in performing tone correction; reference numeral 3108 denotes a correction table formation circuit for forming a correction table for tone correction on the basis of the center of gravity outputted from the center-of-gravity calculation circuit 3105, the maximum value and minimum value of the distribution range outputted from the distribution range calculation circuit 3106, and the target value outputted from the target value storage circuit 3107; reference numeral 3109 denotes an image signal correction circuit for performing tone correction on the digital image signal outputted from the A/D converter 3102, on the basis of the correction table formed by the correction table formation circuit 3108; reference numeral 3110 denotes a color-difference signal calculation circuit to which the digital image signal is supplied the A/D converter 3102; reference numeral 3111 denotes a skin-color region extraction circuit (skin-color region extraction unit) to which the luminance signal and the color-difference signal are supplied from the luminance signal calculation circuit 3103 and the color-difference signal calculation circuit 3110, respectively; and reference numeral 3112 denotes a skin-color distribution formation circuit to which a luminance signal of a skin-color region is supplied from the skin-color region extraction circuit 3111.

Next, the operation will be described. The fundamental operation of the apparatus shown in FIG. 10 is identical to the operation of the apparatus shown in FIG. 1, except that the apparatus of FIG. 10 is provided with the color-difference signal calculation circuit 3110, the skin-color region calculation circuit 3111, and the skin-color luminance distribution formation circuit 3112, and a skin-color region is extracted from color-difference signals and a luminance signal, and when a luminance histogram is formed, the luminance distribution of the skin-color region is added to the luminance distribution of the whole image according to the area of the skin-color region.

The color-difference signal calculation circuit 3110 calculates color-difference signals Cr and Cb, on the basis of formulae (11) and (12) as follows.

$$Cr32\ 0.500 \times R - 0.419 \times G - 0.081 \times B \quad (11)$$

$$Cb = -0.169 \times R - 0.331 \times G - 0.500 \times B \quad (12)$$

The skin-color region extraction circuit 3111 extracts a skin-color region in the input image. The skin-color region extraction circuit 3111 is previously provided with ranges of the color-difference signals and the luminance signal corresponding to the skin-color region. When the color-difference signals and the luminance signal of the input signal are within the skin-color region, pixels in this region are regarded as skin-color.

Hereinafter, a skin-color region will be described with reference to FIG. 11.

Figure 11A:
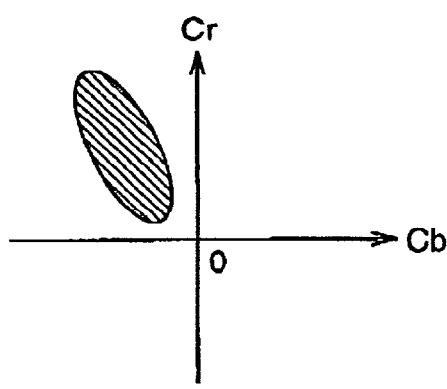
FIGS. 11(a) and 11(b) are diagrams illustrating skin color regions.
Figure 11B:
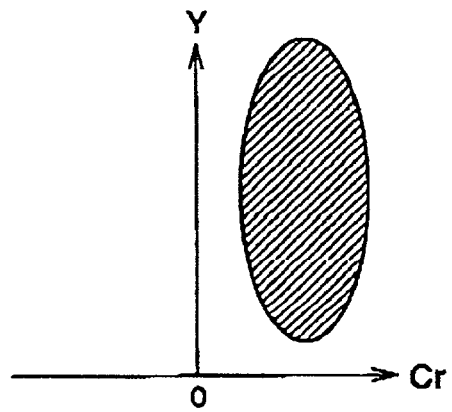

FIG. 11(a) shows a distribution of skin color on the axes of the color-difference signal Cr and Cb, and a hatched region is a skin-color region. It can be seen that the skin color is distributed in a specific region of the color difference signals. FIG. 11(b) shows a distribution of skin color on the Cr axis and the luminance axis. Also in FIG. 11(b), the skin color is distributed in a specific region. The regions shown in FIGS. 11(a) and 11(b) are previously stored, and it is judged whether the input signal is skin color or not. That is, when the color-difference signals and the luminance signal of the input signal are positioned within the skin color region, pixels in this region are judged as skin-color. The judgement may be performed with only the color-difference signals to simplify the processing.

Figure 12A:
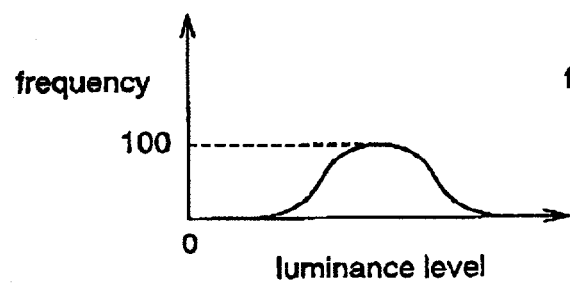
FIGS. 12(a)–12(c) are diagrams for explaining application of a weight on a skin color luminance histogram.
Figure 12B:
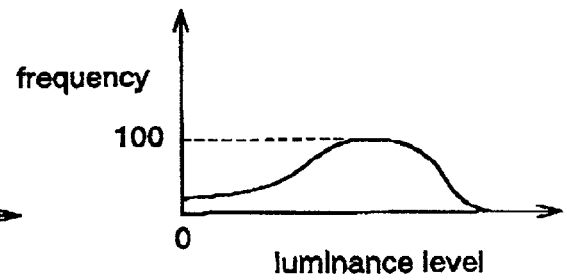
Figure 12C:
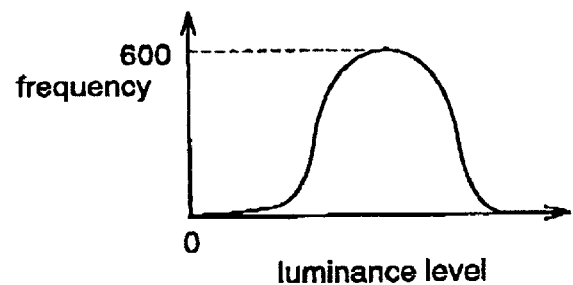

When the skin color region extraction circuit 3111 judges that the input pixels are skin color, the skin color luminance distribution formation circuit 3112 forms a luminance distribution of the skin color region. FIG. 12(a) shows an example of a skin color region luminance distribution so formed. When the luminance distribution of the whole image is as shown in FIG. 12(b), the distribution (number of pixels) at each tone of the luminance distribution shown in FIG. 12(a) which is the luminance distribution of the skin-color region is added to the distribution at each tone of the whole luminance distribution shown in FIG. 12(b), whereby the luminance data in the skin color region is weighted. When performing the addition, the luminance distribution of the skin-color region is weighted. The reason is as follows. Since the ratio of the skin-color region to the whole image is small, if the distribution of the skin-color region is added as it is, the luminance distribution of the skin-color region cannot be reflected onto the tone correcting process. The weighting realizes tone correction with the skin-color region being optimized. The weighting can be performed by multiplying the luminance distribution of the skin-color region by a coefficient. For example, the luminance distribution of the skin-color region which is multiplied by 5 is added. FIG. 12(c) shows the luminance distribution obtained by the above-mentioned weighting.

Figure 13:
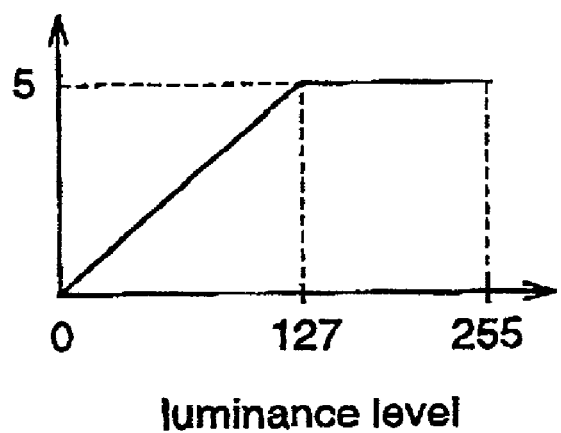
FIG. 13 is a graph illustrating a weight value on the high-luminance part.

In the luminance distribution of the skin-color region, the distribution in the high-luminance part may be weighted (corresponding to claim 22). For example, the luminance distribution of the skin-color region is multiplied by a coefficient as shown in FIG. 13 to weight the high-luminance part. Thereby, halation of skin color, which is visually conspicuous, is avoided.

Figure 9:
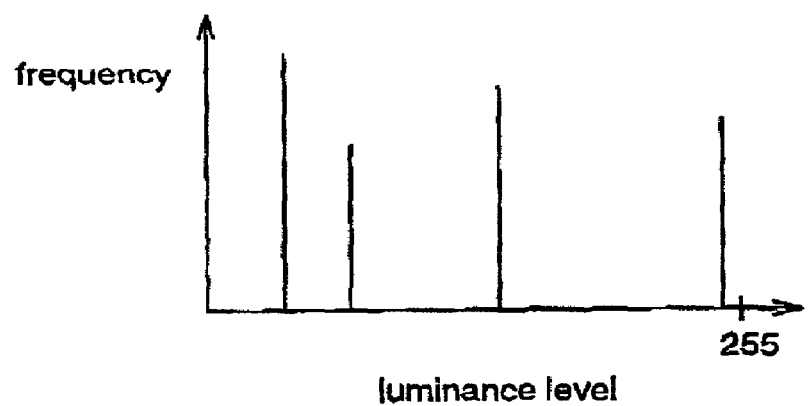
FIG. 9 is a diagram illustrating a discrete histogram.

Further, when the luminance distribution formed by the luminance distribution formation circuit 104 is discrete, tone correction is not carried out (corresponding to claim 24). An example of luminance distribution in this case is shown in FIG. 9. When the luminance distribution is discrete, the input image can be judged as an artificial image, not a natural image. When an artificial image is inputted, it is better not to perform tone correction.

Although, in the above description, tone correction is performed on the R, G, B signals, it may be performed on a luminance signal after separating an input digital image signal into the luminance signal and color-difference signals. In this case, however, tone correction may cause a phenomenon in which the saturation appears degraded. So, as described in claim 25, the color-difference signals of the image may be corrected according to the correction table. Thereby, when R, G, B signals are formed from the luminance signal and the color-difference signals which have been subjected to tone correction, a phenomenon, in which the saturation appears degraded due to luminance correction, is suppressed.

Figure 14:
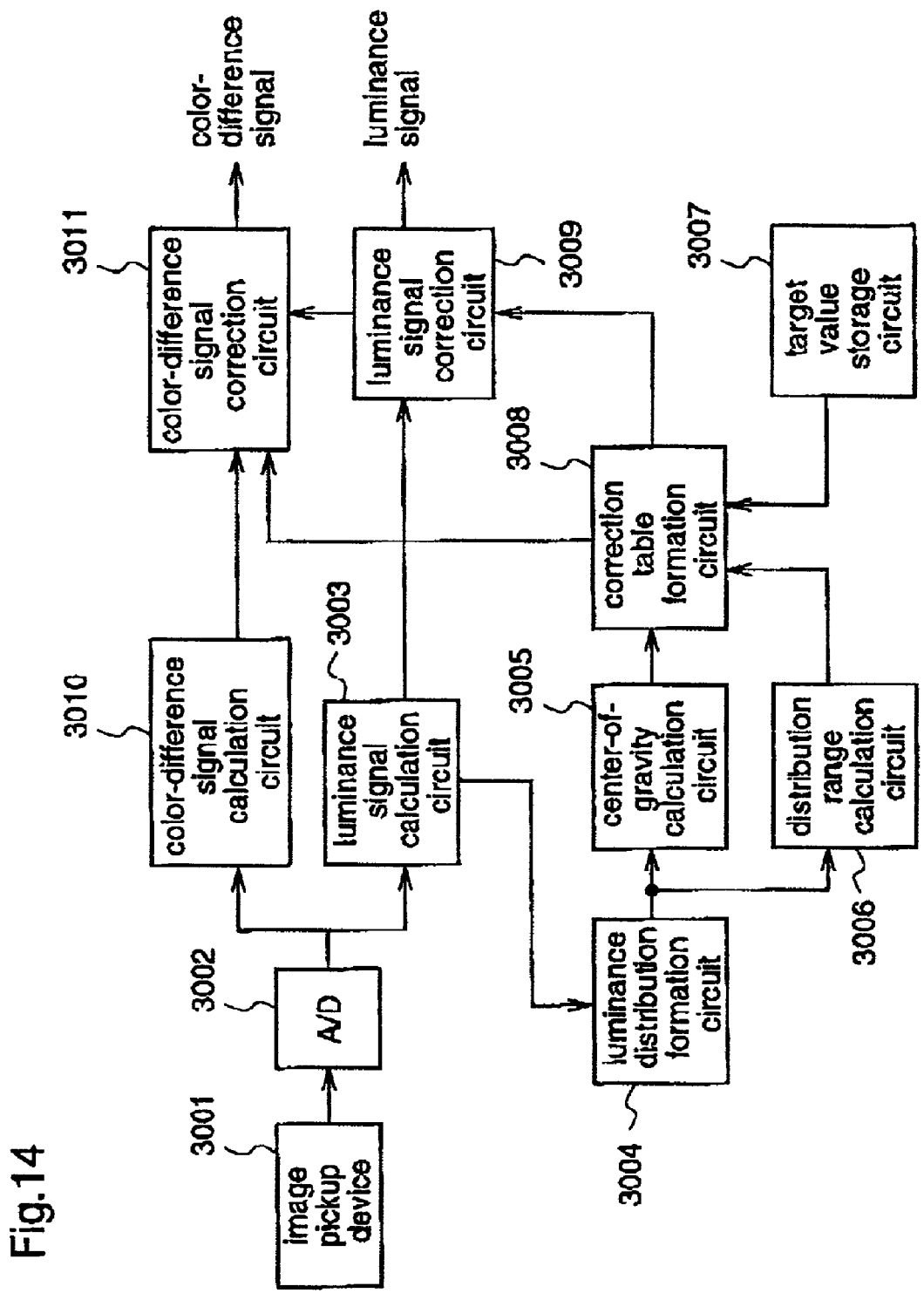
FIG. 14 is a block diagram illustrating an automatic tone correction apparatus as defined in claim 25.

FIG. 14 is a block diagram illustrating the construction of an automatic tone correction apparatus in this case. In FIG. 14, reference numeral 3001 denotes an image pickup device for light-to-electricity converting a shot image; reference numeral 3002 denotes an A/D converter to which an analog image signal is supplied from the image pickup device 3001; reference numeral 3003 denotes a luminance signal calculation circuit to which a digital image signal is supplied from the A/D converter 3002; reference numeral 3004 denotes a luminance distribution formation circuit to which a luminance signal is supplied from the luminance signal calculation circuit 3003; reference numeral 3005 denotes a center-of-gravity calculation circuit to which a luminance distribution is supplied from the luminance distribution formation circuit 3004; reference numeral 3006 denotes a distribution range calculation circuit to which the luminance distribution is supplied from the luminance distribution formation circuit 3004; reference numeral 3007 denotes a target value storage circuit for holding a target value to be a goal in performing tone correction; reference numeral 3008 denotes a correction table formation circuit for forming a correction table for tone correction on the basis of the center of gravity outputted from the center-of-gravity calculation circuit 3005, the maximum value and minimum value of the distribution range outputted from the distribution range calculation circuit 3006, and the target value outputted from the target value storage circuit 3007, reference numeral 3009 denotes an image signal correction circuit for performing tone correction on the digital image signal outputted from the A/D converter 3002, on the basis of the correction table formed by the correction table formation circuit 3008; reference numeral 3010 denotes a color-difference signal calculation circuit to which the digital image signal is supplied the A/D converter 3002; and reference numeral 3011 is a color-difference signal correction circuit for calculating a color-difference gain value on the basis of the correction table formed by the correction table formation circuit 3008, and correcting color-difference signals outputted from the color-difference signal calculation circuit 3010.

Next the operation will be described. The fundamental operation of the apparatus shown in FIG. 14 is identical to the operation of the apparatus shown in FIG. 1, except that the apparatus of FIG. 14 is provided with the luminance signal correction circuit 3009, the color-difference signal calculation circuit 3010, and the color-difference signal correction circuit 3011, and tone correction is performed on the luminance signal while the color-difference signals are corrected by calculating a color-difference gain value on the basis of the correction table and multiplying the color-difference signals by the gain value.

The color-difference signal calculation circuit 3010 calculates color-difference signals Cr and Cb by the above-described formulae (11) and (12).

The luminance signal correction circuit 3009 performs tone correction on the luminance signal with reference to the correction table which is formed by the correction table formation circuit 3008, in the same manner as described for the image signal correction circuit 109.

Assuming that the color-difference signals are Cr and Cb, the input luminance level is i, the output value of the correction table according to the input luminance level is Table [i], and the gain value of each color-difference signal is Cg, the color-difference signal correction circuit 3011 calculates the gain value G and performs color-difference correction by using formulae (13), (14), (15), and (16) as follows.

$$Cg=(Table[i]-i)/30\times0.2+1.0(Table[i]\geq i) \quad (13)$$

$$Cg=1.0 \ (Table[i]<i) \quad (14)$$

$$Cr=Cr\times Cg \quad (15)$$

$$Cb=Cb\times Cg \quad (16)$$

However, these formulae are merely examples, and formulae to be employed are not restricted to them. For example, when the color-difference signals Cr and Cb are multiplied by the gain value, if the Cr reaches the maximum level of the color-difference signal, the Cr is clipped at the maximum level, while the Cb is multiplied by the gain as it is and thus its color phase changes. At this time, the Cg is adjusted so that the Cr does not exceed the maximum level of the color-difference signal, and the Cb is multiplied by the adjusted Cg, whereby the change in the color phase can be suppressed.

Furthermore, target values may be previously set according to the possible positions of the center of gravity of the low-luminance part of the luminance histogram, and stored in the target value storage circuit 107, whereby a work of setting a target value for every input image is dispensed with (corresponding to claim 3).

When the strength of correction is restricted by setting a target value for every possible range of the center of gravity, even if the target value is not optimum to the input image, the property of the original image is prevented from being damaged significantly.

Furthermore, the correction table formation circuit 108 in the automatic tone correction apparatus according to any of claims 1 to 3 may create a conversion table by which expansion of the luminance distribution is performed on only the low-luminance side while expansion of the luminance distribution on the high-luminance side is performed during the process of performing correction so as to match the center of gravity of the low-luminance part of the luminance histogram to the target value, whereby the tone of the high-luminance part is prevented from being collapsed due to tone correction (corresponding to claim 16).

The effect of preventing collapse of tone will be described in more detail with reference to FIGS. 16(a) and 16(b). FIG. 16(a) shows a case where the luminance distribution is expanded over all tones, and the luminance histogram is corrected so that the center of gravity of the low-luminance part of the luminance histogram matches the target value, and FIG. 16(b) shows a case where only the luminance distribution on the low-luminance side is expanded, and the luminance histogram is corrected so that the center of gravity of the low-luminance part of the luminance histogram matches the target value.

In FIG. 16(a), the luminance distribution is expanded over all tones, and the luminance histogram is corrected so that the center of gravity of the low-luminance part of the luminance histogram matches the target value, whereby the luminance distribution is twice compressed toward the higher-luminance side, resulting in collapse of the high-luminance part.

In FIG. 16(b), however, since the luminance distribution is compressed toward the high-luminance side only when the luminance histogram is corrected so that the center of gravity of the low-luminance part of the luminance histogram matches the target value, collapse of the high-luminance part is reduced as compared with that shown in FIG. 16(a).

Since, in this case, the maximum value of the luminance distribution is not necessary, only the minimum value may be calculated by the distribution range calculation circuit 106. Thereby, the amount of calculation can be reduced.

As described above, according to the first embodiment, a luminance histogram of a digital image is formed, the center of gravity of its low-luminance part is calculated, a correction table for expanding the luminance distribution of the luminance histogram and, simultaneously, correcting the luminance histogram so that the center of gravity of the low-luminance part of the distribution-expanded luminance histogram matches a target value, is formed, and then tone correction is carried out. Therefore, just once formation of a conversion table enables expansion of the luminance distribution of the luminance histogram created from the digital image signal as well as correction of the luminance histogram so that the center of gravity of the low-luminance part matches the target luminance value, whereby a back-lighted image can be brightly corrected so that the luminance value of the low-luminance area in the back-lighted state matches a target luminance value, resulting in an image the whole contrast of which is improved. Furthermore, also a forward-lighted image can be corrected so that the luminance value in the low-luminance area matches a target value, resulting in an image the whole contrast of which is improved.

In this first embodiment, the description has been given of the automatic tone correction apparatus which performs expansion of the luminance distribution simultaneously with tone correction for correcting the luminance distribution so that the center of gravity of the low-luminance part matches the target value, by using the correction table. However, an automatic tone correction method for performing processing that corresponds to the automatic tone correction apparatus is also within the scope of the invention. Furthermore, an automatic tone correction method corresponding to the flowchart of FIG. 4(a) which illustrates the correction principle, an automatic tone correction apparatus corresponding to this automatic tone correction method, and an automatic tone correction program storage medium for recording an automatic tone correction program which makes a computer perform the automatic tone correction method, on various recording mediums, are also within the scope of the invention. Also in these cases, the same effects as achieved by the above-described automatic tone correction apparatus can be realized although expansion of the luminance distribution and tone correction cannot be performed simultaneously.

[Embodiment 2]

Hereinafter, a description will be given of a second embodiment of the present invention corresponding to claims 4, 5, 6, 29, 30, 31, and 52 (further, claims 16~25, 41~50, 56~63), with reference to the drawings.

In this second embodiment, not a target value but a target luminance distribution is set to perform tone correction.

Figure 17:
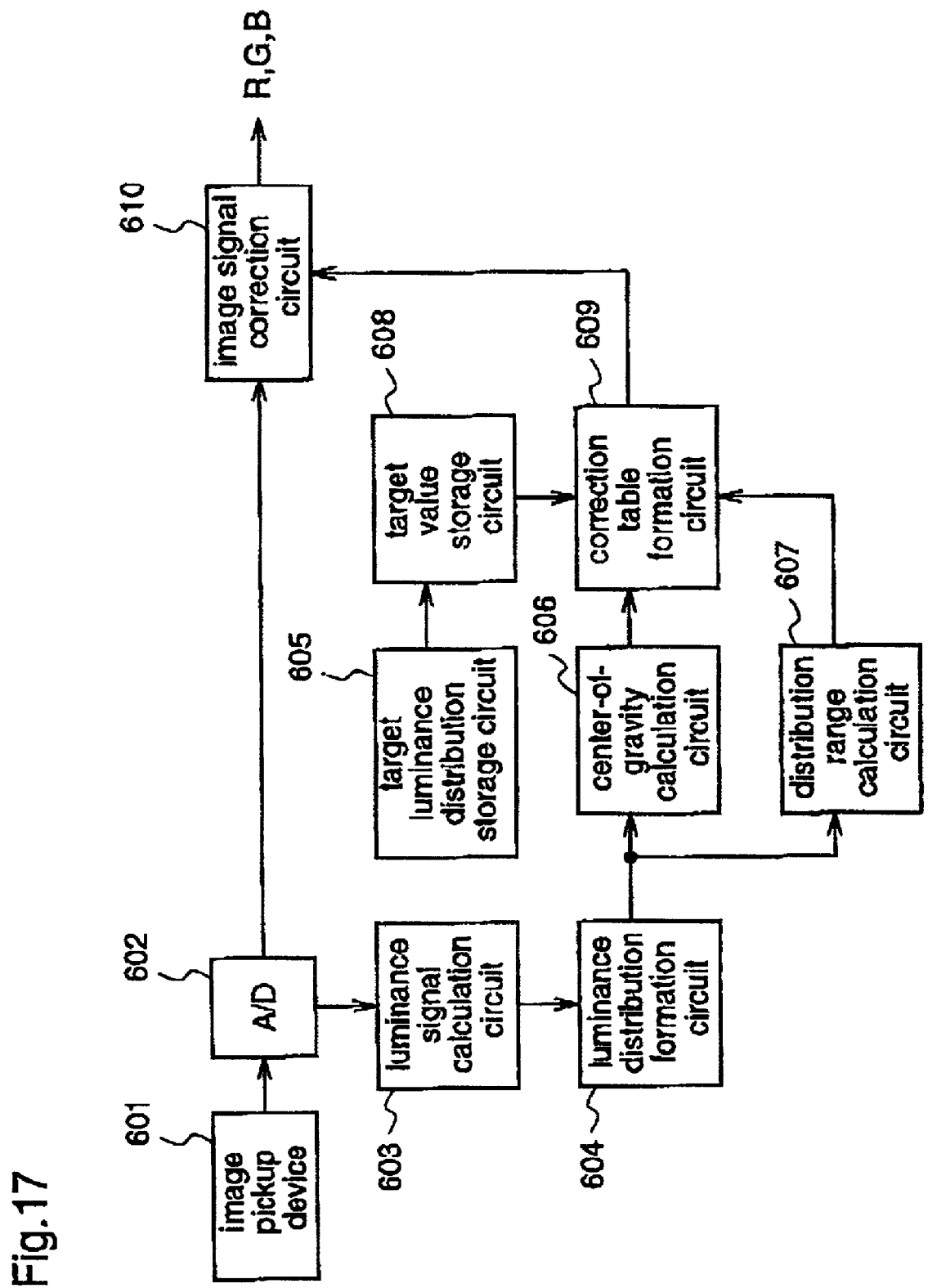
FIG. 17 is a block diagram illustrating an automatic tone correction apparatus according to a second embodiment of the present invention.

FIG. 17 is a block diagram illustrating an automatic tone correction apparatus according to the second embodiment. In FIG. 1, reference numeral 601 denotes an image pickup device for light-to-electricity converting a shot image; reference numeral 602 denotes an A/D converter to which an analog image signal is supplied from the image pickup device 601; reference numeral 603 denotes a luminance signal calculation circuit to which a digital image signal is supplied from the A/D converter 602; reference numeral 604 denotes a luminance distribution formation circuit (luminance histogram formation unit) to which a luminance signal is supplied from the luminance signal calculation circuit 603; reference numeral 605 denotes a target luminance distribution storage circuit for holding a target luminance distribution to be a goal in performing tone correction; 606 denotes a center-of-gravity calculation circuit (center-of-gravity calculation unit) to which a luminance distribution is supplied from the luminance distribution formation circuit 604; reference numeral 607 denotes a distribution range calculation circuit to which a luminance distribution is supplied from the luminance distribution formation circuit 604; reference numeral 608 denotes a target value calculation circuit (target value calculation unit) to which a target luminance distribution is supplied from the target luminance distribution storage circuit 605; reference numeral 609 denotes a correction table formation circuit for forming a correction table for tone correction, on the basis of the center of gravity supplied from the center-of-gravity calculation circuit 606, a maximum value and a minimum value of the distribution range supplied from the distribution range calculation circuit 607, and the target value supplied from the target value storage circuit 608; and reference numeral 610 denotes an image signal correction circuit for performing tone correction on the digital image signal outputted from the A/D converter 602, on the basis of the correction table formed by the correction table formation circuit 609. The correction table formation circuit 609 and the image signal correction circuit 610 constitute a tone correction section. However, when the tone correction section does not include a function of expanding the distribution of the luminance histogram, the correction table formation circuit 609 and the image signal correction circuit 610 constitute a luminance distribution expansion section as well as a tone correction section.

Next, the operation will be described. The operation of the tone correction apparatus according to this second embodiment is fundamentally identical to the operation of the apparatus according to the first embodiment, except that not a target value but a target luminance distribution is previously set in the storage circuit, and a target value is calculated using the target luminance distribution.

In the target luminance distribution storage circuit 605, a luminance histogram to be a target in tone correction is previously set, and the distribution of the luminance histogram is stored.

Figure 18A:
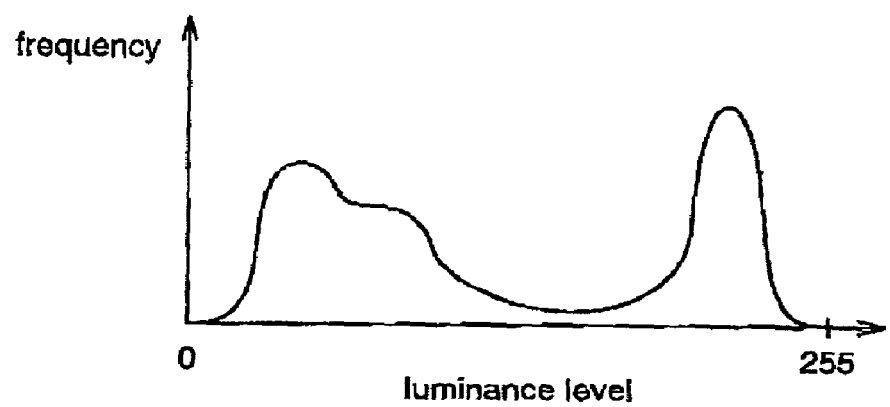
FIGS. 18(a) and 18(b) are diagrams illustrating a luminance histogram on a back-lighted image and a target luminance distribution, respectively.
Figure 18B:
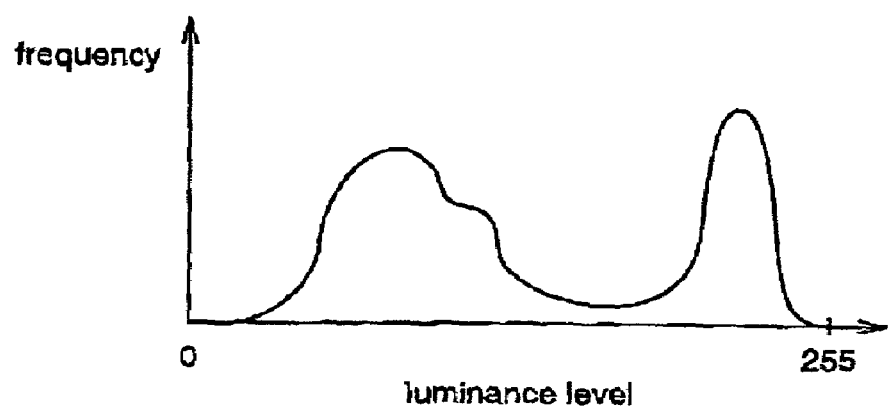

FIGS. 18(a) and 18(b) are diagrams for explaining an example of a luminance histogram to be stored in the target luminance distribution storage circuit 605. FIG. 18(a) is a luminance histogram of an input image in the back-lighted state, and FIG. 18(b) is a luminance histogram of a target image. In the luminance histogram shown in FIG. 18(b), the low-luminance part in the back-lighted state shifts toward the higher-luminance side, whereby the back-lighted state is resolved.

Next, in the target value calculation circuit 608, a target value is calculated from the target luminance distribution. To be specific, the center of gravity of the low-luminance part of the target luminance distribution stored in the target luminance distribution storage circuit 605 is calculated in like manner as calculating the center of gravity by the center-of-gravity calculation circuit 606, and this center of gravity is set as a target value (step S200 in FIG. 20). The low-luminance part in the target value calculation circuit 608 must be set within the same range as that of the low-luminance part in the center-of-gravity calculation circuit 606. In this second embodiment, the low-luminance part ranges from the tone "0" to the center tone "127".

Using the calculated target value, tone correction is carried out in the same manner as described for the first embodiment. To be specific, a luminance conversion table is formed on the basis of the center of gravity calculated by the center-of-gravity calculation circuit 606, the maximum value and minimum value calculated by the distribution range calculation circuit 607, and the target value previously calculated by the target value storage circuit 608. This luminance conversion table is used for expanding the luminance distribution and, simultaneously, performing tone correction so that the center of gravity of the low-luminance part of the luminance histogram after expansion matches the target value.

Figure 20A:
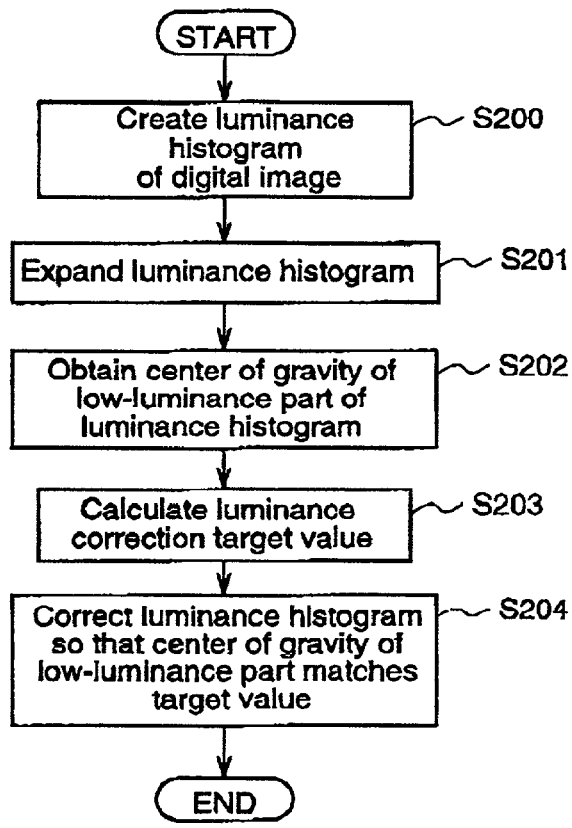
FIGS. 20(a) and 20(b) are flowcharts illustrating a tone correcting process and its principle according to the second embodiment, respectively.

FIG. 20(a) is a flowchart for explaining the principle of the tone correcting process. Initially, a luminance histogram is generated from an input image (step S200), and the whole luminance distribution of the luminance histogram so generated is expanded over all tones (step S201). Thereby, the contrast of the input image as a whole can be improved.

Next, the center of gravity of the low-luminance part of the image whose contrast is improved as shown in FIG. 18(b) is obtained (step S202). Then, a luminance correction target value is calculated from the target luminance distribution (step S203), and correction is carried out so that the center of gravity of the low-luminance part, which has been shifted due to the expansion of the luminance distribution, is brought to the target value, as shown in FIG. 18(b) (step S204). Thereby, the luminance value of the low-tone part can be corrected to the target luminance value.

As a result of these two processes, the input image is corrected so that the low-luminance region in the back-lighted state has the target luminance value, and the whole contrast of the image is improved.

Figure 20B:
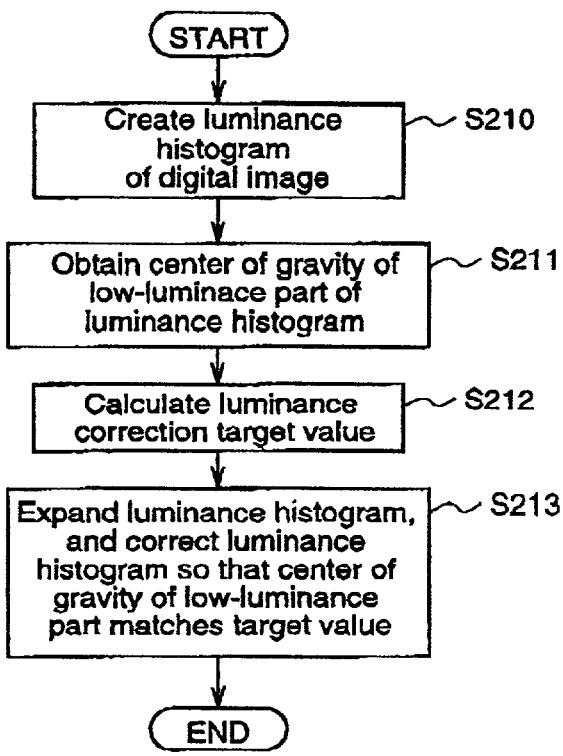

FIG. 20(b) is a flowchart for explaining a tone correcting process which is actually performed by the automatic tone correction apparatus shown in FIG. 17. Initially, a luminance histogram of a digital image is formed (step S210), and the center of gravity of a low-luminance part of this luminance histogram is obtained before expanding the luminance distribution (S211). Then, a luminance correction target value is calculated (step S212). Next, in step S213, a correction table for expanding the luminance distribution of the luminance histogram and, simultaneously, correcting the luminance distribution of the luminance histogram so that the center of gravity of the low-luminance part of the expanded luminance histogram matches a target value, is formed, and thereafter, using this correction table, expansion of the luminance histogram and correction of the luminance distribution so as to match the center of gravity of the low-luminance part to the target value are carried out simultaneously.

Thereby, a luminance distribution expansion section (i.e., a conversion table for only expansion of luminance distribution), which is required when expanding the luminance distribution of the luminance histogram immediately after formation of the histogram as shown in FIG. 20(a), becomes unnecessary. Furthermore, as described above, arithmetic errors in the decimal level can be removed.

Figure 19:
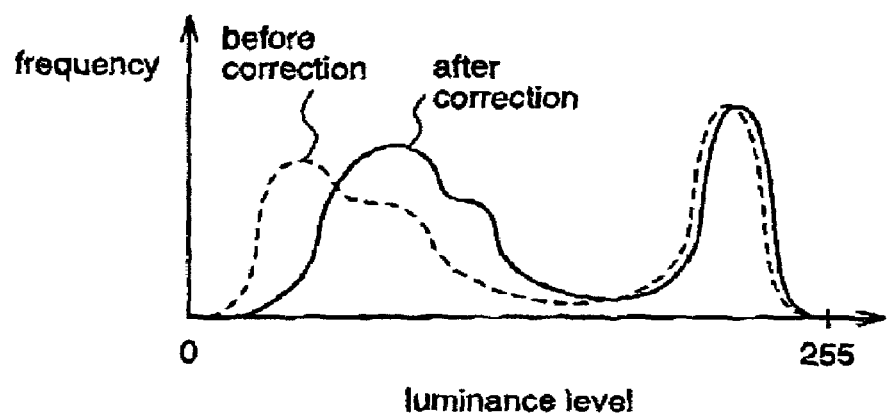
FIG. 19 is a diagram illustrating a corrected luminance histogram of the back-lighted image shown in FIG. 18(a).

FIG. 19 shows a luminance histogram of an image which is obtained by calculating a target value from the luminance histogram shown in FIG. 18(b), and performing tone correction on the input image shown in FIG. 18(a). It can be seen from FIG. 19 that the peak of the distribution of the low-luminance part shifts toward the higher-luminance side, whereby the low-luminance part is brightly corrected. Furthermore, the distribution is expanded, and the contrast is improved.

As described above, the luminance distribution of the luminance histogram generated from the input image is expanded and, simultaneously, tone correction is carried out so that the center of gravity of the low-luminance part of the luminance histogram is shifted to the target value calculated from the target luminance histogram, whereby an image having a target brightness and an enhanced contrast can be obtained.

The above-mentioned method further provides an effect as follows.

Figure 21A:
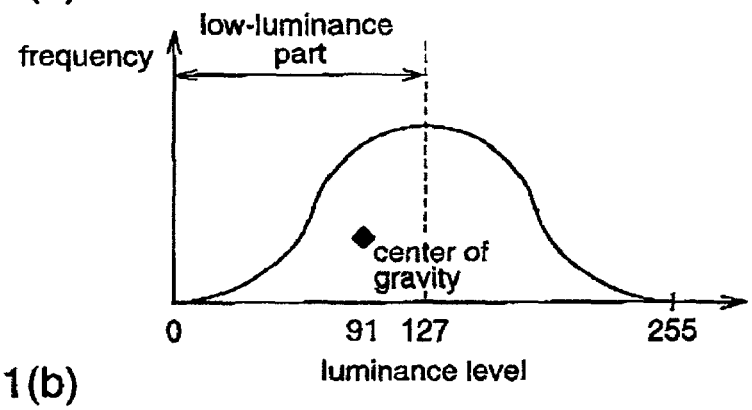
FIGS. 21(a) and 21(b) are diagrams illustrating target luminance distributions and centers of gravity in a forward-lighted image and a back-lighted image, respectively.
Figure 21B:
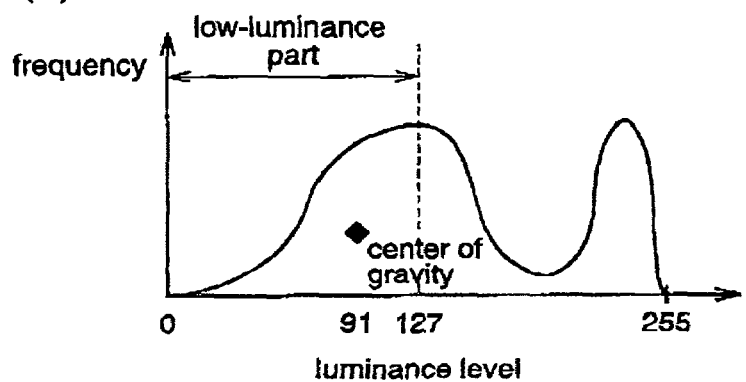

FIGS. 21(a) and 21(b) show target luminance distributions for two kinds of input images. To be specific, FIG. 21(a) is a target luminance distribution of a forward-lighted image, and FIG. 21(b) is a target luminance distribution of a back-lighted image. These images have the same shape of distribution in the low-luminance part.

For example, as a tone correction method other than the above-mentioned method using the target luminance distribution, there is a method for correcting tones so that the shape of the luminance distribution of the input image becomes identical to the shape of the target luminance distribution. In this method, since the result of correction significantly varies as the shape of distribution varies, it is necessary to provide different processes (case branching) for the forward-lighted image and the back-lighted image having different shapes of luminance histograms to set the target luminance distributions suited to their respective states as shown in FIGS. 21(a) and 21(b).

However, since the target value calculation circuit 608 of this second embodiment calculates the center of gravity of only the low-luminance part and uses the obtained center of gravity as a target value, the target values calculated from the two target luminance distributions shown in FIGS. 21(a) and 21(b) become the same value. Therefore, in the correction method according to this second embodiment, either of the two target luminance distributions provides the same correction result. Accordingly, whichever target luminance distribution may be used for tone correction.

Consequently, according to the method of this second embodiment, the same target luminance distribution can be used in tone correction for the forward-light image and the back-lighted image as long as the target luminance values of their low-luminance parts are the same. Therefore, it is not necessary to provide different processes (case branching) for plural images having different characteristics of brightness, whereby tone correction can be executed speedily.

Since tone correction can be carried out even when the shape of the luminance histogram is not identical to the shape of the target luminance distribution in the target luminance distribution storage circuit 605, the target luminance distribution may be approximated to a curve and this curve may be stored in the target luminance distribution storage circuit 605, as defined in claim 5. Then, in the target value calculation circuit 608, a luminance distribution expanding over the tones from "0" to "255" is formed from the curve, and a target value is calculated.

Figure 22A:
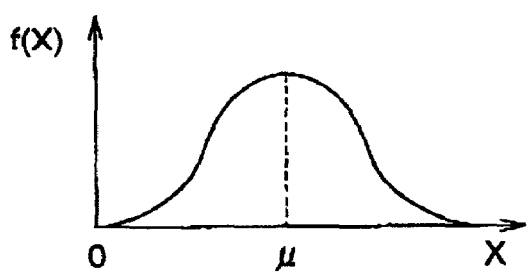
FIGS. 22(a)–22(c) are diagrams illustrating target luminance distributions represented by curves.
Figure 22B:
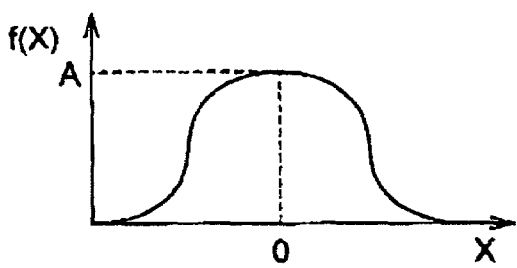
Figure 22C:
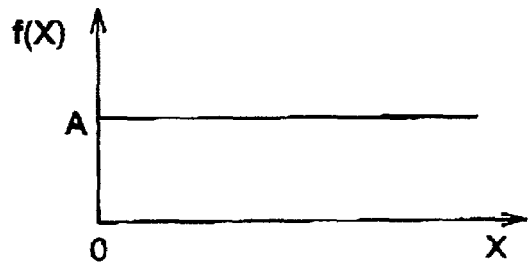

Further, since the target value relates to only the low-luminance part of the target luminance distribution, the curve to be stored in the target luminance distribution storage circuit 605 may be a normal distribution curve shown in FIG. 22(a) that is expressed by formula (17) wherein the average value is μ and the standard deviation is σ, or a cosine curve shown in FIG. 22(b) that is expressed by formula (18), or a straight line shown in FIG. 22(c) that is expressed by formula (19).

$$f(x) = \frac{1}{\sqrt{2\pi} \times \sigma} \times e^{-\frac{(x-\mu)^2}{2\sigma^2}} \quad (17)$$

$$f(x)=A \times \cos(x) \text{ (A:constant)} \quad (18)$$

$$f(x)=A \text{ (A:constant)} \quad (19)$$

When providing the target luminance distribution by a curve or a straight line as described above, setting of the target luminance value is facilitated, whereby the storage capacity of the memory can be reduced as compared with the case where all of coordinates of points constituting the target luminance distribution are stored.

Further, a plurality of target luminance distributions may be previously stored in the target luminance distribution storage circuit 605, and an optimum target value may be calculated by changing the shapes of the stored target luminance distributions according to the luminance histogram of the input image. Thereby, the target value can be easily adjusted.

When providing the target luminance distribution by a curve, curves having different gradients may be stored. For example, in the curve shown in FIG. 22(b), a cosine curve in which the value A is changed is stored.

Figure 23A:
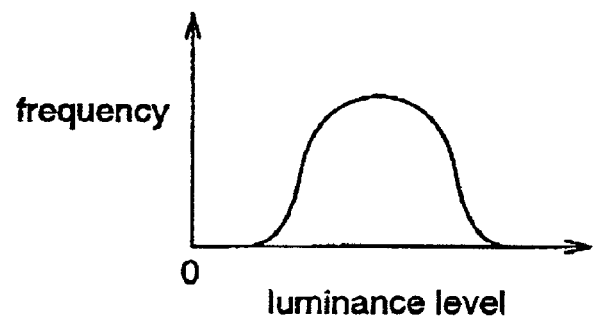
FIGS. 23(a)–23(d) are diagrams for explaining synthesis of target luminance distributions.
Figure 23B:
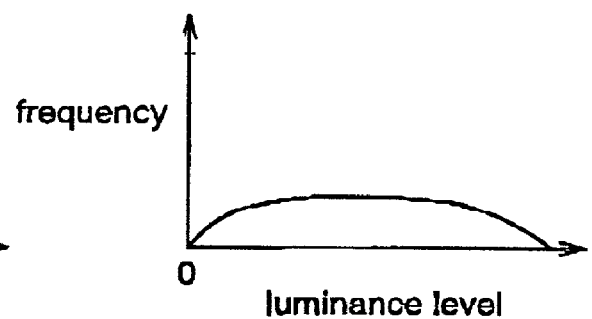
Figure 23C:
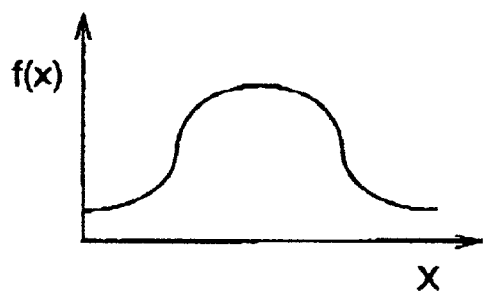
Figure 23D:
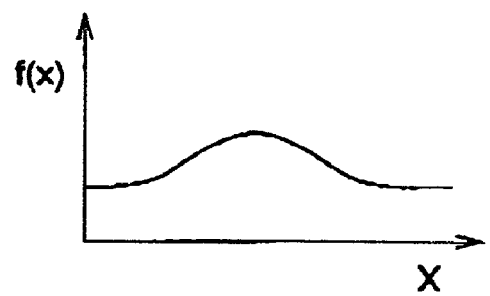

Alternatively, previously given two curves may be synthesized according to the luminance histogram of the input image to make a new curve. For example, in the case where the curves shown in FIGS. 22(b) and 22(c) are given, when the luminance histogram of the input image is as shown in FIG. 23(a), a curve as shown in FIG. 23(c), in which the ratio of the curve of FIG. 22(b) is increased, is formed. When the luminance histogram is as shown in FIG. 23(b), a curve as shown in FIG. 23(d), in which the ratio of the curve of FIG. 22(c) is increased, is formed.

Furthermore, the correction table formation circuit 609 included in the automatic tone correction apparatus according to any of claims 4, 5, and 6 may form a conversion table such that expansion of the luminance distribution is performed on only the low-luminance side while expansion of the luminance distribution on the high-luminance side is performed during the process of performing correction so that the center of gravity of the low-luminance part of the luminance histogram matches the target value, whereby the tones of the high-luminance part is prevented from being collapsed due to tone correction (corresponding to claim 16).

In this case, since the maximum value of the luminance distribution is not necessary, the distribution range calculation circuit 607 may calculate only the minimum value, whereby the computational complexity is reduced.

Furthermore, as described for the first embodiment, modifications as defined in claims 20 to 25 may be added.

More specifically, in the luminance distribution formation circuit 104, a restriction may be put on the amount of accumulation of the luminance distribution (corresponding to claim 20). By setting a restriction on the luminance histogram, the amount of correction can be accurately calculated even when there is an extreme deviation such that the tone distribution concentrates on a certain tone, for example, when a background of a back-lighted image or the like occurs halation and thus the luminance level concentrates on "255".

Further, a skin-color region may be extracted from color-difference signals and a luminance signal and, when a luminance histogram is created, the luminance distribution of the skin color region in the image may be added to the luminance distribution of the whole image, according to the area of the skin-color region (corresponding to claim 21). By adding a weight in this way, tone correction in which the skin-color region is optimized can be carried out.

Furthermore, in the luminance distribution of the skin-color region, the distribution of the high-luminance part may be weighted (corresponding to claim 22). For example, the luminance distribution of the skin-color region is multiplied by a coefficient as shown in FIG. 13 to weight the high-luminance part.

Moreover, the center of gravity of the high-luminance part may be calculated from the luminance histogram, and the amount of correction in the high-luminance part may be calculated according to the center of gravity of the high-luminance part (corresponding to claim 23).

Of course, a correction table may be formed according to a correction point which is set so that the center of gravity of the high-luminance part matches a predetermined target value of the high-luminance part, in like manner as described for correction of the low-luminance part.

When the luminance distribution formed by the luminance distribution formation circuit is discrete, tone correction is not carried out (corresponding to claim 24). The reason is as follows. When the luminance distribution is discrete, the image can be judged as an artificial image and, generally, it is better not to perform tone correction on an artificial image.

When a digital image signal is separated into a luminance signal and color-difference signals and tone correction is performed on the luminance signal, the color-difference signals may be corrected according to the correction table (corresponding to claim 25). Thereby, when R, G, B signals are formed from the tone-corrected luminance signal and color-difference signals, a phenomenon, in which the saturation appears degraded due to luminance correction, is suppressed.

As described above, according to the second embodiment, a luminance histogram of a digital image is formed, the center of gravity of a low-luminance part of the histogram is calculated, a luminance correction target value is calculated from a target luminance distribution, and a correction table for expanding the luminance distribution of the luminance histogram and, simultaneously, correcting the luminance histogram so that the center of gravity of the low-luminance part of the expanded luminance histogram matches a target value, is formed, and then tone correction is carried out using the correction table. Therefore, just once formation of a conversion table enables expansion of the luminance distribution of the luminance histogram formed from the digital image signal as well as correction of the luminance histogram so as to match the center of gravity of the low-luminance part to the target luminance value, whereby a back-lighted image can be brightly corrected so that the low-luminance region in the back-lighted state has a target luminance value, resulting in an image the whole contrast of which is improved. Furthermore, even a forward-lighted image can be corrected so that the luminance value in the low-luminance area matches a target value, resulting in an image the whole contrast of which is improved.

In this second embodiment, the description has been given of the automatic tone correction apparatus which performs expansion of the luminance distribution simultaneously with tone correction for correcting the luminance distribution so that the center of gravity of the low-luminance part matches the target value, by using the correction table. However, an automatic tone correction method for performing processing corresponding to the automatic tone correction apparatus is also within the scope of the invention. Furthermore, an automatic tone correction method corresponding to the flowchart of FIG. 20(*a*) which illustrates the correction principle, an automatic tone correction apparatus corresponding to this automatic tone correction method, and an automatic tone correction program storage medium for recording an automatic tone correction program which makes a computer perform the automatic tone correction method, into various recording mediums, are also within the scope of the invention. Also in these cases, the same effects as achieved by the above-described automatic tone correction apparatus can be realized although expansion of the luminance distribution and tone correction cannot be performed simultaneously.

[Embodiment 3]

Hereinafter, a description will be given of a third embodiment of the present invention corresponding to claims 7, 32, and 35 (further, claims 8, 9, 16~25, 33, 34, 41~50, 56~63), with reference to the drawings.

In this third embodiment, a boundary of a low-luminance part and a high-luminance part can be changed according to the center of gravity of a luminance histogram of an input image.

Figure 24:
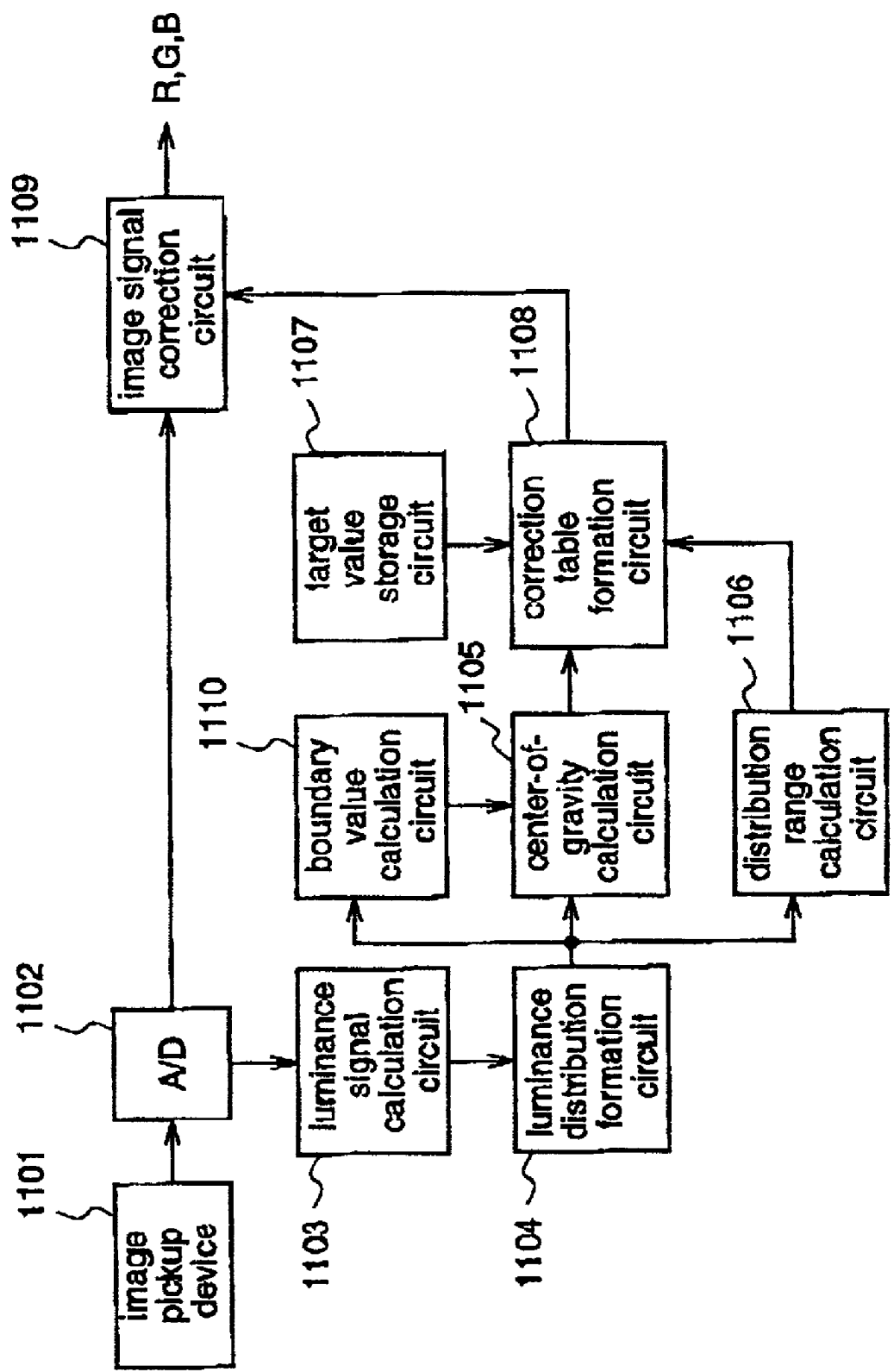
FIG. 24 is a block diagram illustrating an automatic tone correction apparatus according to a third embodiment of the invention.

FIG. 24 is a block diagram illustrating an automatic tone correction apparatus according to the third embodiment.

In FIG. 24, reference numeral 1101 denotes an image pickup device for light-to-electricity converting a shot image; Preference numeral 1102 denotes an A/D converter to which an analog image signal is supplied from the image pickup device 1101; reference numeral 1103 denotes a luminance signal calculation circuit to which a digital image signal is supplied from the A/D converter 1102; reference numeral 1104 denotes a luminance distribution formation circuit (luminance histogram formation unit) to which a luminance signal is supplied from the luminance signal calculation circuit 1103; reference numeral 1110 denotes a boundary value calculation circuit (boundary value calculation unit) to which a luminance distribution is supplied from the luminance distribution formation circuit 1104; reference numeral 1105 denotes a center-of-gravity calculation circuit (center-of-gravity calculation unit) to which the luminance distribution is supplied from the luminance distribution formation circuit 1104, and a boundary value is supplied from the boundary value calculation circuit 1110; reference numeral 1106 denotes a distribution range calculation circuit to which the luminance distribution is supplied from the luminance distribution formation circuit 1104; reference numeral 1107 denotes a target value storage circuit for holding a target value to be a goal in performing tone correction; reference numeral 1108 denotes a correction table formation circuit for forming a correction table for tone correction, on the basis of the center of gravity supplied from the center-of-gravity calculation circuit 1105, a maximum value and a minimum value of the redistribution range supplied from the distribution range calculation circuit 1106, and the target value supplied from the target value storage circuit 1107; and reference numeral 1109 denotes an image signal correction circuit for performing tone correction on the digital image signal outputted from the A/D converter 1102, on the basis of the correction table formed by the correction table formation circuit 1108. The correction table formation circuit 1108 and the image signal correction circuit 1109 constitute a tone correction section. However, when the tone correction section does not include a function of expanding the distribution of the luminance histogram, the correction table formation circuit 1108 and the image signal correction circuit 1109 constitute a luminance distribution expansion section as well as a tone correction section.

Figure 27A:
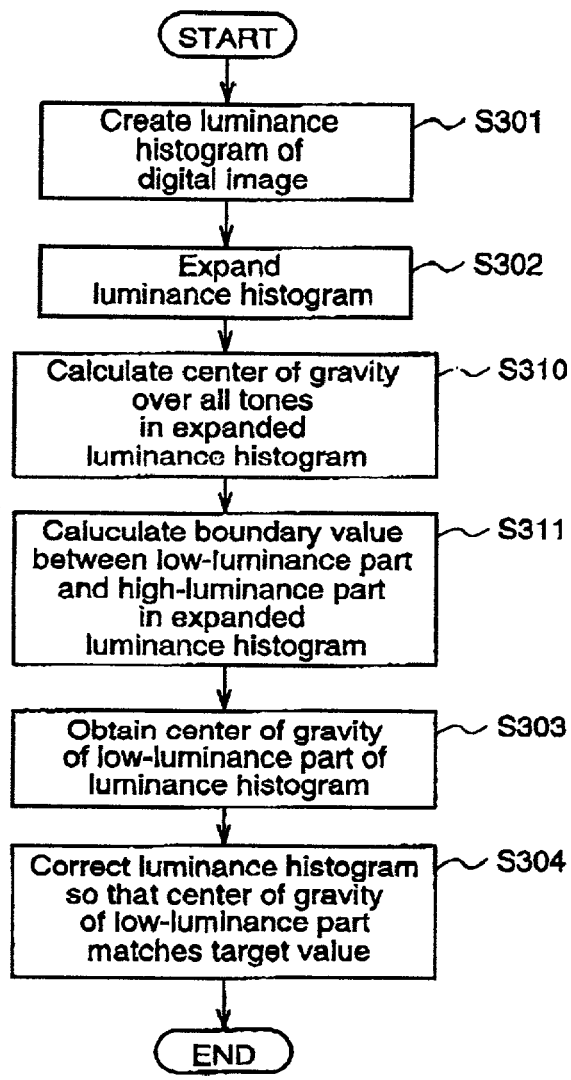
Figure 27B:
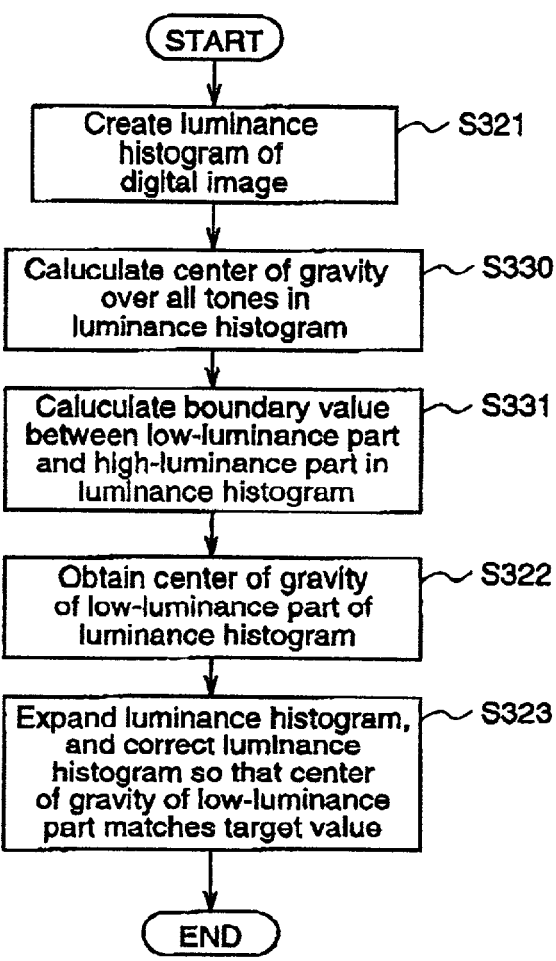

FIG. 27(*a*) is a flowchart illustrating the principle of a tone correcting process according to the third embodiment. Initially, a luminance histogram of a digital image is formed (step S301), and the luminance histogram is expanded (step S302). Next, the center of gravity of the expanded luminance histogram over all tones is calculated (step S310), and a boundary value between a low-luminance part and a high-luminance part of the expanded luminance histogram is calculated (step S311). Then, the center of gravity of the low-luminance part of the luminance histogram is obtained (step S303), and the luminance histogram is corrected so that the center of gravity of the low-luminance part matches a target value (step S304).

Next, the operation will be described. The operation of the tone correction apparatus according to this third embodiment is fundamentally identical to that of the apparatus according to the first embodiment. However, in this third embodiment, a boundary value between the low-luminance part and the high-luminance part is variable, and the boundary value calculation circuit 1110 sets a boundary value according to an input image, although in the first embodiment the luminance histogram is divided into two equal parts, i.e., the low-luminance part and the high-luminance part, using the center luminance level of the input luminance level axis as a boundary value.

Since the boundary value is variable, a low-luminance part including a back-lighted region in a back-lighted image can be accurately extracted, whereby the back-lighted region can be corrected to a target luminance value more accurately.

Figure 25A:
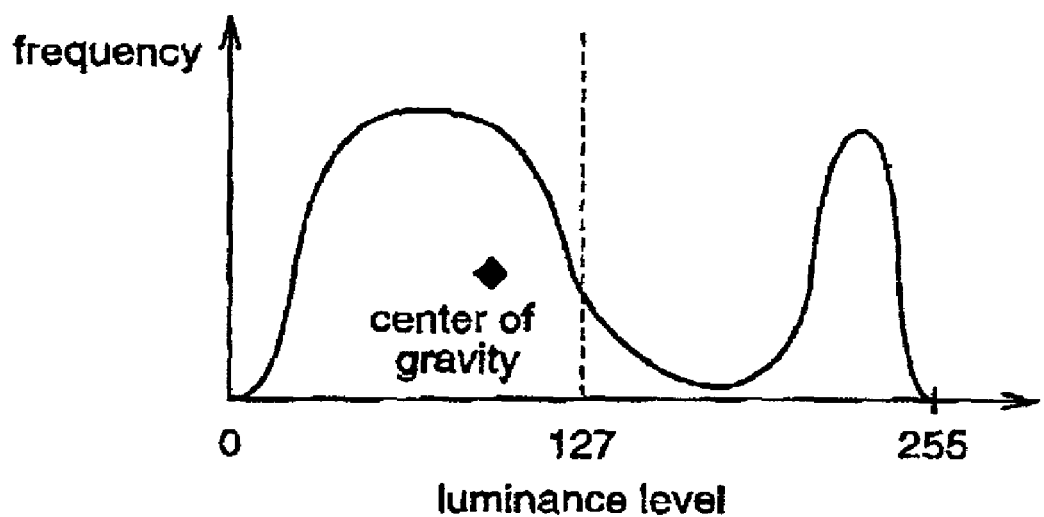
FIGS. 25(a) and 25(b) are diagrams illustrating the centers of gravity in a back-lighted image.
Figure 25B:
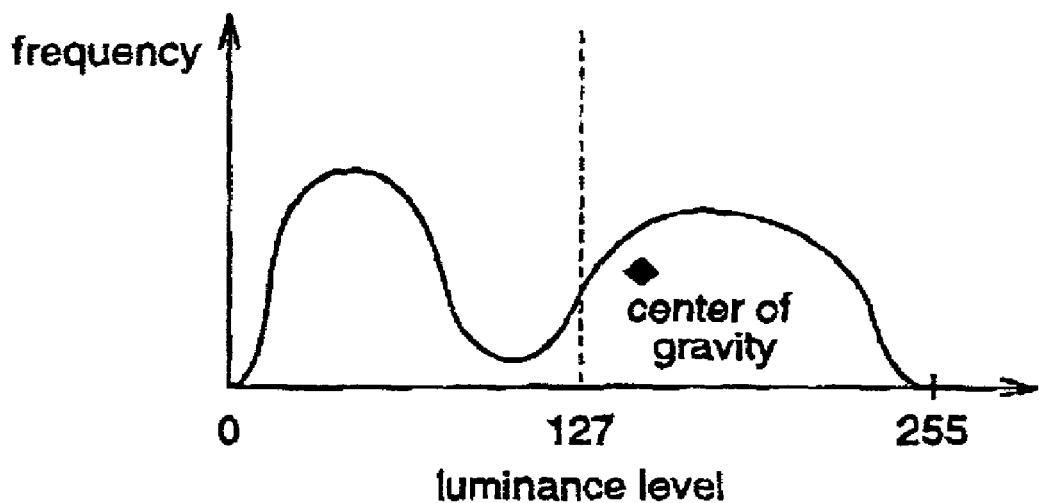

As already described above, a luminance histogram formed from a back-lighted image has two peaks, one on its high-luminance side and the other on its low-luminance side, as shown in FIG. 2(*b*). When the center of gravity over all tones is calculated in this state, if the ratio of a dark region including a back-lighted area to the while image region is large, the center of gravity shifts toward the low-luminance side with respect to the center luminance level (127) as shown in FIG. 25(*a*). On the other hand, if the ratio of the dark region including a back-lighted area to the whole image region is small, the center of gravity shifts toward the high-luminance side with respect to the center luminance level as shown in FIG. 25(*b*).

So, in this third embodiment, the center of gravity over all tones of the luminance histogram formed by the luminance distribution formation circuit 1104 is calculated, and the boundary value is shifted on the basis of the calculated center of gravity. Thereby, the luminance histogram can be accurately separated into the low-luminance part including the back-lighted area and the high-luminance part.

To be specific, in the boundary value calculation circuit 1110, the center of gravity over all tones of the luminance histogram formed by the luminance distribution formation circuit 1104 is obtained, and a tone which is shifted from the center tone by an amount calculated on the basis of the obtained center of gravity is regarded as a boundary value between the low-luminance part and the high-luminance part.

Assuming that the center of gravity of the luminance histogram formed by the luminance distribution formation circuit 1104 is G and the center tone is H, the boundary value T is calculated by formula (20) as follows.

$$T = H + (H - G) \times 0.5 \quad (20)$$

wherein "0.5" is a coefficient for controlling the amount of shift, and it is not restricted to "0.5". For example, when the coefficient is "1.0", a difference between the center tone and the center of gravity over all tones becomes the amount of shift.

Next, assuming that the region from the "0" level to the boundary value calculated by the boundary value calculation circuit 1110 is a low-luminance part, the center-of-gravity calculation circuit 1105 calculates the center of gravity of the low luminance part of the luminance histogram formed by the luminance distribution formation circuit 1104, and then the correction table formation circuit 1108 forms a luminance conversion table on the basis of the center of gravity, the target value stored in the target value storage circuit 1107, and the maximum and minimum values calculated by the distribution range calculation circuit 1106. Thereafter, the image signal correction circuit 1109 performs tone correction.

Thereby, an image having a target brightness and an enhanced contrast as a whole is obtained.

FIG. 27(*b*) is a flowchart for explaining a tone correcting process the automatic tone correction apparatus shown in FIG. 24 actually performs. Initially, a luminance histogram of a digital image is formed (step S321), and the center of gravity of this luminance histogram over all tones is obtained before expanding the luminance distribution (step S330). Next, a boundary value between the low-luminance part and the high-luminance part of the luminance histogram is calculated (in step S331), and the center of gravity of the low-luminance part of the luminance histogram is obtained (step S322). Next, a correction table for expanding the luminance distribution of the luminance histogram and, simultaneously, correcting the luminance distribution of the luminance histogram so that the center of gravity of the low-luminance part of the expanded luminance histogram matches a target value, is formed. Using this correction table, expansion of the luminance histogram and correction of the luminance distribution so as to make the center of gravity of the low-luminance part match the target value are carried out simultaneously (step S323).

Thereby, a luminance distribution expansion section (i.e., a conversion table for only expansion of luminance distribution), which is required when expanding the luminance distribution of the luminance histogram immediately after formation of the histogram as shown in FIG. 27(*a*), becomes unnecessary. Furthermore, as described above, arithmetic errors in the decimal level can be removed.

While in this third embodiment a target value is previously set and stored in the target value storage circuit 1107, a target value may be calculated from a target luminance distribution and stored in the target value storage circuit 1107 as described for the second embodiment. In this case, as in the center-of-gravity calculating method employed by the center-of-gravity calculation circuit 1105, a range from the "0" level to the boundary value is set as a low-luminance part, the center of gravity of the low luminance part of the target luminance distribution is obtained, and the obtained center of gravity is used as a target value.

The above-described boundary value calculating method is merely an example, and other methods may be employed so long as the low-luminance part can be accurately detected from the whole luminance histogram.

For example, in the boundary value calculation circuit 1110, the luminance range is divided into plural areas, and the center of gravity is obtained as a feature parameter of each area, and a boundary value is calculated from the obtained center of gravity (corresponding to claim 8).

More specifically, the luminance histogram formed by the luminance distribution formation circuit 1104 is divided into two areas at the center tone, and the center of gravity of each area is obtained. Then, the middle point between the obtained two centers of gravity is used for calculating an amount of shift.

Assuming that, when the luminance histogram formed by the luminance distribution formation circuit 1104 is divided into two equal parts, the center of gravity of the low-luminance-side region is G1, the center of gravity of the high-luminance-side region is G2, and the-center tone is H, a boundary value T is calculated by formula (21) as follows.

$$T = H + ((G1 + G2)/2 - H) \times 1.0 \tag{21}$$

wherein "1.0" is a coefficient for controlling the amount of shift and, when the coefficient is "1.0", the middle point between the two centers of gravity is a boundary value.

Figure 26A:
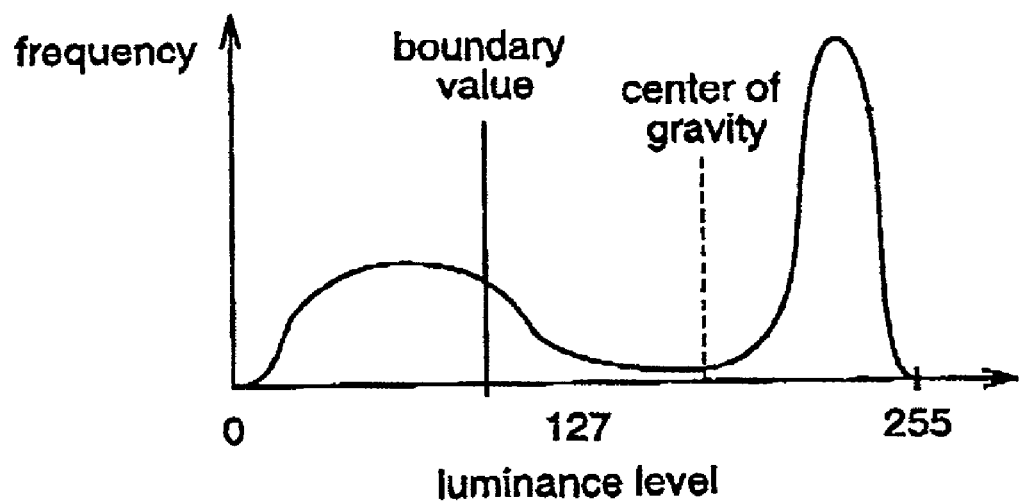
FIGS. 26(a) and 26(b) are diagrams illustrating boundary values in histograms in which the frequency concentrates on a certain tone.
Figure 26B:
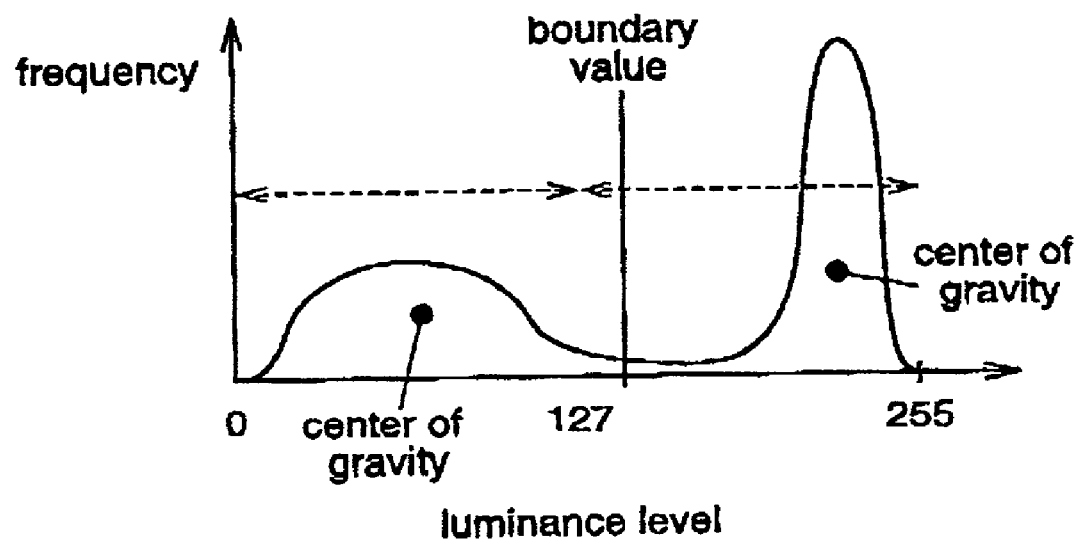

FIGS. 26(*a*) and 26(*b*) illustrates boundary values which are calculated using formulae (20) and (21) for the same luminance histogram, respectively. As shown in FIGS. 26(*a*) and 26(*b*), when the frequency concentrates on limited tones on the high-luminance side to be higher than the total frequency on the low-luminance side, the center of gravity over all tones is placed on the side where the frequency concentrates. Accordingly, in FIG. 26(*a*), the boundary value is unfavorably set in the mountain-shape distribution of the low-luminance part. In FIG. 26(*b*), however, the high-luminance side and the low-luminance side are separated from each other, and the "mountain" on the low-luminance side and the "mountain" on the high-luminance side are considered separately, whereby the boundary value can be set in the "valley" of the mountain-shape distributions.

As described above, since a boundary value which divides the luminance histogram into two parts is obtained, even when the frequency of luminance distribution is extremely biased to one side, an accurate boundary value can be calculated.

There is another method for calculating a boundary value, in which the luminance region is divided into plural parts, the frequency in each region is calculated, and a region of a low frequency, which is sandwiched by regions of high frequencies, is used as a boundary value.

In the above-mentioned boundary value calculation method in which the luminance histogram is divided into two regions at the center tone and the center of gravity of each region is calculated, the center of gravity of the low-luminance region that is obtained by dividing the luminance range into two regions with the boundary value calculation circuit 1110 may be the center of gravity to be used in the correction table formation circuit 1108, as defined in claim 9.

In this case, since it is not necessary to calculate the center of gravity of the low-luminance region up to the boundary value by the center-of-gravity calculation circuit 1105, the center-of-gravity calculation circuit 1105 can be dispensed with.

Figure 28:
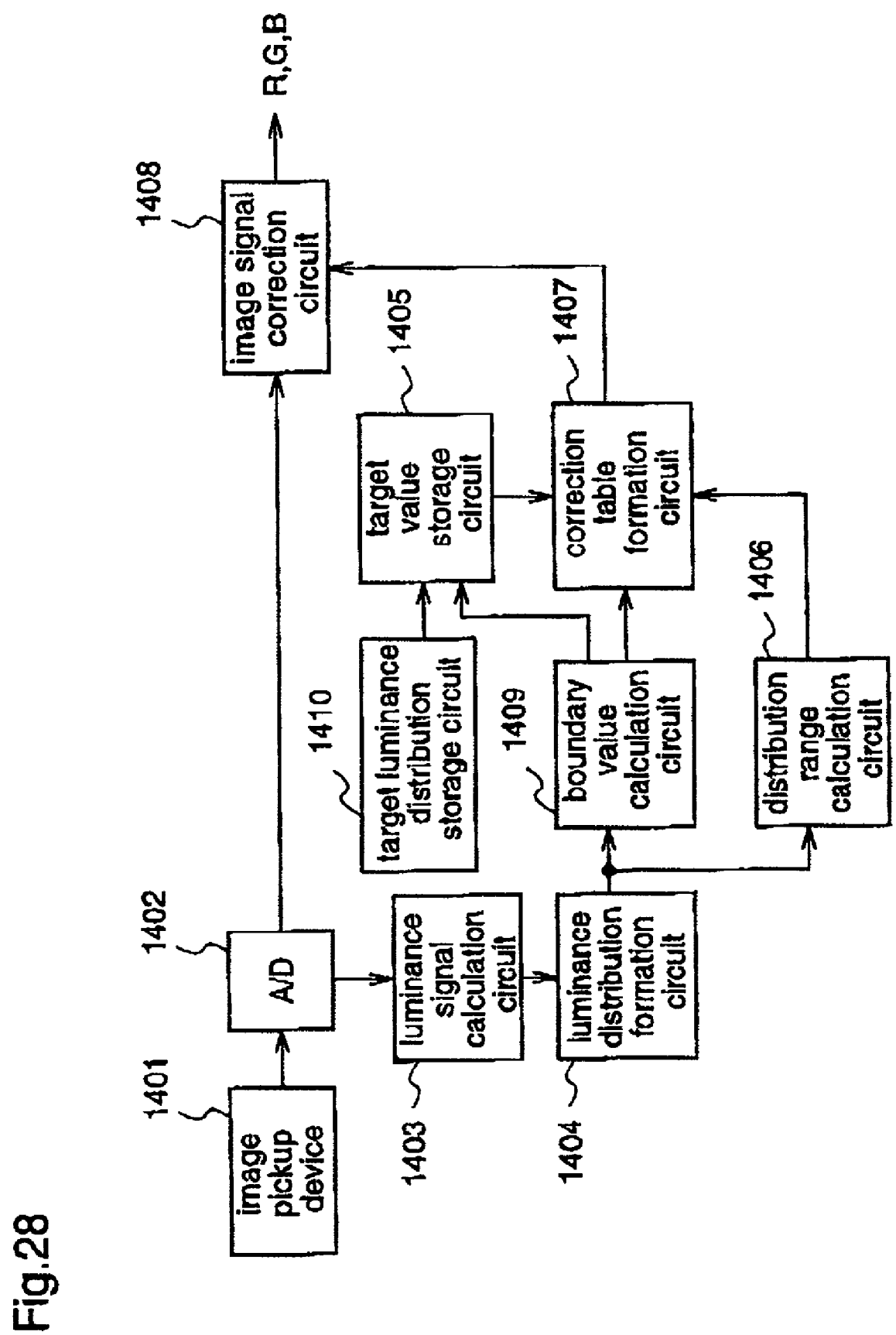
FIG. 28 is a block diagram illustrating an automatic tone correction apparatus as defined in claim 9.

FIG. 28 is a block diagram illustrating the construction of the automatic tone correction apparatus in this case. In FIG. 28, reference numeral 1401 denotes an image pickup device for light-to-electricity converting a shot image; reference numeral 1402 denotes an A/D converter to which an analog image signal is supplied from the image pickup device 1401; reference numeral 1403 denotes a luminance signal calculation circuit to which a digital image signal is supplied from the A/D converter 1402; reference numeral 1404 denotes a luminance distribution formation circuit to which a luminance signal is supplied from the luminance signal calculation circuit 1403; reference numeral 1410 denotes a target luminance distribution storage circuit for holding a target luminance distribution to be a goal in performing tone correction; reference numeral 1409 denotes a boundary value calculation circuit to which a luminance distribution is supplied from the luminance distribution formation circuit 1404; reference numeral 1406 denotes a distribution range calculation circuit to which the luminance distribution is supplied from the luminance distribution formation circuit 1404; reference numeral 1405 denotes a target value calculation circuit to which a boundary value is supplied from the boundary value calculation circuit 1409, and a target luminance distribution is supplied from the target luminance distribution storage circuit 1410; reference numeral 1407 denotes a correction table formation circuit for forming a correction table for tone correction, on the basis of the target value supplied from the target value calculation circuit 1405, a maximum value and a minimum value of the distribution range supplied from the distribution range calculation circuit 1406, and the center of gravity supplied from the boundary value calculation circuit 1409; and reference numeral 1408 denotes an image signal correction circuit for performing tone correction on the digital image signal outputted from the A/D converter 1402, on the basis of the correction table formed by the correction table formation circuit 1407.

Next, the operation will be described. Although the fundamental operation is identical to that of the apparatus defined in claim 4 or 7, the boundary value calculation circuit 1409 calculates a boundary value, and a center of gravity of the low-luminance part. Then, the target value calculation circuit 1405 calculates a target value on the basis of the target luminance distribution stored in the target luminance distribution storage circuit 1410, and the boundary value calculated by the boundary value calculation circuit 1409. The correction table formation circuit 1407 forms a correction table for tone correction, on the basis of the target value calculated by the target value calculation circuit 1405, the maximum and minimum values obtained by the distribution range calculation circuit 1406, and the center of gravity of the low-luminance part obtained by the boundary value calculation circuit 1409.

Furthermore, the correction table formation circuit in the automatic tone correction apparatus according to any of claims 7 to 9 may create a conversion table by which expansion of the luminance distribution is performed on only the low-luminance side while expansion of the luminance distribution on the high-luminance side is performed during the process of performing correction so as to match the center of gravity of the low-luminance part of the luminance histogram to the target value, whereby the tone of the high-luminance part is prevented from being collapsed due to tone correction (corresponding to claim 16).

In this case, since the maximum value of the luminance distribution is not necessary, the distribution range calculation circuit may calculate only the minimum value, whereby the computational complexity is reduced.

Furthermore, as described for the first embodiment, modifications as described in claims 20 to 25 may be added to this third embodiment.

That is, in the luminance distribution formation circuit 1404, a restriction may be put on the amount of accumulation of the luminance distribution (corresponding to claim 20). By setting a restriction on the luminance histogram, the amount of correction can be accurately calculated even when there is an extreme deviation such that the tone distribution concentrates on a certain tone, for example, when a background of a back-lighted image or the like occurs halation and thus the luminance level concentrates on "255".

Further, a skin-color region may be extracted from color-difference signals and a luminance signal and, when a luminance histogram is created, the luminance distribution of the skin color region in the image may be added to the luminance distribution of the whole image, according to the area of the skin-color region (corresponding to claim 21). By adding a weight in this way, tone correction in which the skin-color region is optimized can be carried out.

Furthermore, in the luminance distribution of the skin-color region, the distribution of the high-luminance part may be weighted (corresponding to claim 22). For example, the luminance distribution of the skin-color region is multiplied by a coefficient as shown in FIG. 13 to weight the high-luminance part.

Moreover, the center of gravity of the high-luminance part may be calculated from the luminance histogram, and the amount of correction in the high-luminance part may be calculated according to the center of gravity of the high-luminance part (corresponding to claim 23).

When the luminance distribution formed by the luminance distribution formation circuit is discrete, tone correction is not carried out (corresponding to claim 24). The reason is as follows. When the luminance distribution is discrete, the image can be judged as an artificial image and, generally, it is better not to perform tone correction on an artificial image.

When a digital image signal is separated into a luminance signal and color-difference signals and tone correction is performed on the luminance signal, the color-difference signals may be corrected according to the correction table (corresponding to claim 25). Thereby, when R, G, B signals are formed from the tone-corrected luminance signal and color-difference signals, a phenomenon, in which the saturation appears degraded due to luminance correction, is suppressed.

As described above, according to the third embodiment, a luminance histogram of a digital image is formed, the center of gravity over all tones of this histogram is calculated, a boundary value between a low-luminance part and a high-luminance part is calculated on the basis of the center of gravity, the center of gravity of the low-luminance part is calculated, a correction table for expanding the luminance distribution of the luminance histogram and, simultaneously, correcting the luminance histogram so that the center of gravity of the low-luminance part of the expanded luminance histogram matches a target value, is formed, and tone correction is carried out using the correction table. Therefore, the low-luminance part and the high-luminance part can be accurately separated according to the center of gravity of the whole luminance histogram. Further, just once formation of a conversion table enables expansion of the luminance distribution of the luminance histogram formed from the digital image signal and, simultaneously, correction of the luminance histogram so that the center of gravity of the low-luminance part matches the target luminance value, whereby a back-lighted image can be brightly corrected so that the low-luminance area in the back-lighted state has a target luminance value, resulting in an image the whole contrast of which is improved. Furthermore, even a forward-lighted image can be corrected so that the luminance value in the low-luminance area matches a target value, resulting in an image the whole contrast of which is improved.

In this third embodiment, the description has been given of the automatic tone correction apparatus which performs expansion of the luminance distribution simultaneously with tone correction for correcting the luminance distribution so that the center of gravity of the low-luminance part matches the target value, by using the correction table. However, an automatic tone correction method for performing processing corresponding to the automatic tone correction apparatus is also within the scope of the invention. Furthermore, an automatic tone correction method corresponding to the flowchart of FIG. 27(*a*) which illustrates the correction principle, an automatic tone correction apparatus corresponding to this automatic tone correction method, and an automatic tone correction program storage medium for recording an automatic tone correction program which makes a computer perform the automatic tone correction method, into various recording mediums, are also within the scope of the invention. Also in these cases, the same effects as achieved by the above-described automatic tone correction apparatus can be realized although expansion of the luminance distribution and tone correction cannot be performed simultaneously.

[Embodiment 4]

Hereinafter, a description will be given of a fourth embodiment of the present invention corresponding to claims 10, 35, and 54 (further, claims 11, 12, 16~25, 36, 37, 41~50, 56~63), with reference to the drawings.

In this fourth embodiment, a boundary of a low-luminance part and a high-luminance part is detected on the basis of the shape of a luminance histogram.

Figure 29:
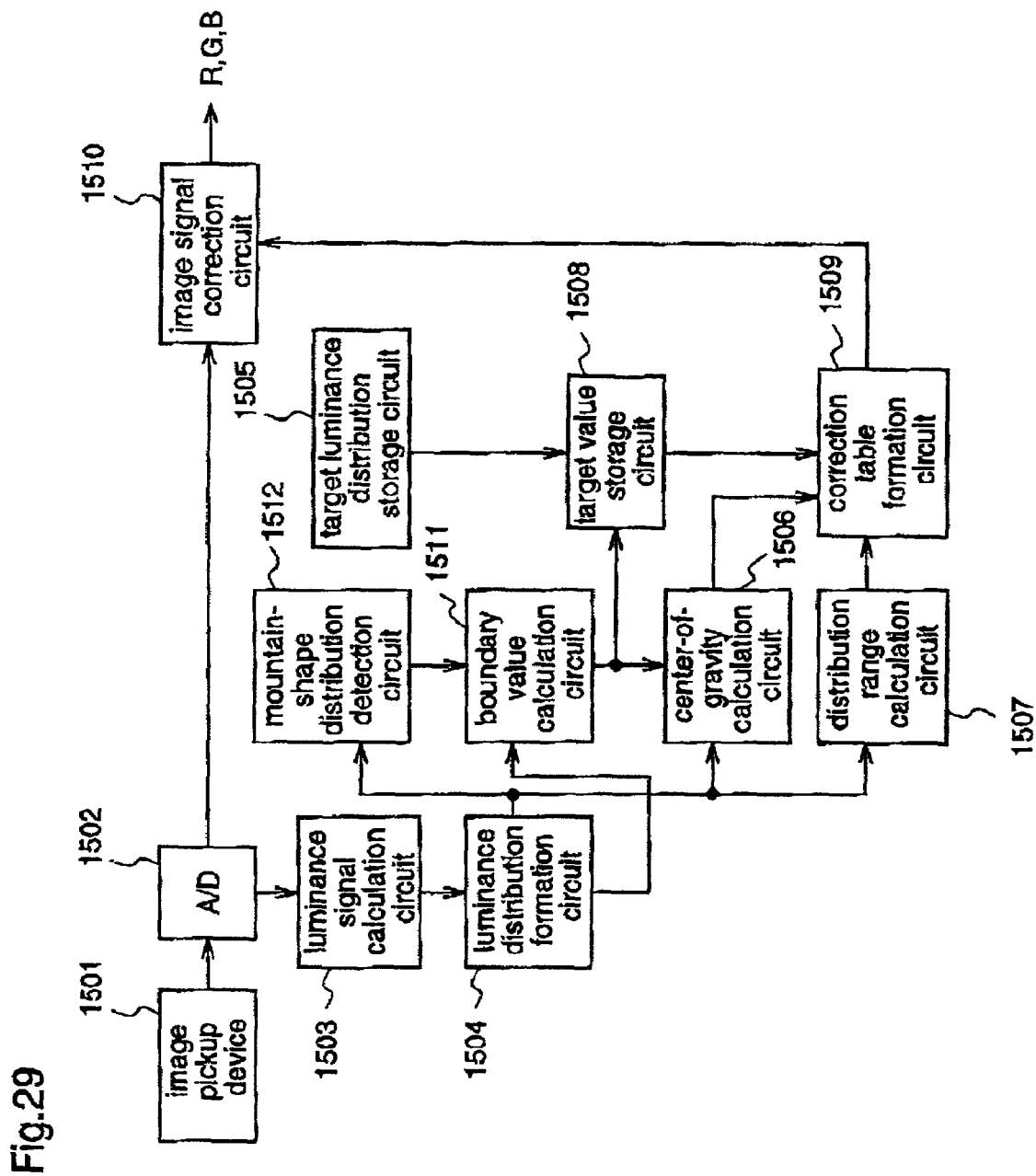
FIG. 29 is a block diagram illustrating an automatic tone correction apparatus according to a fourth embodiment of the invention.

FIG. 29 is a block diagram illustrating an automatic tone correction apparatus according to the fourth embodiment.

In FIG. 29, reference numeral 1501 denotes an image pickup device for light-to-electricity converting a shot image; reference numeral 1502 denotes an A/D converter to which an analog image signal is supplied from the image pickup device 1501; reference numeral 1503 denotes a luminance signal calculation circuit to which a digital image signal is supplied from the A/D converter 1502; reference numeral 1504 denotes a luminance distribution formation circuit (luminance histogram formation unit) to which a luminance signal is supplied from the luminance signal calculation circuit 1503; reference numeral 1512 denotes a mountain-shape distribution detection circuit (mountain-shape distribution detector) to which a luminance distribution is supplied from the luminance distribution formation circuit 1504; reference numeral 1511 denotes a boundary value calculation circuit (boundary value calculation unit) to which the range of a mountain-shape distribution is supplied from the mountain-shape distribution detection circuit 1512, and a luminance distribution is supplied from the luminance distribution formation circuit 1504; reference numeral 1106 denotes a center-of-gravity calculation circuit (center-of-gravity calculation unit) to which the luminance distribution is supplied from the luminance distribution formation circuit 1504, and a boundary value is supplied from the boundary value calculation circuit 1511; reference numeral 1507 denotes a distribution range calculation circuit to which the luminance distribution is supplied from the luminance distribution formation circuit 1504; reference numeral 1505 denotes a target value storage circuit for holding a target value to be a goal in performing tone correction; reference numeral 1508 denotes a target value calculation circuit to which a target luminance distribution is supplied from the target luminance distribution storage circuit 1505, and the boundary value is supplied from the boundary value calculation circuit 1511; reference numeral 1509 denotes a correction table formation circuit for forming a correction table for tone correction, on the basis of the center of gravity supplied from the center-of-gravity calculation circuit 1506, a maximum value and a minimum value of the distribution range supplied from the distribution range calculation circuit 1507, and the target value supplied from the target value storage circuit 1508; and reference numeral 1510 denotes an image signal correction circuit for performing tone correction on the digital image signal outputted from the A/D converter 1502, on the basis of the correction table formed by the correction table formation circuit 1509. The correction table formation circuit 1509 and the image signal correction circuit 1510 constitute a tone correction section. However, when the tone correction section does not include a function of expanding the distribution of the luminance histogram, the correction table formation circuit 1509 and the image signal correction circuit 1510 constitute a luminance distribution expansion section as well as a tone correction section.

Figure 33A:
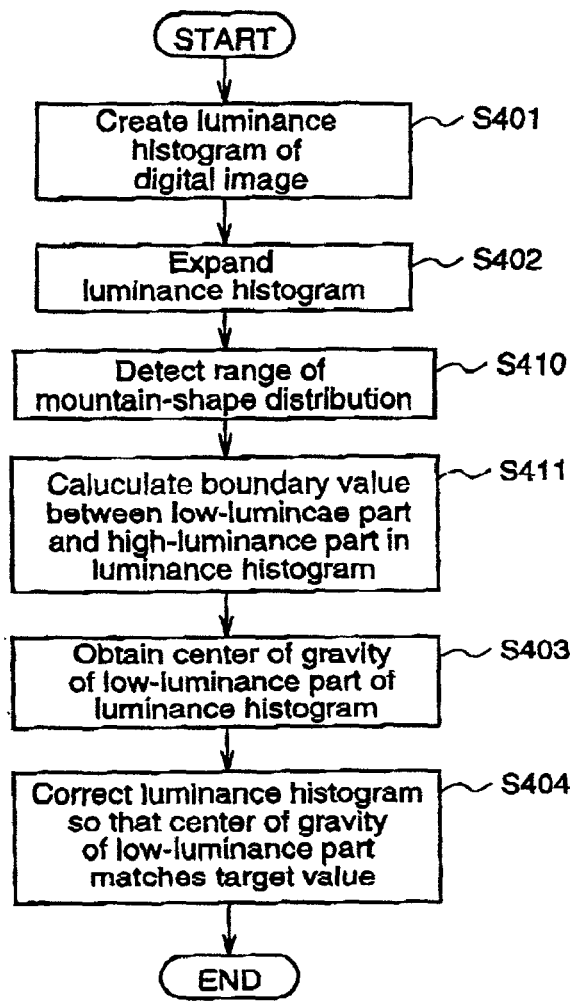
FIGS. 33(a) and 33(b) are flowcharts illustrating a tone correcting process and its principle according to the fourth embodiment, respectively.
Figure 33B:
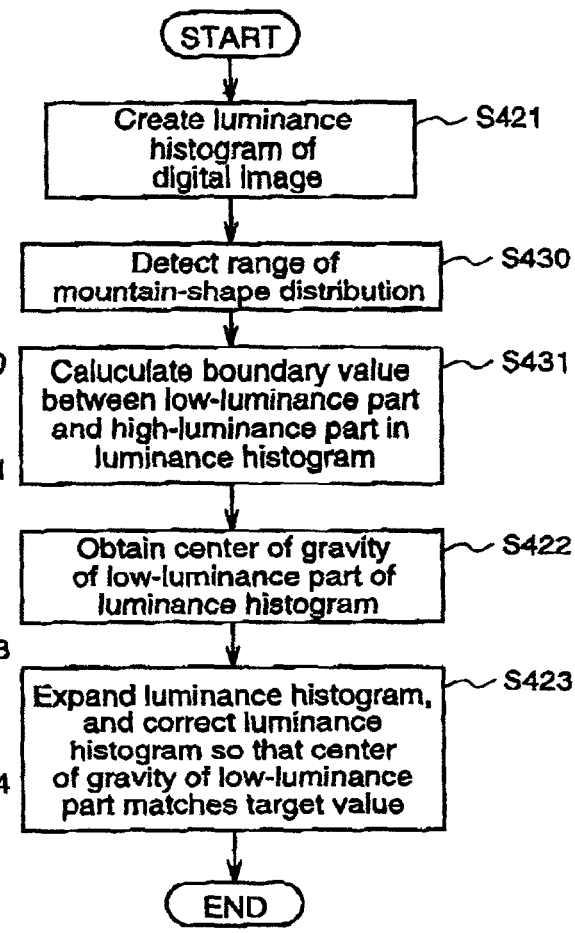

FIG. 33(*a*) is a flowchart illustrating the principle of a tone correcting process according to the fourth embodiment. Initially, a luminance histogram of a digital image is formed (step S401), and the luminance histogram is expanded (step S402). Next, the range of mountain-shape distribution in the luminance histogram is detected (step S411), and a boundary value between a low-luminance part and a high-luminance part is calculated on the basis of the range of mountain-shape distribution (step S411). Then, the center of gravity of the low-luminance part of the luminance histogram is obtained (step S403), and the luminance, histogram is corrected so that the center of gravity of the low-luminance part matches a target value (step S404).

Next, the operation will be described. The fundamental operation of the apparatus according to this fourth embodiment is identical to the operation of the apparatus according to the second or third embodiment, except that the boundary value calculation circuit 1511 calculates a boundary value using the range of a mountain-shape distribution of a histogram, which is detected by the mountain-shape distribution detection circuit 1512. Hereinafter, the processing will be described with reference to FIGS. 30 to 33.

In the mountain-shape distribution detection circuit 1512, the luminance histogram formed by the luminance distribution formation circuit 1504 is scanned from the lowest value of the luminance level toward the higher luminance level, and the range of a mountain-shape distribution that is detected first is stored. Assume that this range is a range A. Likewise, the luminance histogram is scanned from the highest value of the luminance level toward the lower luminance level, and the range of a mountain-shape distribution that is detected first is stored. Assume that this range is a range B.

Next, in the boundary value calculation circuit 1511, the centers of gravity of the ranges A and B of the luminance histogram are respectively calculated, and the middle point between these two points (centers of gravity) is obtained as a boundary value between a low-luminance part and a high-luminance part.

FIGS. 30(*a*) and 30(*b*) are diagrams for explaining a case where luminance histograms are formed for a back-lighted image and a forward-lighted image by the luminance distribution formation circuit 1504, the ranges of mountain-shape distributions are detected by the mountain-shape distribution detection circuit 1512, and boundary values are obtained by the boundary value calculation circuit 1511.

FIG. 30(*a*) is a luminance histogram of an image in the back-lighted state. In this state, two peaks of mountain-shape distributions are generated on the low-luminance side and the high-luminance side, and the range A of the peak (mountain-shape distribution) on the low-luminance side and the range B of the peak on the high-luminance side are detected, and the boundary value is positioned at the "valley" of the two mountain-shape distributions. On the other hand, in the forward-lighted image shown in FIG. 30(*b*), the range A and the range B are the same range because there is only one peak of a mountain-shape distribution, and the boundary value between the low-luminance part and the high-luminance part is positioned at the center of gravity of the ranges A and B.

Next, assuming that the range from the "0" level to the boundary value calculated by the boundary value calculation circuit 1511 is the low-luminance part, the target value and the center of gravity of the low-luminance part are calculated by the target value calculation circuit 1508 and the center-of-gravity calculation circuit 1506, respectively, and a correction table is formed by the correction table formation circuit 1509, and thereafter, tone correction is carried out by the image signal correction circuit 1510, in the same manner as described for the second embodiment.

FIG. 33(*b*) is a flowchart illustrating a tone correcting process the automatic tone correction apparatus shown in FIG. 29 actually performs. Initially, a luminance histogram of a digital image is formed (step S421), and the range of a mountain-shape distribution of this luminance histogram is detected before expanding the luminance distribution (step S430). Next, a boundary value between the low-luminance part and the high-luminance part of the luminance histogram is calculated before expanding the luminance distribution (step S431), and the center of gravity of the low-luminance part of the luminance histogram is obtained before expanding the luminance distribution (step S422). Next, in step S423, a correction table for expanding the luminance distribution of the luminance histogram and, simultaneously, correcting the luminance distribution of the luminance histogram so that the center of gravity of the low-luminance part of the distribution-expanded luminance histogram matches the target value, is formed, and thereafter, using this correction table, expansion of the luminance histogram and correction of the luminance distribution to bring the center of gravity of the low-luminance part to the target value are carried out simultaneously.

Thereby, a luminance distribution expansion section (i.e., a conversion table for only expansion of luminance distribution), which is required when expanding the luminance distribution of the luminance histogram immediately after formation of the histogram as shown in FIG. 33(*a*), is dispensed with. Furthermore, as described above, arithmetic errors in the decimal level can be removed.

Figure 30A:
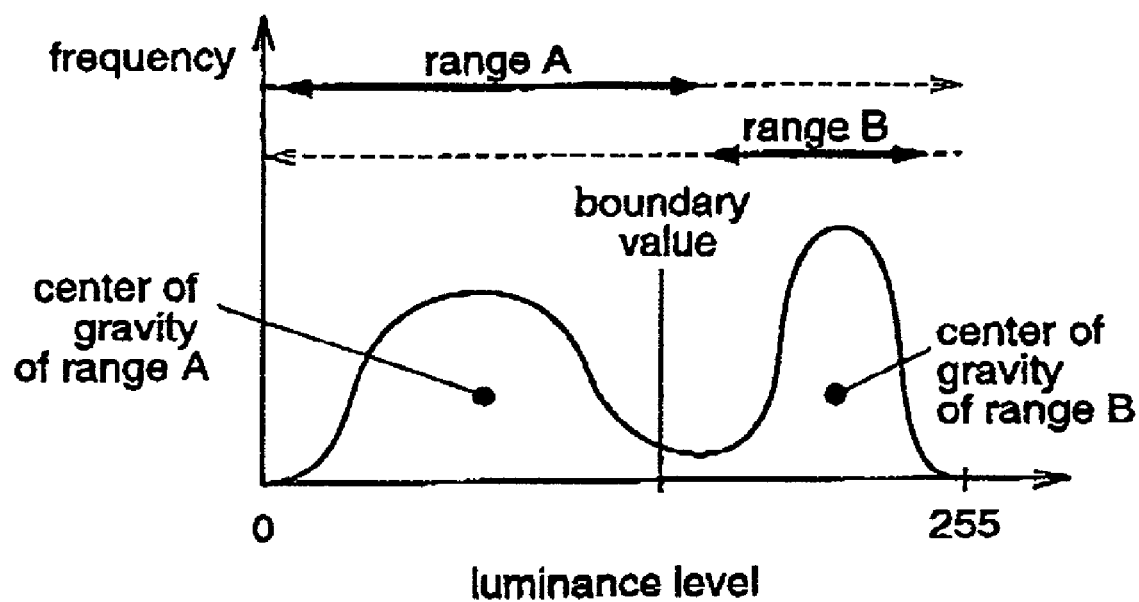
FIGS. 30(a) and 30(b) are diagrams illustrating boundary values in a back-lighted image and a forward-lighted image according to the fourth embodiment.
Figure 30B:
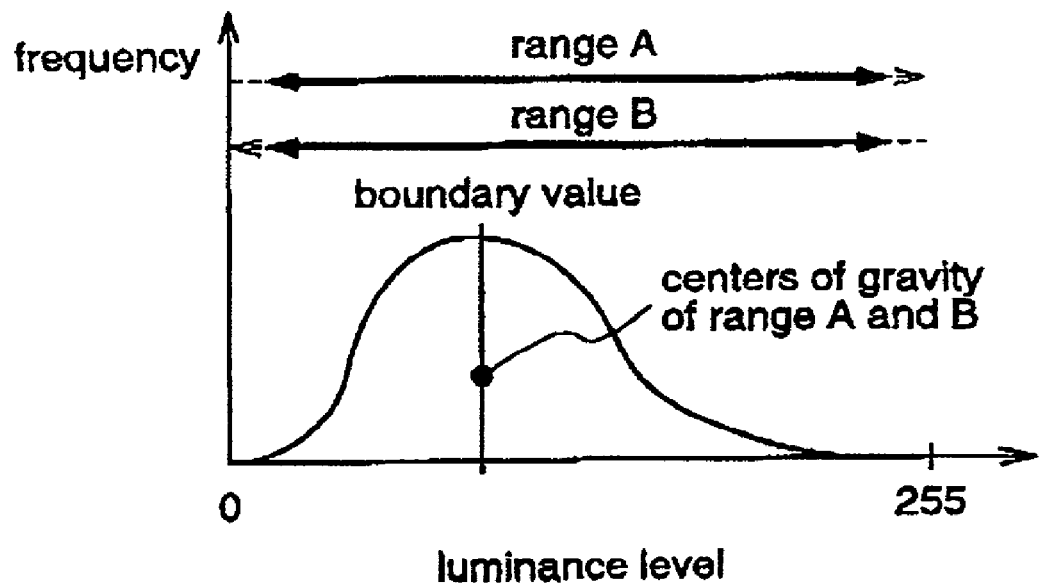
Figure 31A:
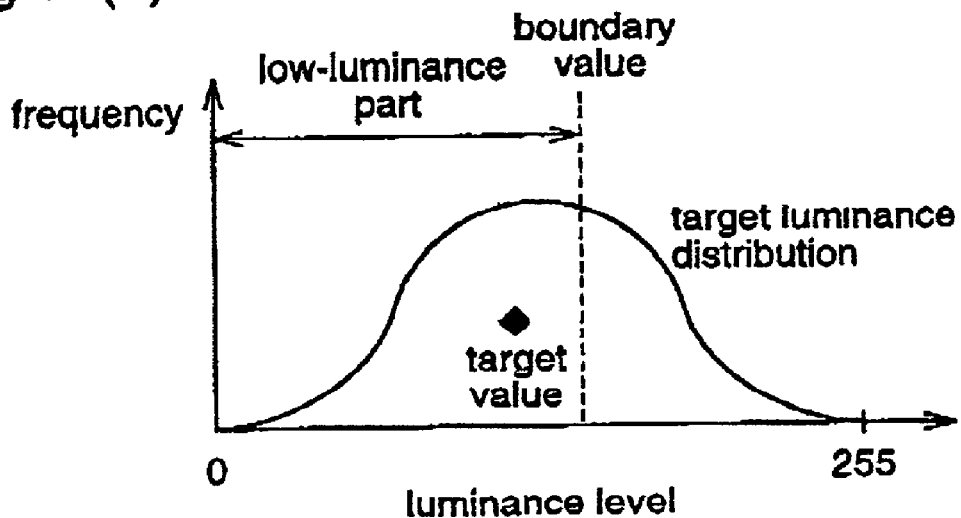
FIGS. 31(a)–31(c) are diagrams for explaining a correction process in a back-lighted image, according to the fourth embodiment.
Figure 31B:
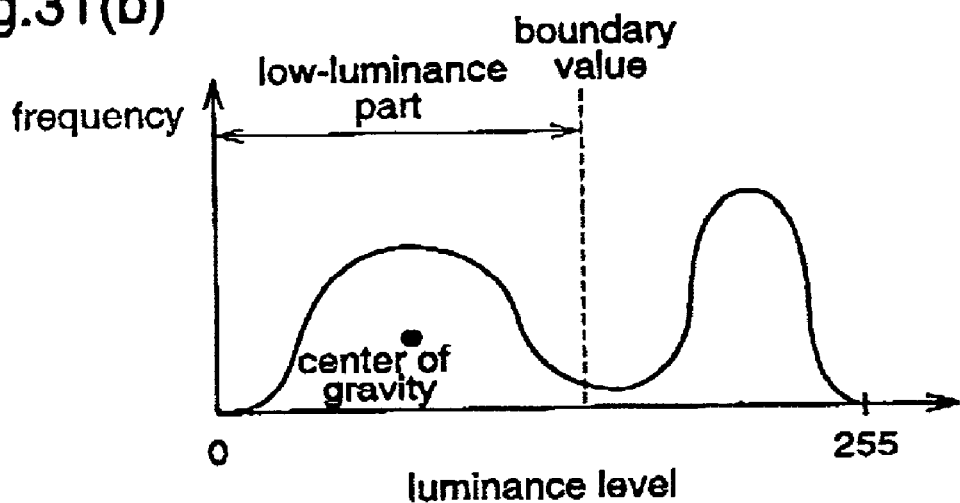
Figure 31C:
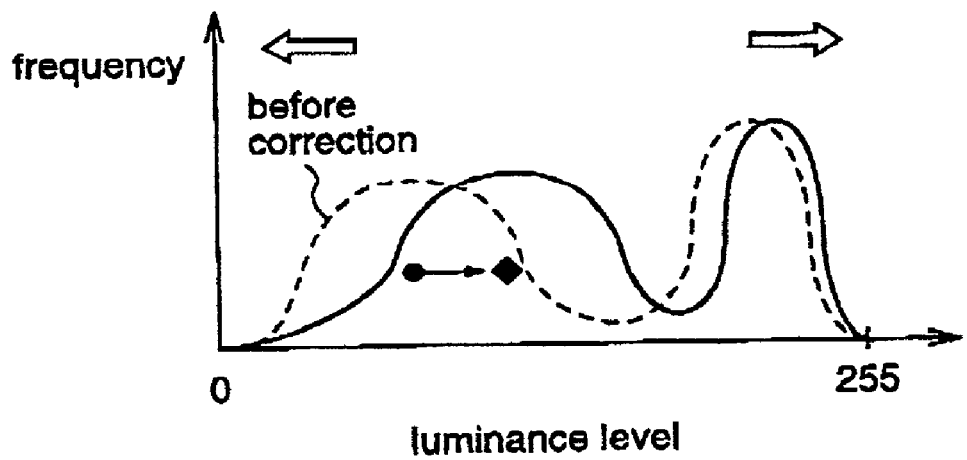
Figure 32A:
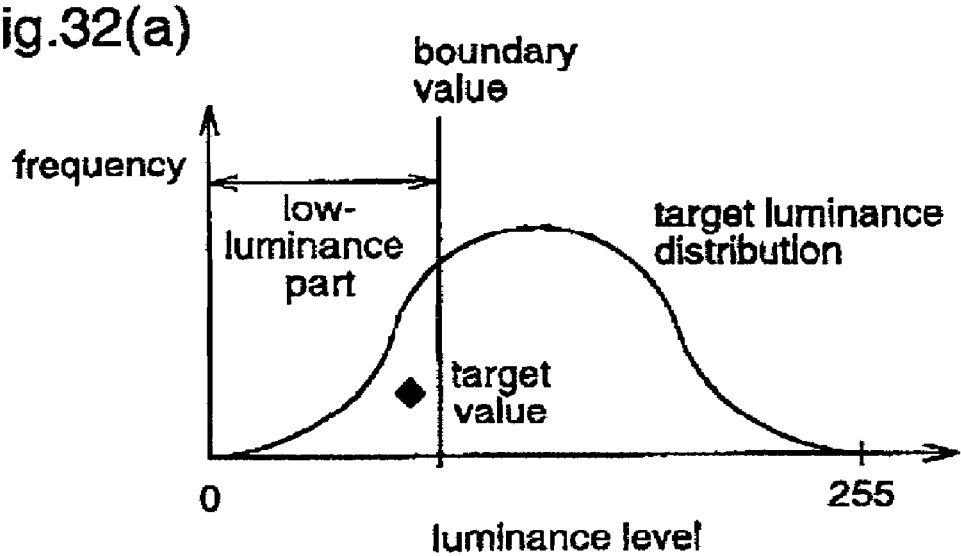
FIGS. 32(a)–32(c) are diagrams for explaining a correction process in a forward-lighted image, according to the fourth embodiment.
Figure 32B:
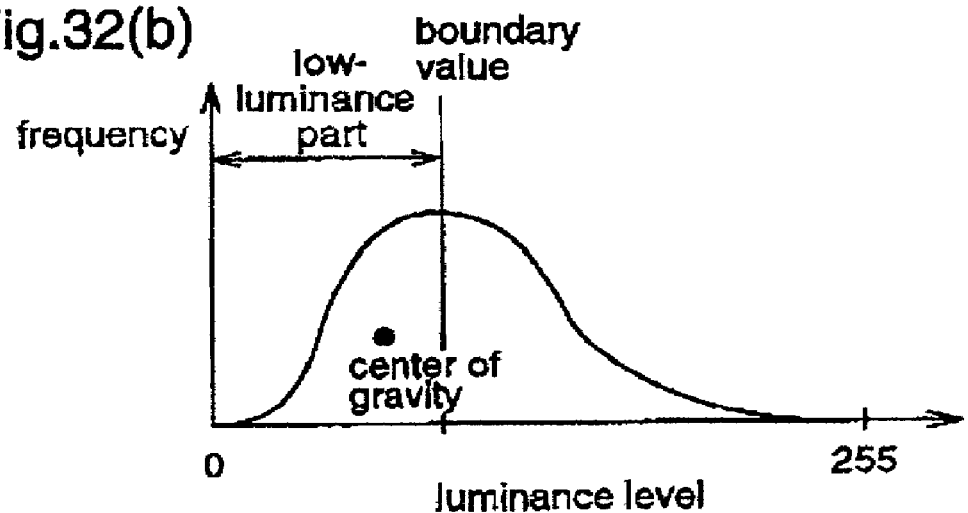
Figure 32C:
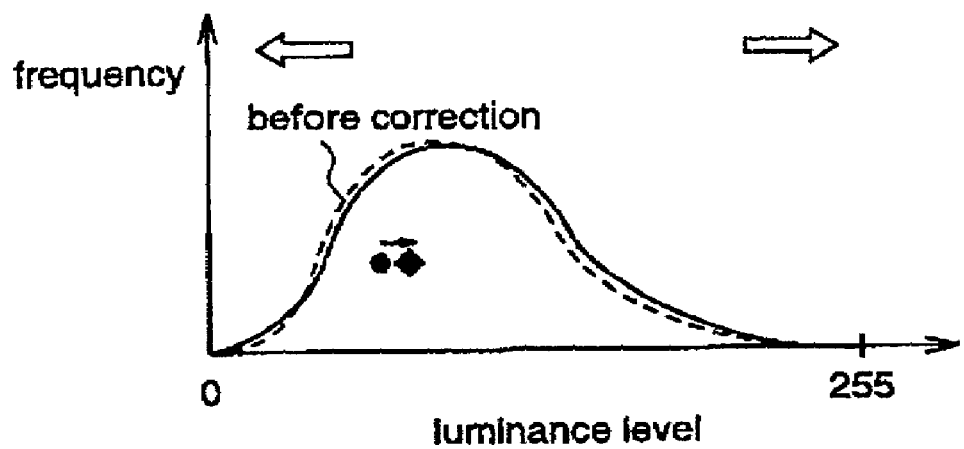

FIGS. 31(a)–31(c) illustrate the correction process for the back-lighted image shown in FIG. 30(a), and FIGS. 32(a)–32(c) illustrate the correction process for the forward-lighted image shown in FIG. 30(b). More specifically, FIGS. 31(a) and 32(a) illustrate the target value calculating process by the target value calculation circuit 1508, FIGS. 31(b) and 32(b) illustrate the center-of-gravity calculating process by the center-of-gravity calculation circuit 1506, and FIGS. 31(c) and 32(c) illustrate the correcting process by the image signal correction circuit 1510. It is assumed that a luminance distribution having a normal distribution shape is stored in the target luminance distribution storage circuit 1505.

In FIGS. 31(a)–31(c), since the peak on the low-luminance side shifts toward the high-luminance side and the distribution is expanded, the low-luminance part is brightly corrected, and the contrast is improved. However, in FIGS. 32(a)–32(c), the peak of the luminance histogram is hardly shifted because there is little difference between the center of gravity and the target value. Accordingly, the brightness hardly changes although the contrast is improved.

As described above, according to the fourth embodiment of the invention, without providing different processes for a back-lighted image and a forward-lighted image, the back-lighted image is brightly corrected so that the low-luminance region in the back-lighted state has a target luminance value and, further, the contrast is improved, while the forward-lighted image is hardly changed in brightness, but the contrast is improved.

Although the conventional tone correction method has a problem that, when an image of a person who wares black clothes is corrected, the clothes turn to gray, the tone correction apparatus according to this fourth embodiment can solve this problem without providing different processes for a back-lighted image and a forward-lighted image.

While in this fourth embodiment the target luminance distribution has the shape of a normal distribution, the target luminance distribution is not restricted thereto. For example, the same effects as mentioned above are achieved with a target luminance distribution shown in FIG. 22(b).

Furthermore, as described in claim 11, the boundary value calculation circuit 1511 may adjust the boundary value calculated from the range of the mountain-shape distribution that is detected by the mountain-shape distribution detection circuit 1512, using the luminance histogram formed by the luminance histogram formation circuit 1504, whereby a more accurate boundary value can be obtained in the back-lighted image.

In the boundary value calculation circuit 1511, the centers of gravity of the two mountain-shape distribution ranges detected by the mountain-shape distribution detection circuit 1512 are calculated, and a boundary value is obtained using the two centers of gravity and the frequency of the luminance histogram between the two points.

By the way, since, in the above-described boundary value calculation method, the boundary value calculation circuit 1511 calculates a boundary value from only the first mountain-shape distribution detected by the detection circuit 1512, the boundary value is not positioned in the "valley" of the mountain-shape distributions in a luminance histogram wherein three or more mountain-shape distributions.

Figure 34:
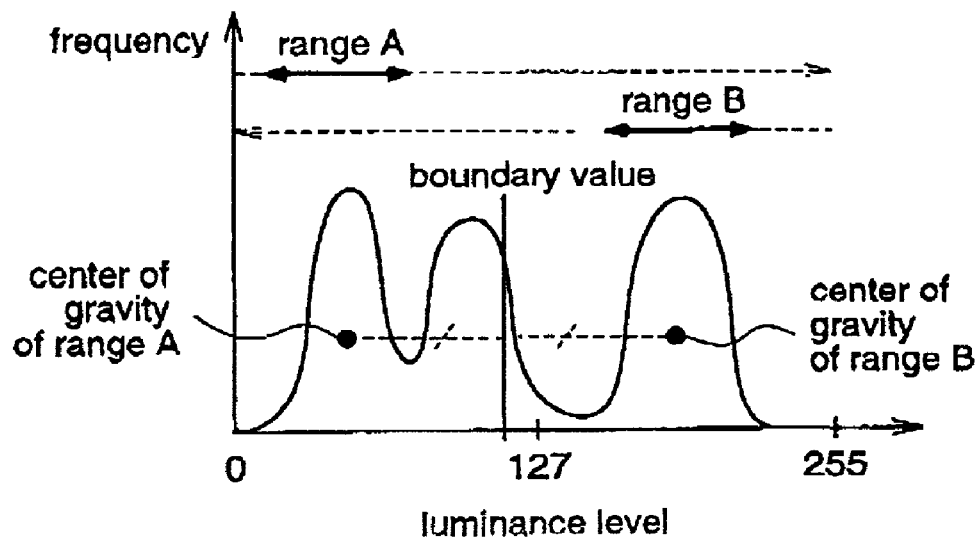
FIG. 34 is a diagram illustrating a boundary value in a luminance histogram having three peaks.

FIG. 34 shows a boundary value of a luminance histogram having three mountain-shape distributions. In this case, a boundary value is set in the center mountain-shape distribution.

So, assuming that the two centers of gravity are g1 and g2 and the center of gravity of the luminance histogram between the g1 and the g2 is G, a target value T is calculated by formula (22) as follows.

$$T = g1 + (g2 - G) \qquad (22)$$

In formula (22), since the center of gravity G surely exists between the g1 and the g2, the boundary value T is surely obtained between the g1 and g2. Accordingly, in a forward-lighted image in which the space between the two centers of gravity is narrow, the boundary value is not different from the boundary value being the middle point between the two centers of gravity. However, in the case of a back-lighted image in which the space between the two centers of gravity is broad, the boundary value changes according to the positions of the centers of gravity.

Figure 35:
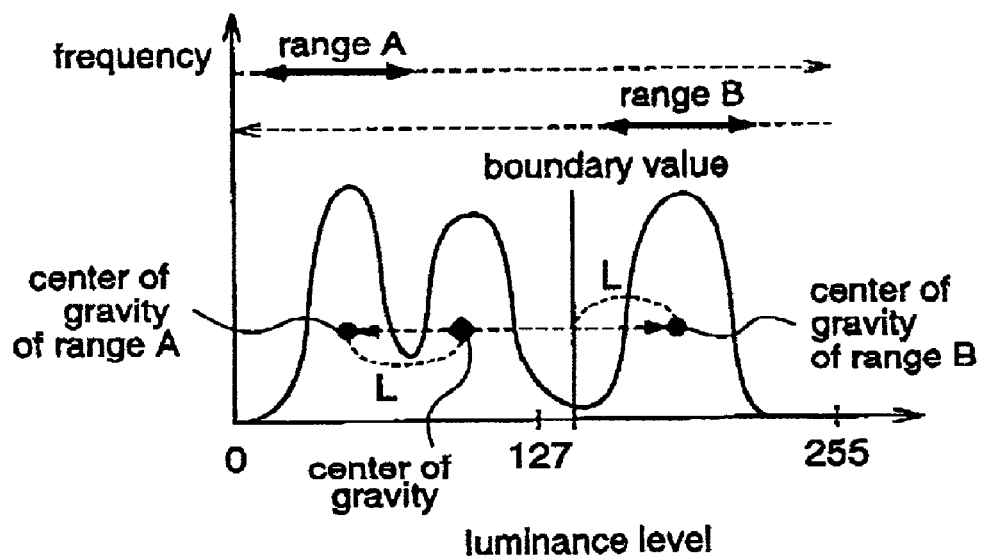
FIG. 35 is a diagram illustrating a boundary value in a luminance histogram having three peaks, which histogram is formed by an automatic tone correction apparatus as defined in claim 11.

FIG. 35 shows a boundary value of the luminance histogram shown in FIG. 34, which is obtained using formula (22). Since the boundary value is adjusted according to the centers of gravity of the luminance distributions, the boundary value is positioned in the "valley" of the luminance distributions.

In this way, using the two centers of gravity and the frequency of the luminance histogram between the two points, a more accurate boundary value can be obtained.

Furthermore, as defined in claim 12, a restriction may be put on the range of the mountain-shape distribution detected by the mountain-shape distribution detection circuit 1512.

Figure 36:
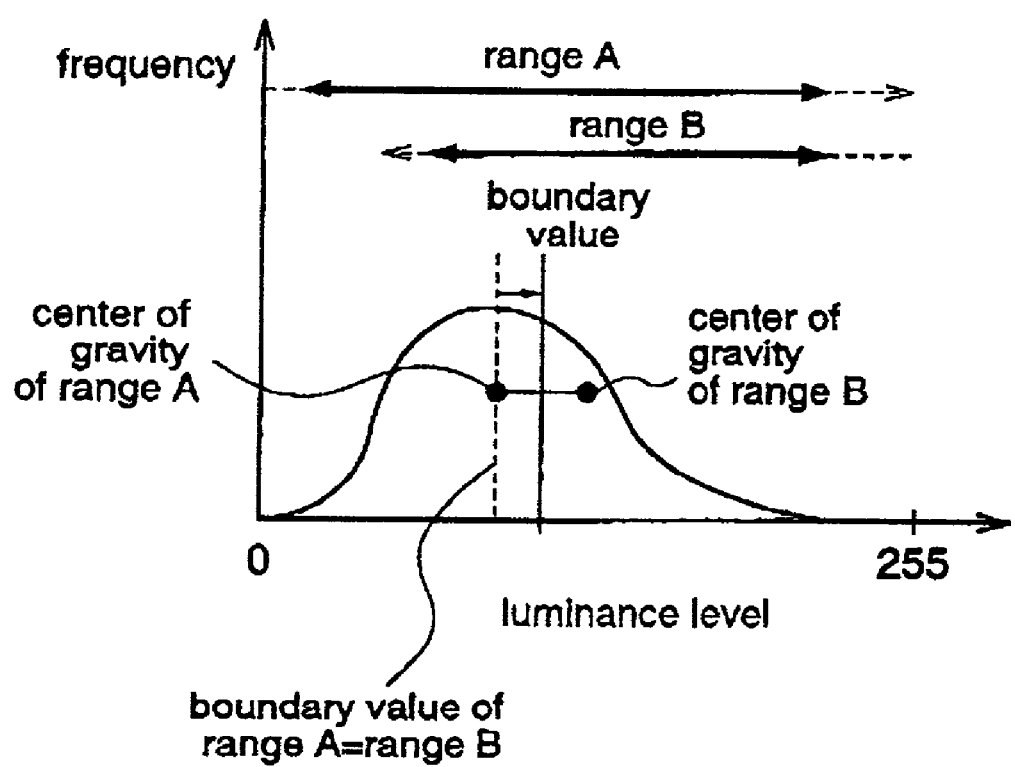
FIG. 36 is a diagram for explaining a correction process of an automatic tone correction apparatus as defined in claim 12.

This is shown in FIG. 36. In FIG. 36, a restriction is put on scanning from "255" toward "0". Therefore, scanning from "255" toward "0" is interrupted although the mountain-shape distribution continues, and the detected range is narrower than the range which is detected by scanning from "0" toward "255". As a result, the center of gravity of the range with the restriction becomes higher, and the boundary value also becomes higher. Accordingly, the target value shifts toward the higher-luminance side.

Thereby, also in the tone correction apparatus according to the fourth embodiment, the brightness can be increased even when the input image is a forward-lighted image, by setting a restriction on detection of a mountain-shape distribution.

Furthermore, the correction table formation circuit in the automatic tone correction apparatus according to any of claims 10 to 12 may create a conversion table by which expansion of the luminance distribution is performed on only the low-luminance side while expansion of the luminance distribution on the high-luminance side is performed during the process of performing correction so as to match the center of gravity of the low-luminance part of the luminance histogram to the target value, whereby the tone of the high-luminance part is prevented from being collapsed due to tone correction (corresponding to claim 16).

In this case, since the maximum value of the luminance distribution is not necessary, the distribution range calculation circuit may calculate only the minimum value, whereby the computational complexity is reduced.

Furthermore, as described for the first embodiment, modifications as described in claims 20 to 25 may be added to this fourth embodiment.

That is, in the luminance distribution formation circuit 1504, a restriction may be put on the amount of accumulation of the luminance distribution (corresponding to claim 20). By setting a restriction on the luminance histogram, the amount of correction can be accurately calculated even when there is an extreme deviation such that the tone distribution concentrates on a certain tone, for example, when a background of a back-lighted image or the like occurs halation and thus the luminance level concentrates on "255".

Further, a skin-color region may be extracted from color-difference signals and a luminance signal and, when a luminance histogram is created, the luminance distribution of the skin color region in the image may be added to the luminance distribution of the whole image, according to the area of the skin-color region (corresponding to claim 21). By adding a weight in this way, tone correction in which the skin-color region is optimized can be carried out.

Furthermore, in the luminance distribution of the skin-color region, the distribution of the high-luminance part may be weighted (corresponding to claim 22). For example, the luminance distribution of the skin-color region is multiplied by a coefficient as shown in FIG. 13 to weight the high-luminance part.

Moreover, the center of gravity of the high-luminance part may be calculated from the luminance histogram, and the amount of correction in the high-luminance part may be calculated according to the center of gravity of the high-luminance part (corresponding to claim 23).

When the luminance distribution formed by the luminance distribution formation circuit is discrete, tone correction is not carried out (corresponding to claim 24). The reason is as follows. When the luminance distribution is discrete, the image can be judged as an artificial image and, generally, it is better not to perform tone correction on an artificial image.

When a digital image signal is separated into a luminance signal and color-difference signals and tone correction is performed on the luminance signal, the color-difference signals may be corrected according to the correction table (corresponding to claim 25). Thereby, when R, G, B signals are formed from the tone-corrected luminance signal and color-difference signals, a phenomenon, in which the saturation appears degraded due to luminance correction, is suppressed.

As described above, according to the fourth embodiment, a luminance histogram of a digital image is formed, the range of a mountain-shape distribution of the luminance histogram is detected, a boundary value between a low-luminance part and a high-luminance part of the luminance histogram is calculated on the basis of the range of the mountain-shape distribution, the center of gravity of the low-luminance part is calculated, a correction table for expanding the luminance distribution of the luminance histogram and, simultaneously, correcting the luminance histogram so that the center of gravity of the low-luminance part of the expanded luminance histogram matches a target value, is formed, and tone correction is carried out using the correction table. Therefore, the low-luminance part and the high-luminance part can be accurately separated according to the shape of the luminance histogram. Further, just once formation of a conversion table enables expansion of the luminance distribution of the luminance histogram formed from the digital image signal and, simultaneously, correction of the luminance histogram so that the center of gravity of the low-luminance part matches the target luminance value. Accordingly, without providing different processes for a back-lighted image and a forward-lighted image, the back-lighted image is brightly corrected so that the low-luminance region in the back-lighted state has a target luminance value and, moreover, the contrast is improved, while the forward-lighted image is hardly changed in brightness, but the contrast is improved.

In this fourth embodiment, the description has been given of the automatic tone correction apparatus which performs expansion of the luminance distribution simultaneously with tone correction for correcting the luminance distribution so that the center of gravity of the low-luminance part matches the target value, by using the correction table. However, an automatic tone correction method for performing processing corresponding to the automatic tone correction apparatus is also within the scope of the invention. Furthermore, an automatic tone correction method corresponding to the flowchart of FIG. 33(a) which illustrates the correction principle, an automatic tone correction apparatus corresponding to this automatic tone correction method, and an automatic tone correction program storage medium for recording an automatic tone correction program which makes a computer perform the automatic tone correction method, into various recording mediums, are also within the scope of the invention. Also in these cases, the same effects as achieved by the above-described automatic tone correction apparatus can be realized although expansion of the luminance distribution and tone correction cannot be performed simultaneously.

[Embodiment 5]

Hereinafter, a description will be given of a fifth embodiment of the present invention corresponding to claims 13, 38, and 55 (further, claims 14~25, 39~50, 56~63), with reference to the drawings.

In this fifth embodiment, the target value is corrected.

Figure 37:
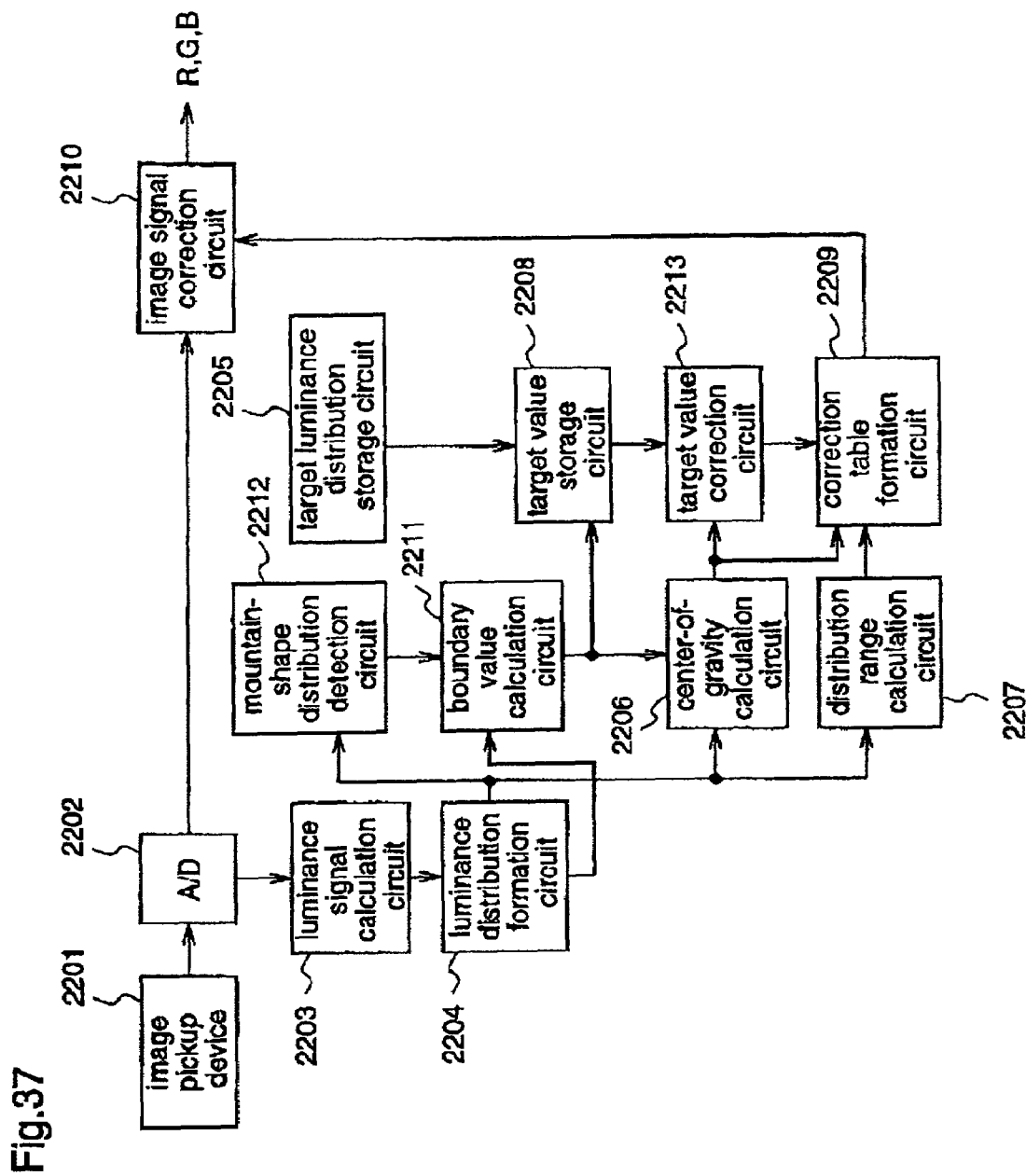
FIG. 37 is a block diagram illustrating an automatic tone correction apparatus according to a fifth embodiment of the invention.

FIG. 37 is a block diagram illustrating an automatic tone correction apparatus according to the fifth embodiment.

In FIG. 37, reference numeral 2201 denotes an image pickup device for light-to-electricity converting a shot image; reference numeral 2202 denotes an A/D converter to which an analog image signal is supplied from the image pickup device 2201; reference numeral 2203 denotes a luminance signal calculation circuit to which a digital image signal is supplied from the A/D converter 2202; reference numeral 2204 denotes a luminance distribution formation circuit (luminance histogram formation unit) to which a luminance signal is supplied from the luminance signal calculation circuit 2203; reference numeral 2212 denotes a mountain-shape distribution detection circuit to which a luminance distribution is supplied from the luminance distribution formation circuit 2204; reference numeral 2211 denotes a boundary value calculation circuit to which a range of a mountain-shape distribution is supplied from the mountain-shape distribution detection circuit 2212, and the luminance distribution is supplied from the luminance distribution formation circuit 2204; reference numeral 2206 denotes a center-of-gravity calculation circuit (center-of-gravity calculation unit) to which the luminance distribution is supplied from the luminance distribution formation circuit 2204, and a boundary value is supplied from the boundary value calculation circuit 2211; reference numeral 2207 denotes a distribution range calculation circuit to which the luminance distribution is supplied from the luminance distribution formation circuit 2204; reference numeral 2205 denotes a target value storage circuit for holding a target value to be a goal in performing tone correction; reference numeral 2208 denotes a target value calculation circuit to which a target luminance distribution is supplied from the target luminance distribution storage circuit 2205, and the boundary value is supplied from the boundary value calculation circuit 2211; reference numeral 2213 denotes a target value correction circuit (target value correction unit) to which a center of gravity in supplied from the center-ofgravity calculation circuit 2206, and a target value is supplied from the target value calculation circuit 2208; reference numeral 2209 denotes a correction table formation circuit for forming a correction table for tone correction, on the basis of the center of gravity supplied from the center-of-gravity calculation circuit 2206, a maximum value and a minimum value of the distribution range supplied from the distribution range calculation circuit 2207, and a target value that is corrected by the target value correction circuit 2213; and reference numeral 2210 denotes an image signal correction circuit for performing tone correction on the digital image signal outputted from the A/D converter 2202, on the basis of the correction table formed by the correction table formation circuit 2209. The correction table formation circuit 2209 and the image signal correction circuit 2210 constitute a tone correction section. However, when the tone correction section does not include a function of expanding the distribution of the luminance histogram, the correction table formation circuit 2209 and the image signal correction circuit 2210 constitute a luminance distribution expansion section as well as a tone correction section.

Figure 39A:
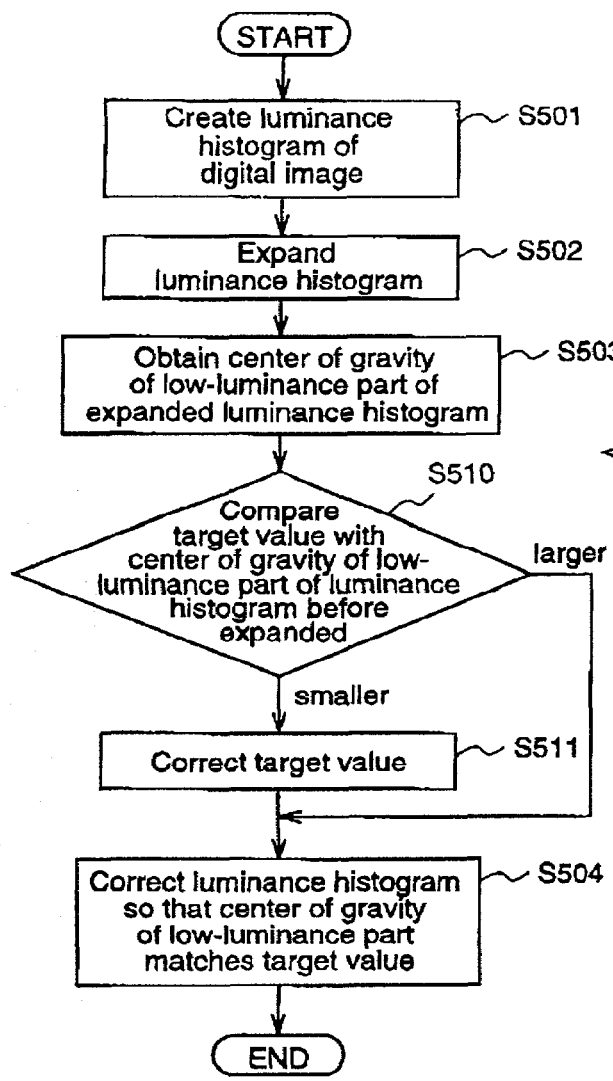
FIGS. 39(a) and 39(b) are flowcharts illustrating a tone correcting process and its principle according to the fifth embodiment, respectively.
Figure 39B:
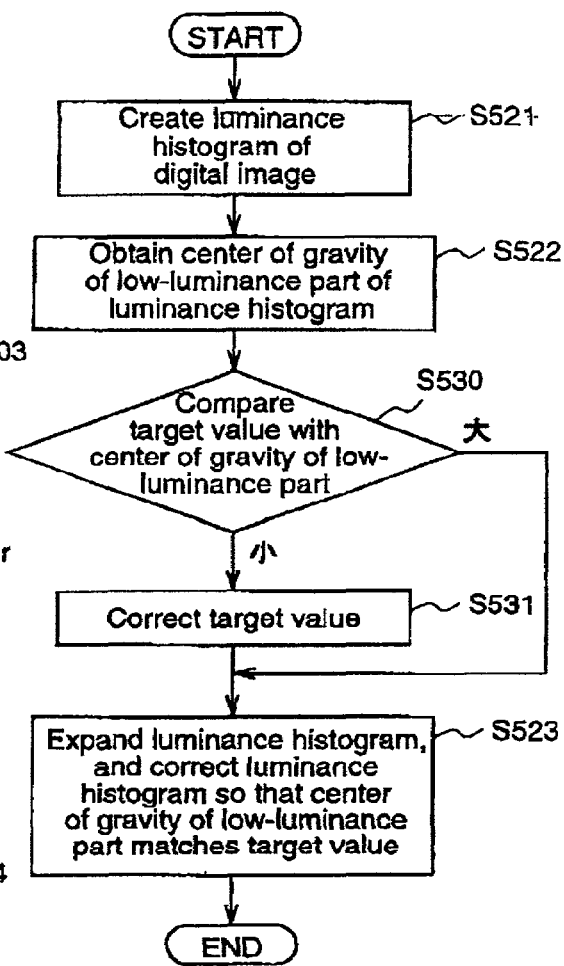
Figure 40A:
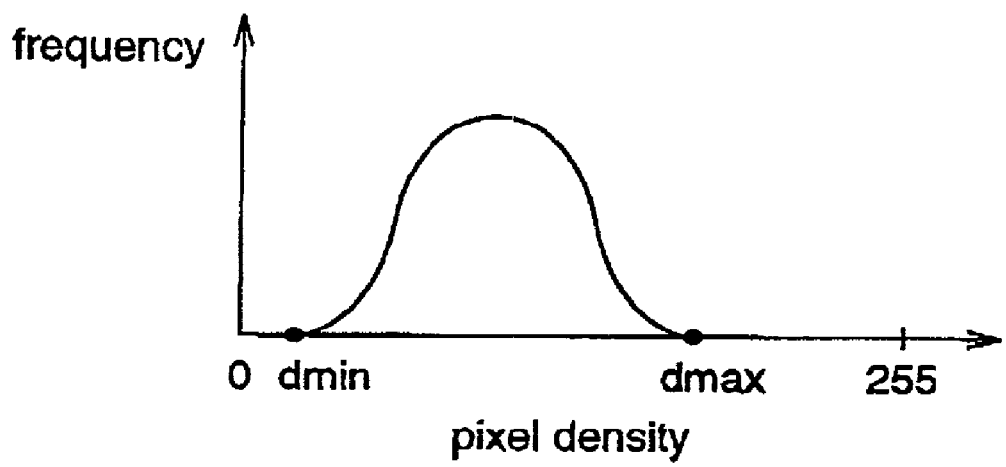
FIGS. 40(a)–40(c) are diagrams for explaining the conventional tone correcting process.
Figure 40B:
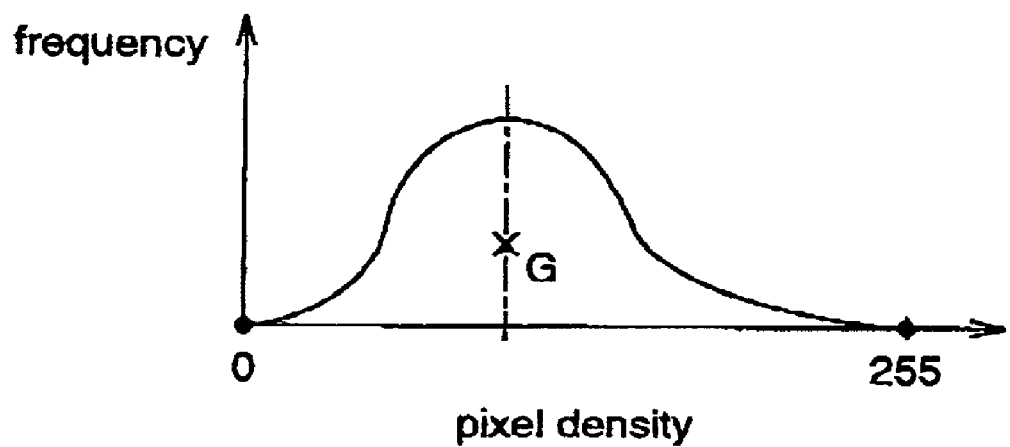
Figure 40C:
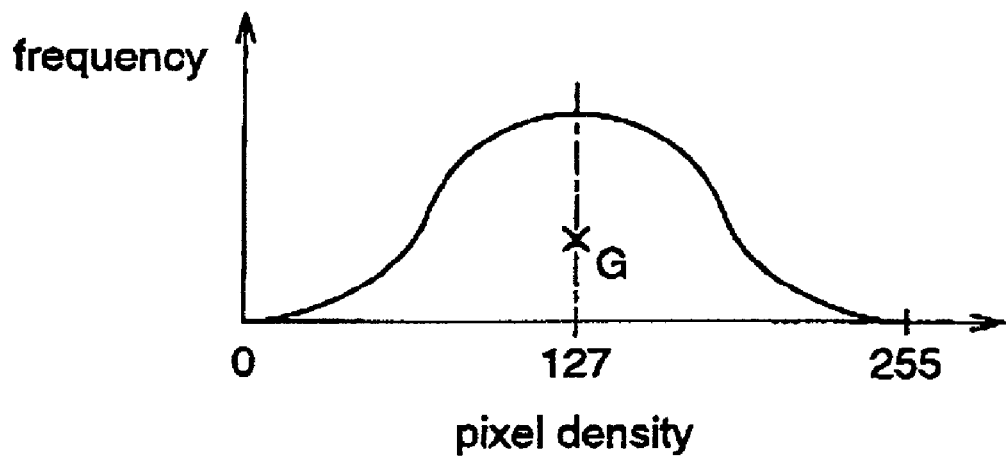
Figure 41:
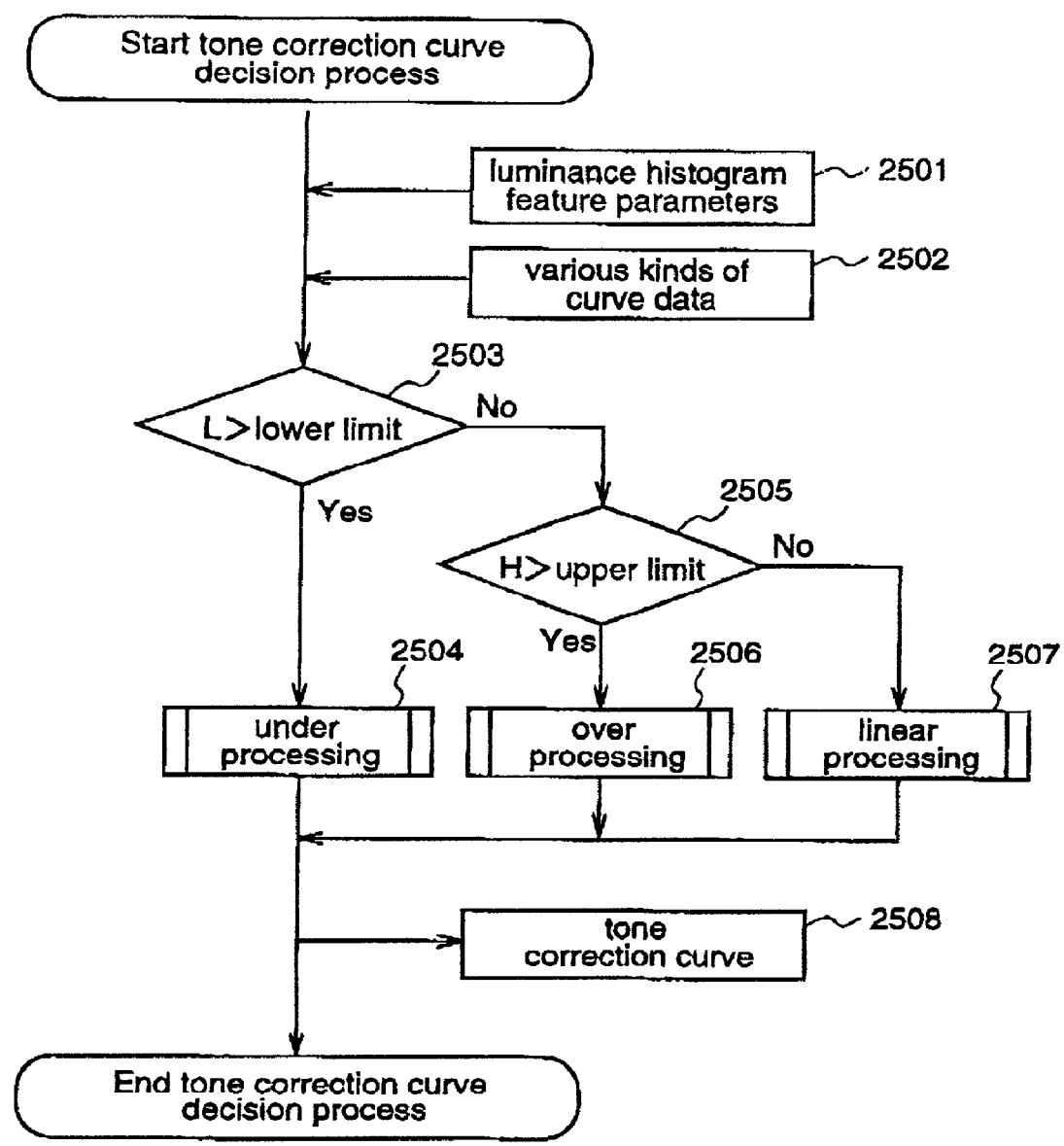
FIG. 41 is a flowchart illustrating the conventional tone correcting process.

FIG. 39(*a*) is a flowchart illustrating the principle of the tone correcting process.

Initially, a luminance histogram of a digital image is formed (step S501), and the luminance histogram is expanded (step S502). Next, the center of gravity of the low-luminance part of the expanded luminance histogram is obtained (step S503), and it is judged whether or not the target value is smaller than the center of gravity of the low-luminance part of the luminance histogram before being expanded (step S510).

When the target value is smaller than the center of gravity, the target value is corrected (step S511). Otherwise, step S511 is skipped. Than, the luminance histogram is corrected so that the center of gravity of the low-luminance part matches the target value (step S504).

Next, the operation will be described. The fundamental operation of the apparatus according to the fifth embodiment is identical to that of the apparatus according to the fourth embodiment except that the target value obtained in the target value calculation circuit 2208 is corrected by the target value correction circuit 2213.

In the target value calculation circuit 2208, a target value is calculated using the luminance histogram that is stored in the target luminance distribution storage circuit 2205, in like manner as described for the fourth embodiment.

Next, in the target value correction circuit 2213, when the target value is smaller the center of gravity that is obtained in the center-of-gravity calculation circuit 2206, the target value is corrected so that the center of gravity becomes a new target value.

FIG. 39(*b*) is a flowchart, illustrating a tone correcting process the automatic tone correction apparatus shown in FIG. 37 actually performs. Initially, a luminance histogram of a digital image is formed (step S521), and the center of gravity of the low-luminance part of this luminance histogram is obtained before expanding the luminance distribution (step S522). Next, it is judged whether or not the target value is smaller than the center of gravity of the low-luminance part of the luminance histogram (step S530). When the target value is smaller than the center of gravity, the target value is corrected (step S531). Otherwise, step S531 is skipped. Next, in step S523, a correction table for expanding the luminance distribution of the luminance histogram and, simultaneously, correcting the luminance distribution of the luminance histogram so that the center of gravity of the low-luminance part of the distribution-expanded luminance histogram matches the target value, is formed, and thereafter, using this correction table, expansion of the luminance histogram and correction of the luminance distribution to bring the center of gravity of the low-luminance part to the target value are carried out simultaneously.

Thereby, a luminance distribution expansion section (i.e., a conversion table for only expansion of luminance distribution), which is required when expanding the luminance distribution of the luminance histogram immediately after formation of the histogram as shown in FIG. 39(*a*), is dispensed with. Furthermore, as described above, arithmetic errors in the decimal level can be removed.

Figure 38A:
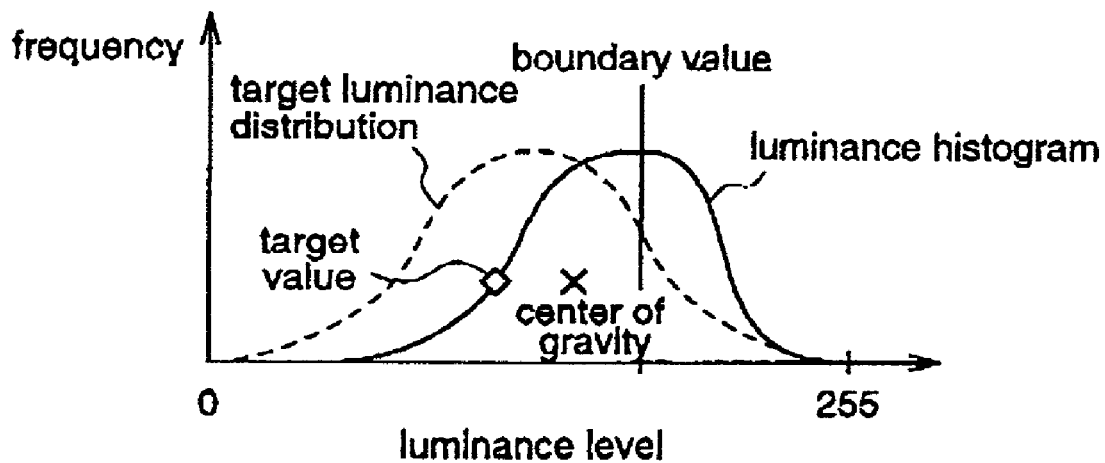
FIGS. 38(a)–38(c) are diagrams illustrating the center of gravity, target value, and luminance histogram when tone correction is carried out according to the fourth and fifth embodiments.
Figure 38B:
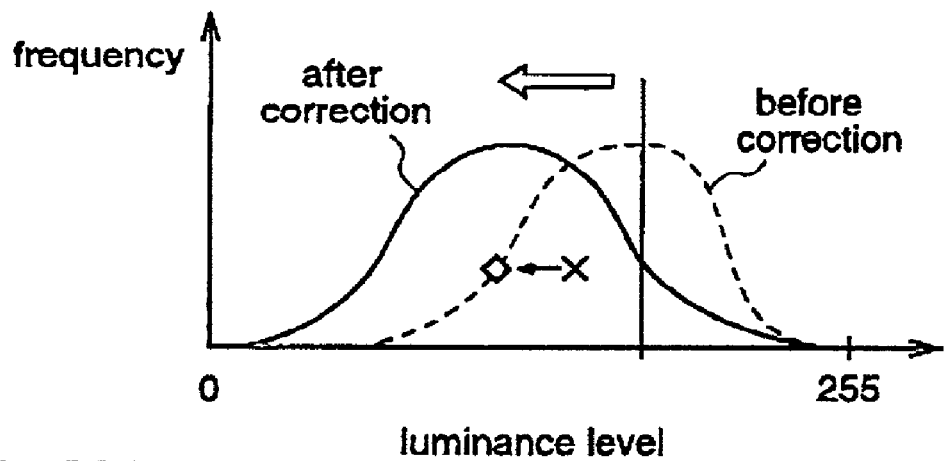
Figure 38C:
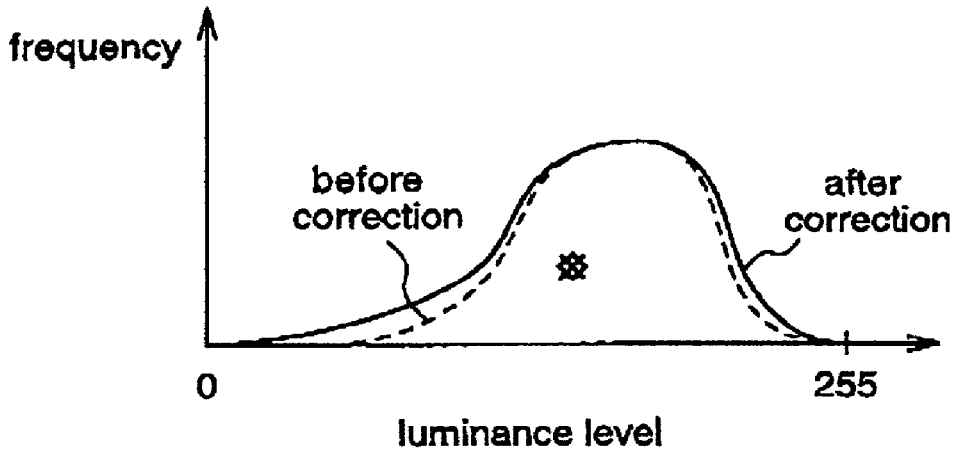

FIGS. 38(*a*)–38(*c*) are diagrams illustrating examples of centers of gravity, target values, and luminance histograms when a forward-light image is corrected by the automatic tone correction apparatus of the fourth embodiment which is not provided with the target value correction circuit, and the automatic tone correction apparatus according to the fifth embodiment which is provided with the target value correction circuit. More specifically, FIG. 38(*a*) shows the center of gravity and the target value, 38(*b*) shows the result of correction performed by the automatic tone correction apparatus of the fourth embodiment, and FIG. 38(*c*) shows the result of correction performed by the automatic tone correction apparatus of the fifth embodiment.

With reference to FIG. 38(*a*), since the peak position of the target luminance distribution exists on the lower-luminance side than the peak position of the distribution of the luminance histogram, the target value is on the lower-luminance side than the center of gravity. Accordingly, in FIG. 38(*b*), the luminance histogram is corrected so that the center of gravity matches the target value that is smaller than the center of gravity, whereby the contrast is improved, but the image is darkly corrected. However, in FIG. 38(*c*), since the target value is corrected to the center of gravity, the contrast is improved while maintaining the original brightness.

Therefore, when an input image of a scenic shot or the like is not desired to be corrected to an image darker than the original, if the target value is smaller than the center of gravity, the target value is corrected so that the center of gravity becomes a target value, thereby preventing the corrected image from becoming darker than the input image.

In the target value correction circuit 2213, as defined in claim 14, the target value may be corrected so that it matches the center of gravity when the target value is larger than the center of gravity. In this case, the input image is prevented from being corrected to a brighter image.

While in this fifth embodiment the target value is corrected to the center of gravity by the target value correction circuit 2213, the target value may be corrected to a value a little higher or lower than the center of gravity, as defined in claim 15. Thereby, the brightness of the corrected image can be minutely adjusted on the basis of the brightness of the input image.

Furthermore, the correction table formation circuit in the automatic tone correction apparatus according to any of claims 13 to 15 may create a conversion table by which expansion of the luminance distribution is performed on only the low-luminance side while expansion of the luminance distribution on the high-luminance side is performed during the process of performing correction so as to match the center of gravity of the low-luminance part of the luminance histogram to the target value, whereby the tone of the high-luminance part is prevented from being collapsed due to tone correction (corresponding to claim 16).

Furthermore, as described for the first embodiment, modifications as described in claims 20 to 25 may be added to this fifth embodiment.

That is, in the luminance distribution formation circuit 2204, a restriction may be put on the amount of accumulation of the luminance distribution (corresponding to claim 20). By setting a restriction on the luminance histogram, the amount of correction can be accurately calculated even when there is an extreme deviation such that the tone distribution concentrates on a certain tone, for example, when a background of a back-lighted image or the like occurs halation and thus the luminance level concentrates on "255".

Further, a skin-color region may be extracted from color-difference signals and a luminance signal and, when a luminance histogram is created, the luminance distribution of the skin color region in the image may be added to the luminance distribution of the whole image, according to the area of the skin-color region (corresponding to claim 21). By adding a weight in this way, tone correction in which the skin-color region is optimized can be carried out.

Furthermore, in the luminance distribution of the skin-color region, the distribution of the high-luminance part may be weighted (corresponding to claim 22). For example, the luminance distribution of the skin-color region is multiplied by a coefficient as shown in FIG. 13 to weight the high-luminance part.

Moreover, the center of gravity of the high-luminance part may be calculated from the luminance histogram, and the amount of correction in the high-luminance part may be calculated according to the center of gravity of the high-luminance part (corresponding to claim 23).

When the luminance distribution formed by the luminance distribution formation circuit is discrete, tone correction is not carried out (corresponding to claim 24). The reason is as follows. When the luminance distribution is discrete, the image can be judged as an artificial image and, generally, it is better not to perform tone correction on an artificial image.

When a digital image signal is separated into a luminance signal and color-difference signals and tone correction is performed on the luminance signal, the color-difference signals may be corrected according to the correction table (corresponding to claim 25). Thereby, when R, G, B signals are formed from the tone-corrected luminance signal and color-difference signals, a phenomenon, in which the saturation appears degraded due to luminance correction, is suppressed.

As described above, according to the fifth embodiment, a luminance histogram of a digital image is formed, the range of a mountain-shape distribution of the luminance histogram is detected, a boundary value between a low-luminance part and a high-luminance part of the luminance histogram is calculated on the basis of the range of the mountain-shape distribution, a target value is corrected to be a new target value when the target value is smaller than the center of gravity of the low-luminance part, a correction table for expanding the luminance distribution of the luminance histogram and, simultaneously, correcting the luminance histogram so that the center of gravity of the low-luminance part of the expanded luminance histogram matches a target value, is formed, and tone correction is carried out using the correction table. Therefore, the low-luminance part and the high-luminance part can be accurately separated according to the shape of the luminance histogram, and the luminance histogram is prevented from being undesirably corrected, by correcting the target value. Further, just once formation of a conversion table enables expansion of the luminance distribution of the luminance histogram formed from the digital image signal and, simultaneously, correction of the luminance histogram so that the center of gravity of the low-luminance part matches the target luminance value. Accordingly, without providing different processes for a back-lighted image and a forward-lighted image, the back-lighted image is brightly corrected so that the low-luminance region in the back-lighted state has a target luminance value and, further, the contrast is improved, while the forward-lighted image is hardly changed in brightness, but the contrast is improved.

In this fifth embodiment, the description has been given of the automatic tone correction apparatus which performs expansion of the luminance distribution simultaneously with tone correction for correcting the luminance distribution so that the center of gravity of the low-luminance part matches the target value, by using the correction table. However, an automatic tone correction method for performing processing corresponding to the automatic tone correction apparatus is also within the scope of the invention. Furthermore, an automatic tone correction method corresponding to the flowchart of FIG. 39(*a*) which illustrates the correction principle, an automatic tone correction apparatus corresponding to this automatic tone correction method, and an automatic tone correction program storage medium for recording an automatic tone correction program which makes a computer perform the automatic tone correction method, into various recording mediums, are also within the scope of the invention. Also in these cases, the same effects as achieved by the above-described automatic tone correction apparatus can be realized although expansion of the luminance distribution and tone correction cannot be performed simultaneously.

The target value correction circuit according to this fifth embodiment is applicable to any of the first to fourth embodiments, with the same effects as mentioned above.

What is claimed is:

1. An automatic tone correction apparatus comprising:
   a luminance histogram formation unit for forming a luminance histogram of a digital image;
   a center-of-gravity calculation unit for calculating a center of gravity of a low-luminance part of the luminance histogram; and
   a tone correction unit for
      forming a correction table on the basis of the luminance histogram which is formed by the luminance histogram formation unit, the center of gravity of the low-luminance part of the luminance histogram which is calculated by the center-of-gravity calculation unit, and a luminance correction target value that is a target value to which the center of gravity of the low-luminance part of the luminance histogram should be shifted, and
      performing tone correction using the correction table, thereby expanding the luminance distribution and, simultaneously, matching the center of gravity of the low-luminance part of the luminance histogram to the luminance correction target value.

2. An automatic tone correction apparatus as defined in claim 1, wherein a restriction is put on the amount of correction in the tone correction.

3. An automatic tone correction apparatus as defined in claim 1, wherein the luminance correction target value to be used in the tone correction is previously set according to the position of the center of gravity.

4. An automatic tone correction apparatus comprising:
a luminance histogram formation unit for forming a luminance histogram of a digital image;
a target value calculation unit for calculating a luminance correction target value from a target luminance distribution;
a center-of-gravity calculation unit for calculating a center of gravity of a low-luminance part of the luminance histogram; and
a tone correction unit for
forming a correction table on the basis of the luminance histogram which is formed by the luminance histogram formation unit, the center of gravity of the low-luminance part of the luminance histogram which is calculated by the center-of-gravity calculation unit, and the luminance correction target value that is a target value to which the center of gravity of the low-luminance part of the luminance histogram should be shifted, and
using the correction table, expanding the luminance distribution and, simultaneously, performing tone correction so that the center of gravity of the low-luminance part of the luminance histogram matches the luminance correction target value calculated by the target value calculation unit.

5. An automatic tone correction apparatus as defined in claim 4 wherein, when performing the tone correction, the target value calculation unit sets a target luminance distribution with a curve.

6. An automatic tone correction apparatus as defined in claim 4 wherein, when performing the tone correction, the target value calculation unit sets a plurality of target luminance distributions, and stores them.

7. An automatic tone correction apparatus comprising:
a luminance histogram formation unit for forming a luminance histogram of a digital image;
a boundary value calculation unit for calculating a boundary value for determining a low-luminance part of the luminance histogram;
a center-of-gravity calculation unit for calculating a center of gravity of the low-luminance part of the luminance histogram, on the basis of the boundary value calculated by the boundary value calculation unit; and
a tone correction unit for
forming a correction table on the basis of the luminance histogram which is formed by the luminance histogram formation unit, the center of gravity of the low-luminance part of the luminance histogram which is calculated by the center-of-gravity calculation unit, and a luminance correction target value that is a target value to which the center of gravity of the low-luminance part of the luminance histogram should be shifted, and
using the correction table, expanding the luminance distribution and, simultaneously, performing tone correction so that the center of gravity of the low-luminance part of the luminance histogram matches the luminance correction target value calculated by the target value calculation unit.

8. An automatic tone correction apparatus as defined in claim 7 therein, when performing the tone correction, the boundary value calculation unit divides a luminance range into plural regions, and calculates a boundary value from the feature parameters of the respective regions.

9. An automatic tone correction apparatus as defined in claim 8 wherein, when performing the tone correction, the boundary value calculation unit divides the luminance range into two regions, and a center of gravity calculated on the lower luminance side is used as the center of gravity of the low-luminance part of the luminance histogram.

10. An automatic tone correction apparatus comprising:
a luminance histogram formation unit for forming a luminance histogram of a digital image;
a mountain-shape distribution detection unit for detecting a range of a mountain-shape distribution of the luminance histogram;
a boundary value calculation unit for calculating a boundary value for determining a low-luminance part of the luminance histogram from the range of the mountain-shape distribution detected by the mountain-shape distribution detection unit;
a center-of-gravity calculation unit for calculating a center of gravity of the low-luminance part of the luminance histogram, on the basis of the boundary value calculated by the boundary value calculation unit; and
a tone correction unit for
forming a correction table on the basis of the luminance histogram which is formed by the luminance histogram formation unit, the center of gravity of the low-luminance part of the luminance histogram which is calculated by the center-of-gravity calculation unit, and a luminance correction target value that is a target value to which the center of gravity of the low-luminance part of the luminance histogram should be shifted, and
using the correction table, expanding the luminance distribution and, simultaneously, performing tone correction so that the center of gravity of the low-luminance part of the luminance histogram matches the luminance correction target value calculated by the target value calculation unit.

11. An automatic tone correction apparatus as defined in claim 10 wherein, when performing the tone correction, the boundary value calculation unit sets the boundary value calculated from the range of the mountain-shape distribution, using the luminance histogram.

12. An automatic tone correction apparatus as defined in claim 10 wherein, when performing the tone correction, the mountain-shape distribution detection unit puts a restriction on the range of the mountain-shape distribution.

13. An automatic tone correction apparatus as defined in any of claims 1 to 12 wherein, when performing the tone correction, the distribution of the luminance histogram is expanded only toward the low-luminance side and, simultaneously, the luminance histogram is corrected so that the center of gravity of the luminance histogram matches the luminance correction target value.

14. An automatic tone correction apparatus as defined in any of claims 1, 4, 7, and 10, wherein the tone correction unit performs the tone correction by executing $\gamma$ correction.

15. An automatic tone correction apparatus as defined in any of claims 1, 4, 7, and 10, wherein the tone correction unit forms the correction table so that it contains a correction which performs, simultaneously, a process of expanding the luminance distribution of the luminance histogram, and a process of matching the center of gravity of the low-luminance part of the distribution-expanded luminance histogram to the luminance correction target value.

16. An automatic tone correction apparatus as defined in any of claims 1, 4, 7, and 10, further comprising a luminance distribution expansion unit for expanding the luminance distribution of the luminance histogram formed by the luminance histogram formation unit;

wherein the center-of-gravity calculation unit calculates the center of gravity of the low-luminance part of the luminance histogram in which the luminance distribution is expanded.

17. An automatic tone correction apparatus as defined in any of claims 1, 4, 7, and 10, wherein, when forming the luminance histogram, a restriction is put on the amount of accumulation of luminance distribution.

18. An automatic tone correction apparatus as defined in any of claims 1, 4, 7, and 10, further comprising a skin color region extraction unit for extracting a skin color region from color-difference signals and a luminance signal;
wherein, when forming the luminance histogram, the luminance distribution of a skin color portion of the image is added to the luminance distribution of the whole image according to the area of the skin color region.

19. An automatic tone correction apparatus as defined in claim 18 wherein, when the luminance distribution of the skin color portion of the image is added to the luminance distribution of the whole image according to the area of the skin color region, the distribution of a high-luminance part of the skin color portion is weighted.

20. An automatic tone correction apparatus as defined in any of claims 1, 4, 7, and 10, wherein the center of gravity of the high-luminance part is calculated from the luminance histogram which is calculated by the luminance histogram formation unit, and an amount of tone correction on the high-luminance part is calculated according to the position of the center of gravity of the high-luminance part.

21. An automatic tone correction apparatus as defined in any of claims 1, 4, 7, and 10, wherein tone correction is not carried out when the luminance distribution is discrete.

22. An automatic tone correction apparatus as defined in any of claims 1, 4, 7, and 10, wherein color-difference signals of the image are corrected according to the correction table.

23. An automatic tone correction method for correcting tones of a digital image, comprising:
a luminance histogram formation step of forming a luminance histogram of the digital image;
a center-of-gravity calculation step of calculating a center of gravity of a low-luminance part of the luminance histogram; and
a tone correction step of expanding the luminance distribution and, simultaneously, performing tone correction so that the center of gravity of the low-luminance part of the luminance histogram matches a luminance correction target value.

24. An automatic tone correction method as defined in claim 23 wherein, in the tone correction step, a restriction is put on the amount of correction.

25. An automatic tone correction method as defined in claim 23, wherein the luminance correction target value to be used in the tone correction step is previously set according to the position of the center of gravity.

26. An automatic tone correction method for correcting tones of a digital image, comprising:
a target value calculation step of calculating a luminance correction target value from a target luminance distribution;
a luminance histogram formation step of forming a luminance histogram of the digital image;
a center-of-gravity calculation step of calculating a center of gravity of a low-luminance part of the luminance histogram; and
a tone correction step of expanding the luminance distribution and, simultaneously, performing tone correction so that the center of gravity of the low-luminance part of the luminance histogram matches the luminance correction target value that is calculated in the target value calculation step.

27. An automatic tone correction method as defined in claim 26 wherein, in the target value calculation step, a target luminance distribution is set with a curve.

28. An automatic tone correction method as defined in claim 26 wherein, in the target value calculation step, a plurality of target luminance distributions are stored.

29. An automatic tone correction method for correcting tones of a digital image, comprising:
a luminance histogram formation step of forming a luminance histogram of the digital image;
a boundary value calculation step of calculating a boundary value for setting a range of a low-luminance part of the luminance histogram;
a center-of-gravity calculation step of calculating a center of gravity of the low-luminance part of the luminance histogram, on the basis of the boundary value calculated in the boundary value calculation step; and
a tone correction step of expanding the luminance distribution and, simultaneously, performing tone correction so that the center of gravity of the low-luminance part of the luminance histogram matches a luminance correction target value.

30. An automatic tone correction method as defined in claim 29 wherein, in the boundary value calculation step, a luminance range is divided into plural regions, and a boundary value is calculated from feature parameters of the respective regions.

31. An automatic tone correction method as defined in claim 30 wherein, in the boundary value calculation step, the luminance range is divided into two regions, and a center of gravity calculated on the lower-luminance side is used as the center of gravity of the low-luminance part of the luminance histogram.

32. An automatic tone correction method for correcting tones of a digital image, comprising:
a luminance histogram formation step of forming a luminance histogram of the digital image;
a mountain-shape distribution detection step of detecting a range of a mountain-shape distribution of the luminance histogram;
a boundary value calculation step of calculating a boundary value for setting a low-luminance part of the luminance histogram, from the range of the mountain-shape distribution detected in the mountain-shape distribution detection step;
a center-of-gravity calculation step of calculating a center of gravity of the low-luminance part of the luminance histogram, on the basis of the boundary value calculated in the boundary value calculation step; and
a tone correction step of expanding the luminance distribution and, simultaneously, performing tone correction so that the center of gravity of the low-luminance part of the luminance histogram matches a luminance correction target value.

33. An automatic tone correction method as defined in claim 32 wherein, in the boundary value calculation step, the boundary value calculated from the range of the mountain-shape distribution is set by using the luminance histogram.

34. An automatic tone correction method as defined in claim 32 wherein, in the mountain-shape distribution detection step, a restriction is put on the range of the mountain-shape distribution.

35. An automatic tone correction method as defined in any of claims 23 to 34, wherein the distribution of the luminance histogram is expanded only toward the lower-luminance side and, simultaneously, the luminance histogram is corrected so that the center of gravity of the luminance histogram matches the luminance correction target value.

36. An automatic tone correction method as defined in any of claims 23, 26, 29, and 32, wherein the tone correction step is performed by executing γ correction.

37. An automatic tone correction method as defined in any of claims 23, 26, 29, and 32, wherein, in the tone correction step, a correction table is formed so that it contains a correction which performs, simultaneously, a process of expanding the luminance distribution of the luminance histogram, and a process of matching the center of gravity of the low-luminance part of the distribution-expanded luminance histogram to the luminance correction target value.

38. An automatic tone correction method as defined in any of claims 23, 26, 29, and 32, further comprising a luminance distribution expansion step of expanding the luminance distribution of the luminance histogram, between the luminance histogram formation step and the center-of-gravity calculation step;
   wherein, in the center-of-gravity calculation step, calculation of a center of gravity is performed on the low-luminance part of the luminance histogram in which the luminance distribution is expanded.

39. An automatic tone correction method as defined in any of claims 23, 26, 29, and 32, wherein, when forming the luminance histogram, a restriction is put on the amount of accumulation of luminance distribution.

40. An automatic tone correction method as defined in any of claims 23, 26, 29, and 32, further comprising a skin color region extraction step of extracting a skin color region from color-difference signals and a luminance signal;
   wherein, in the luminance histogram formation step, a luminance histogram, in which the luminance distribution of a skin color part of the image is added to the luminance distribution of the whole image according to the area of the skin color region, is formed.

41. An automatic tone correction method as defined in claim 40 wherein, when the luminance distribution of the skin color part of the image is added to the luminance distribution of the whole image according to the area of the skin color region, the distribution of a high-luminance portion of the skin color part is weighted.

42. An automatic tone correction method as defined in any of claims 23, 26, 29, and 32, wherein the center of gravity of the high-luminance part is calculated from the luminance histogram which is calculated in the luminance histogram formation step, and an amount of tone correction for the high-luminance part is calculated according to the position of the center of gravity of the high-luminance part.

43. An automatic tone correction method as defined in any of claims 23, 26, 29, and 32, wherein, in the tone correction, tone correction is not carried out when the luminance distribution is discrete.

44. An automatic tone correction method as defined in any of claims 23, 26, 29, and 32, wherein color-difference signals of the image are corrected according to the correction table.

45. An automatic tone correction program storage medium readable by computer in which a program for making a computer execute an automatic tone correction method for correcting tones of a digital image is stored, said automatic tone correction method comprising:
   a luminance histogram formation step of forming a luminance histogram of the digital image;
   a center-of-gravity calculation step of calculating a center of gravity of a low-luminance part of the luminance histogram; and
   a tone correction step of expanding the luminance distribution and, simultaneously, performing tone correction so that the center of gravity of the low-luminance part of the luminance histogram matches a luminance correction target value.

46. An automatic tone correction program storage medium readable by computer in which a program is stored for making a computer execute an automatic tone correction method for correcting tones of a digital image is stored, said automatic tone correction method comprising:
   a target value calculation step of calculating a luminance correction target value from a target luminance distribution;
   a luminance histogram formation step of forming a luminance histogram of the digital image;
   a center-of-gravity calculation step of calculating a center of gravity of a low-luminance part of the luminance histogram; and
   a tone correction step of expanding the luminance distribution and, simultaneously, performing tone correction so that the center of gravity of the low-luminance part of the luminance histogram matches the luminance correction target value that is calculated in the target value calculation step.

47. An automatic tone correction program storage medium readable by computer in which a program is stored for making a computer execute an automatic tone correction method for correcting tones of a digital image is recorded, said automatic tone correction method comprising:
   a luminance histogram formation step of forming a luminance histogram of the digital image;
   a boundary value calculation step of calculating a boundary value for setting a range of a low-luminance part of the luminance histogram;
   a center-of-gravity calculation step of calculating a center of gravity of the low-luminance part of the luminance histogram, on the basis of the boundary value calculated in the boundary value calculation step; and
   a tone correction step of expanding the luminance distribution and, simultaneously, performing tone correction so that the center of gravity of the low-luminance part of the luminance histogram matches a luminance correction target value.

48. An automatic tone correction program storage medium readable by computer in which a program is stored for making a computer execute an automatic tone correction method for correcting tones of a digital image is stored, said automatic tone correction method comprising:
   a luminance histogram formation step of forming a luminance histogram of the digital image;
   a mountain-shape distribution detection step of detecting a range of a mountain-shape distribution of the luminance histogram;
   a boundary value calculation step of calculating a boundary value for setting a low-luminance part of the luminance histogram, from the range of the mountain-shape distribution detected in the mountain-shape distribution detection step;

a center-of-gravity calculation step of calculating a center of gravity of the low-luminance part of the luminance histogram, on the basis of the boundary value calculated in the boundary value calculation step; and a tone correction step of expanding the luminance distribution and, simultaneously, performing tone correction so that the center of gravity of the low-luminance part of the luminance histogram matches a luminance correction target value.

49. An automatic tone correction program storage medium as defined in any of claims 45 to 48 wherein, in the tone correction step, a correction table is formed so that it contains a correction which performs, simultaneously, a process of expanding the luminance distribution of the luminance histogram, and a process of matching the center of gravity of the low-luminance part of the distribution-expanded luminance histogram to the luminance correction target value.

50. An automatic tone correction program storage medium as defined in any of claims 45 to 48, wherein the automatic tone correction method further comprises a luminance distribution expansion step of expanding the luminance distribution of the luminance histogram, between the luminance histogram formation step and the center-of-gravity calculation step; and in the center-of-gravity calculation step, calculation of a center of gravity is performed on the low-luminance part of the luminance histogram in which the luminance distribution is expanded.

51. An automatic tone correction program storage medium as defined in any of claims 45 to 48 wherein, when forming the luminance histogram, a restriction is put on the amount of accumulation of luminance distribution.

52. An automatic tone correction program storage medium as defined in any of claims 45 to 48, wherein the automatic tone correction method further comprises a skin color region extraction step of extracting a skin color region from color-difference signals and a luminance signal; and in the luminance histogram formation step, a luminance histogram, in which the luminance distribution of a skin color part of the image is added to the luminance distribution the whole image according to the area of the skin color region, is formed.

53. An automatic tone correction program storage medium as defined in claim 52 wherein, when the luminance distribution of the skin color part of the image is added to the luminance distribution of the whole image according to the area of the skin color region, the distribution of a high-luminance portion of the skin color part is weighted.

54. An automatic tone correction program storage medium as defined in any of claims 45 to 48, wherein the center of gravity of the high-luminance part is calculated from the luminance histogram which is calculated in the luminance histogram formation step, and an amount of tone correction for the high-luminance part is calculated according to the position of the center of gravity of the high-luminance part.

55. An automatic tone correction program storage medium as defined in any of claims 45 to 48, wherein tone correction is not carried out when the luminance distribution is discrete.

56. An automatic tone correction program storage medium as defined in any of claims 45 to 48, wherein color-difference signals of the image are corrected according to the correction table.

* * * * *